US009631679B2

(12) United States Patent
Adachi et al.

(10) Patent No.: US 9,631,679 B2
(45) Date of Patent: Apr. 25, 2017

(54) MULTIPLE PLATE CLUTCH

(71) Applicant: HONDA MOTOR CO., LTD., Tokyo (JP)

(72) Inventors: Jun Adachi, Wako (JP); Yoshiaki Tsukada, Wako (JP); Yoshiaki Nedachi, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/768,358

(22) PCT Filed: Mar. 28, 2014

(86) PCT No.: PCT/JP2014/059155
§ 371 (c)(1),
(2) Date: Aug. 17, 2015

(87) PCT Pub. No.: WO2014/157631
PCT Pub. Date: Oct. 2, 2014

(65) Prior Publication Data
US 2015/0377303 A1    Dec. 31, 2015

(30) Foreign Application Priority Data
Mar. 29, 2013    (JP) .................... 2013-074735

(51) Int. Cl.
*F16D 13/56*    (2006.01)
*F16D 23/12*    (2006.01)
(Continued)

(52) U.S. Cl.
CPC ............ *F16D 13/56* (2013.01); *F16D 13/54* (2013.01); *F16D 23/12* (2013.01); *F16D 13/52* (2013.01); *F16D 2023/123* (2013.01)

(58) Field of Classification Search
CPC ...................................................... F16D 13/56
See application file for complete search history.

(56) References Cited

U.S. PATENT DOCUMENTS

| 1,014,826 A | * | 1/1912 | Ireland | .................... F16D 13/56 192/56.6 |
| 2,893,528 A | | 7/1959 | Ryba | |

(Continued)

FOREIGN PATENT DOCUMENTS

| DE | 491363 C | 2/1930 |
| JP | 38-7907 B1 | 6/1963 |

(Continued)

OTHER PUBLICATIONS

International Search Report dated Jun. 17, 2014, issued in counterpart International Application No. PCT/JP2014/059155 (2 pages).

(Continued)

*Primary Examiner* — Mark Manley
(74) *Attorney, Agent, or Firm* — Westerman, Hattori, Daniels & Adrian, LLP

(57) ABSTRACT

In a multiple plate clutch having a main spring which is provided between a clutch center fixed in an axial direction and a pressure plate displaceable in the axial direction and presses plural clutch plates in a clutch engagement direction, and a lifter plate for lifting the pressure plate in a clutch release direction, a sub spring for urging the pressure plate in the clutch engagement direction through the lifter plate is provided between the clutch center and the lifter plate, and the lifter plate is lifted by a predetermined amount or more to cut off the urging force of the sub spring to the pressure plate.

10 Claims, 26 Drawing Sheets

(51) Int. Cl.
   *F16D 13/54*   (2006.01)
   *F16D 13/52*   (2006.01)

(56) References Cited

U.S. PATENT DOCUMENTS

2005/0194230 A1   9/2005   Tsukada
2011/0073429 A1   3/2011   Gokan et al.

FOREIGN PATENT DOCUMENTS

| JP | 4-194421 A | 7/1992 |
| JP | 2005-249083 A | 9/2005 |
| JP | 2011-75037 A | 4/2011 |

OTHER PUBLICATIONS

Written Opinion dated Jun. 17, 2014, issued in counterpart International Application No. PCT/JP2014/059155 (8 pages).
Notification of Transmittal of Translation of the International Preliminary Report on Patentability (Form PCT/IB/338) issued in counterpart International Application No. PCT/JP2014/059155 dated Oct. 1, 2015, with Form PCT/PEA/409 (4 pages).

\* cited by examiner

■RATIO

| FIRST CONNECTION GEAR RATIO | 3 |
|---|---|
| SECOND CONNECTION GEAR RATIO | 1.5 |
| FINAL REDUCTION RATIO | 2.5 |

MULTIPLE PLATE CLUTCH

TECHNICAL FIELD

The present invention relates to a multiple plate clutch.

BACKGROUND ART

The present invention relates to a clutch of an automatic transmission vehicle (AT vehicle). AT vehicles have a problem that shock under gear shift should be reduced as much as possible because gear shift is automatically performed. The shift shock can be recognized as "the amplitude of acceleration which a driver senses bodily". The driver's bodily-sensed acceleration amplitude occurs due to variation of a countershaft torque under gear shift (the driving force of a rear wheel as a driving wheel is also in one-to-one relation with the countershaft torque, and variation of the driving force of the rear wheel can be regarded as being the same as the variation of the countershaft torque).

The principle of occurrence of the shift shock will be described hereunder.

A condition that shift-up from 1-speed to 2-speed is performed in a conventional motorcycle as disclosed in Patent Document 1 is assumed. FIG. 18 shows an example of ratios of driving system parts. The initial value of the number of rotations of a clutch outer is set to 1500 rpm. The ratios and the initial value of the number of rotations of the clutch outer are expediencies. Particularly, various values may be taken as the initial value of the number of rotations according to the driver's driving manner.

FIG. 16 shows the transition of the countershaft torque under up-shift, and FIG. 17 shows the transition of the number of rotations of the driving system parts under up-shift. The difference in number of rotations between the clutch outer and the clutch center is defined as "clutch rotation number difference".

First, attention is paid to the countershaft torque and the transmission of the rotation number.

(1) Before an up-shift operation, the number of rotations of the clutch outer is set to 1500 rpm in accordance with Ne-Th (Engine rotation number-Throttle opening) at that time, and a fixed countershaft torque occurs. With respect to the number of rotations of the driving system parts, the number of rotations of the clutch center would be equal to 1500 rpm if no slipping is assumed because the clutch is set under a clutch engagement state. The clutch center rotates integrally with a main shaft. The countershaft is driven by the main shaft, and the number of rotations of the countershaft is equal to 500 rpm in accordance with the gear ratio 3 of 1-speed. The rear wheel is driven by the countershaft, and the number of rotations of the rear wheel is equal to 200 rpm in accordance with the final reduction ratio of 2.5.

(2) When gear shift is started and the clutch is released, the driving force is not applied from the engine to the countershaft, so that the countershaft torque is temporarily equal to zero. With respect to the number of rotations of the driving system part, the clutch outer would be kept to 1500 rpm if it is simply assumed that Ne is kept constant because a mechanical throttle is used in the embodiment. However, under the state of (2), the clutch is released, so that the main shaft, the countershaft and the rear wheel are not driven by the rotation of the clutch outer). Under the clutch OFF state, the rear wheel side is set to drive the transmission side. Here, when it is assumed that the number of rotations of the rear wheel is fixed to 200 rpm while the vehicle speed is kept constant, the number of rotations of the countershaft is equal to 500 rpm in accordance with the final reduction ratio of 2.5, and the number of rotations of the main shaft (clutch center) is equal to 1500 rpm in accordance with the deceleration ration 3 of 1-speed. As a result, even under the clutch OFF state, the difference in the clutch rotation number is equal to zero at the time point at which the gear position is set to 1-speed.

(3) Subsequently, the gear position shifts to 2-speed while the clutch is kept to be released. Since the clutch is kept to be released, the countershaft torque is kept to be zero. With respect to the rotation number of the driving system part, the clutch outer is kept to 1500 rpm. Even under the state of (3), the rear wheel side is set to drive the transmission side. Therefore, when the number of rotations of the rear wheel is equal to 200 rpm, the rotation number of the countershaft is equal to 500 rpm in accordance with the final reduction ratio of 2.5. Here, when the gear position shifts to 2-speed, the number of rotations of the main shaft (clutch center) is equal to 750 rpm in accordance with the deceleration ratio 1.5 of 2-speed. That is, the number of rotations of the clutch center decreases to be lower than that under state of (2) under which the gear position is set to 1-speed. As a result, there occurs a difference in clutch rotation number of (clutch outer 1500 rpm)−(clutch center 750 rpm)=(clutch rotation number difference 750 rpm) at the time point when the gear position shifts to 2-speed under the clutch OFF state.

(4) When the clutch is engaged, the clutch rotation number difference is absorbed by the clutch. The multiple plate clutch is configured so that two rotators having different numbers of rotations are connected to each other in accordance with the capacity of the clutch while slipping so as to be matched with the same rotation number. When the clutch capacity is large, the difference in clutch rotation number per unit time can be greatly reduced. At this time, a shaft at which the number of rotations is increased due to the clutch engagement is instantaneously accelerated, and thus the torque of the shaft concerned greatly rises up while the clutch rotation number difference is absorbed. Conversely, when the clutch capacity is small, the clutch is liable to slip and thus the decrease of the difference in clutch rotation number per unit time lessens. At this time, the shaft at which the number of rotations increases due to the clutch engagement is gradually accelerated, so that the rising degree of the torque of the shaft concerned is low. The time for which the difference in rotation number is absorbed is long.

That is, the countershaft torque during the absorption of the rotation number difference is determined in accordance with the clutch capacity. When the clutch capacity is large, the countershaft torque is large, and when the clutch capacity is small, the countershaft torque is small.

With respect to the rotation number of the driving system part, when the clutch center is assumed to be kept at 1500 rpm, the rotation numbers of the main shaft, the countershaft and the rear wheel are also switched to be driven by the engine side (clutch center). As a result, the clutch center whose rotation number is equal to 750 rpm at the time point of (3) is accelerated to 1500 rpm in the time corresponding to the clutch capacity.

(5) When the gear shift is finished after the difference in clutch rotation number is absorbed, the gear is shifted up by one step from the just-before gear state, and thus the countershaft torque is lower than that at the time point of (1). With respect to the rotation number of the driving system part, when the rotation number of the clutch outer is kept at 1500 rpm, the rotation number of the clutch center is equal to 1500 rpm because the difference in clutch rotation number is absorbed. Since the clutch center rotates integrally with the main shaft, the rotation number of the countershaft is equal to 1000 rpm in accordance with the gear ratio 1.5 of 2-speed, and the rotation number of the rear wheel is equal to 400 rpm in accordance with the final reduction ratio of 2.5.

Here, paying attention to the rotation number of the rear wheel between (3) and (5), in the process of (4), the rotation number of the rear wheel increases from 200 rpm to 400 rpm. That is, acceleration occurs. When this acceleration is rapid, the countershaft torque quickly increases, which causes shift shock.

Next, time charts will be viewed while attention is paid to acceleration amplitude of FIG. 16. (1) There is no acceleration amplitude before shift-up because the countershaft torque is constant. (2), (3) when shift change is started and the clutch is released, the countershaft torque is equal to zero, so that the bodily-sensed acceleration swings so as to decrease. (4) the bodily-sensed acceleration during absorption of the difference in rotation number difference swings so as to follow the value which corresponds to the countershaft torque corresponding to the clutch capacity. (5) Thereafter, the bodily-sensed acceleration swings so as to follow the value corresponding to the countershaft torque after the shift-up is completed.

From the viewpoint of suppressing the shift shock, it is important that the clutch capacity during absorption of the difference in clutch rotation number is variable. The reason for this is as follows. The countershaft torque before and after gear shift is changed to be high or low in accordance with the driving state, but the countershaft torque during absorption of the difference in clutch rotation number is determined in accordance with the clutch capacity. Therefore, when the clutch capacity is fixed, (4) during absorption of the difference in rotation number and (5) the clutch engagement is completed, the acceleration amplitude may be large depending on the driving state.

When the clutch capacity is variable, in order to suppress the shift shock, the clutch capacity during absorption of the difference in rotation number may be set between the countershaft torques before and after the gear shift, whereby the countershaft torque during absorption of the difference in rotation number can be adapted to the countershaft torques before and after gear shift, and the acceleration amplitude can be suppressed as much as possible. Conversely, as the clutch capacity is farther away from the band of the countershaft torques before and after gear shift, the acceleration amplitude is more intense, and thus shift shock is more easily sensed.

The multiple plate clutch disclosed in the Patent Document 1 has a mechanism that has a clutch spring for urging a pressure plate in a clutch engagement direction and a release spring for urging the pressure plate in a clutch release direction in accordance with a lift mount of a lifter plate which is displaceable relatively to the pressure plate, and in which the clutch capacity is reduced in accordance with the lift amount of the lifter plate. According to the construction of the Patent Document 1, by properly controlling the lift amount of the lifter plate when the difference in rotation between the countershaft and the engine side is absorbed at the start of the clutch engagement under gear shift, the clutch capacity can be adjusted, and the shift shock can be reduced.

PRIOR ART DOCUMENT

Patent Document

Patent Document 1: JP-2005-249083

SUMMARY OF THE INVENTION

Problem to be Solved by the Invention

However, the conventional multiple plate clutch described above is of such a type that the clutch capacity is adjusted steplessly. Therefore, in order to match the clutch capacity with a targeted clutch capacity, high-precision parts for a control system and a high-precision control method are required, and thus there is a problem that the structure is complicated.

The present invention has been implemented in view of the foregoing situation, and has an object to provide a simple structure capable of implementing a multiple plate clutch that can reduce shift shock by varying a clutch capacity.

Means of Solving the Problem

This specification contains the whole content of Japanese Patent Application No. 2013-074735 filed on Mar. 29, 2013.

In order to solve the above problem, according to the present invention, a multiple plate clutch having a main spring (95) that is provided between a clutch center (92) fixed in an axial direction and a pressure plate (93) displaceable in the axial direction and presses a plurality of clutch plates (94) in a clutch engagement direction, and a lifter plate (96) for lifting the pressure plate (93) in a clutch release direction, is characterized in that a sub spring (97) for urging the pressure plate (93) in a clutch engagement direction through the lifter plate (96) is provided between the clutch center (92) and the lifter plate (96), and the lifter plate (96) is lifted by a predetermined amount (L1) or more to thereby cut off the urging force of the sub spring (97) to the pressure plate (93).

According to the present invention, the lifter plate for lifting the pressure plate in the clutch release direction is lifted by the predetermined amount or more, whereby the urging force of the sub spring to the pressure plate is cut off. Therefore, the clutch engaging load can be secured by the main spring and the sub spring which act in the clutch engagement direction, and by lifting the lifter plate under gear shift, the urging force of the sub spring to the pressure plate is cut off, and the clutch engaging load can be produced by only the main spring. Accordingly, the clutch capacity can be set at plural stages of the maximum capacity under the clutch engagement state and the intermediate capacity under the state when the lifter plate is lifted, and the multiple plate clutch which can reduce shift shock by changing the clutch capacity can be implemented with a simple structure.

When the clutch of the present invention is adopted, for example, as a clutch for an AT vehicle, the intermediate capacity of the clutch can be easily matched with a set value even in the case of a system part for controlling the intermediate capacity of the clutch or a relatively simple control method.

The present invention is characterized in that the pressure plate (93) is provided with a release boss (99) extending to the lifter plate (96) side and a stopper plate (105) fixed to an end portion of the release boss (99), the lifter plate (96) is provided with a hole portion (96b) having a smaller diameter than the stopper plate (105), and the release boss (99) is inserted in the hole portion (96*b*).

According to the present invention, the lifter plate is provided with the small-diameter hole portion which is smaller in diameter than the stopper plate, and the release boss is inserted in this hole portion. Therefore, the construction that the urging force of the sub spring to the pressure plate is cut off while suppressing the number of parts at maximum can be implemented.

Furthermore, the present invention is characterized in that the multiple plate clutch has a clutch outer (91) disposed at an outside of the clutch center (92) in a radial direction, the plurality of clutch plates (94) contain outer friction plates (94*a*) provided to the clutch outer (91) and inner friction plates (94*b*) provided to the clutch center (92), the outer friction plates (94*a*) and the inner friction plates (94*b*) being alternately arranged between the clutch center (92) and the pressure plate (93), and the main spring (95) is disposed at the opposite side to the lifter plate (96) in the axial direction and between a hub portion (92*a*) of the clutch center (92) and the pressure plate (93).

According to the present invention, the main spring is disposed at the opposite side to the lifter plate in the axial direction and between the hub portion of the clutch center and the pressure plate, and the main spring and the sub spring can be disposed at both the sides of the clutch center. Therefore, the number of pats serving as the seats for the main spring and the sub spring can be reduced, and the main spring and the sub spring can be compactly disposed.

The present invention is characterized in that the sub spring (97) is provided as a ring-shaped disc spring and disposed at an outside of the release boss (99) of the pressure plate (93) in the radial direction.

According to the present invention, the sub spring can be provided with a small number of parts, the degree of freedom for design of the sub spring can be secured by using the space at the outside in the radial direction of the release boss, and the load of the sub spring can be easily secured.

Furthermore, the present invention is characterized in that a step portion (99*c*) which is larger in diameter than the hole portion (96*b*) of the lifter plate (96) is provided at the pressure plate (93) side of the release boss (99) of the pressure plate (93), and when the lifter plate (96) is lifted by only a second predetermined amount (L2), the lifter plate (96) comes into contact with the step portion (99*c*), and directly moves the pressure plate (93).

According to the present invention, when the lifter plate is lifted by only the second predetermined amount, the lifter plate comes into contact with the step portion of the release boss, and directly moves the pressure plate, so that the clutch can be released with a simple construction while providing the construction of cutting off the urging force of the sub spring.

Furthermore, according to the present invention, a multiple plate clutch having a main spring (95, 295, 395) that is provided between a clutch center (92, 292, 392) fixed in an axial direction and a pressure plate (93, 293, 393) displaceable in the axial direction and presses a plurality of clutch plates (94) in a clutch engagement direction, and a lifter plate (96, 296, 396) for lifting the pressure plate (93, 293, 393) in a clutch release direction through the sub pressure plate (96, 210, 310) is characterized in that a sub pressure plate (96, 210, 310) which is separate from and displaceable relatively to the pressure plate (93, 293, 393), a sub spring (97, 297, 397) for pressing the pressure plate (93, 293, 393) in a clutch engagement direction is provided, and when the lifter plate (96, 296, 396) is lifted by a predetermined amount (L1), the lifter plate separates the sub pressure plate (96, 210, 310) from the pressure plate (93, 293, 393), thereby cutting off a sub spring load transmission passage (S) to the pressure plate (93, 293, 393).

According to the present invention, when the lifter plate is lifted by the predetermined amount, the lifter plate separates the sub pressure plate from the pressure plate, whereby the sub spring load transmission passage to the pressure plate is cut off. Therefore, the clutch engaging load can be secured by the main spring and the sub spring which act in the clutch engagement direction, and also when the lifter plate is lifted under gear shift, the sub spring load transmission passage to the pressure plate can be cut off, and the clutch engaging load can be produced by only the main spring. Accordingly, the clutch capacity can be set at multiple stages of the maximum capacity under the clutch engagement state and the intermediate capacity under the state that the lifter plate is lifted, so that a multiple plate clutch which can reduce the shift shock by changing the clutch capacity can be implemented with a simple construction.

For example, when the clutch of the present invention is adopted, for example, as a clutch for an AT vehicle, the intermediate capacity of the clutch can be easily matched with a set value even in the case of a relatively simple system part for controlling the intermediates capacity of the clutch or control method.

Furthermore, the present invention is characterized in that the sub spring (297, 397) and the sub pressure plate (210, 310) are disposed at the opposite side to the lifter plate (296, 396) through the pressure plate (293, 393), the pressure plate (293, 393) is provided with a hole portion (293*e*, 393*e*), the lifter plate (296, 396) is provided with a release boss (271) to be inserted in the hole portion (293*e*, 393*e*), and when the lifter plate (296, 396) is lifted by the predetermined amount (L1) or more, the release boss (271) comes into contact with the sub pressure plate (210, 310), whereby the sub pressure plate (210, 310) is separated from the pressure plate (293, 393).

According to the present invention, when the lifter plate is lifted by the predetermined amount or more, the release boss comes into contact with the sub pressure plate, so that the sub pressure plate separates from the pressure plate. Therefore, even in the construction that the sub spring is disposed at the opposite side to the lifter plate, the mechanism of cutting off the sub spring load transmission passage can be provided with a simple construction.

Furthermore, the present invention is characterized in that a flange portion (270) which is larger in diameter than the hole portion (293*e*, 393*e*) of the pressure plate (293, 393) is provided to an intermediate portion in the axial direction of the release boss (271) of the lifter plate (296, 396), and when the lifter plate (296, 396) is lifted by only a second predetermined amount (L2), the flange portion (270) comes into contact with the pressure plate (293, 393) and directly moves the pressure plate (293, 393).

According to the present invention, when the lifter plate is lifted by only the second predetermined amount, the flange portion comes into contact with the pressure plate, and directly moves the pressure plate. Therefore, even in the construction that the sub spring load transmission passage is provided, the clutch can be released with a simple construction.

Still furthermore, the present invention is characterized in that the multiple plate clutch has a clutch outer (91) disposed at an outside of the clutch center (292) in a radial direction, wherein the plurality of clutch plates (94) contain outer friction plates (94a) provided to the clutch outer (91) and inner friction plates (94b) provided to the clutch center, the outer friction plates and the inner friction plates being alternately arranged between the clutch center (292) and the pressure plate (293), the sub spring (297) and the sub pressure plate (210) are disposed between a hub portion (292a) of the clutch center (292) and the pressure plate (293), and the main spring (295) is disposed between hub portion (292a) of the clutch center (292) and the pressure plate (293) to be nearer to the clutch outer (91) side than the sub spring (297).

According to the present invention, the sub spring and the sub pressure plate are disposed between the hub portion of the clutch center and the pressure plate, and the main spring is disposed between the hub portion of the clutch center and the pressure plate to be nearer to the clutch outer side than the sub spring, so that the main spring and the sub spring can be compactly disposed at the same side.

Still furthermore, the present invention is characterized in that both of the sub spring (297) and the main spring (295) are provided as ring-shaped disc springs, the sub pressure plate (210) is inlaid in the pressure plate (210), a seat portion (210c) of the sub spring (297) is provided at an outside thereof in the radial direction, and the pressure plate (293) is provided with a seat portion (212d) for the main spring (295) at an outside in the radial direction of an inlay hole (212e) in which the sub pressure plate (210) is fitted.

According to the present invention, the sub spring load transmission passage and the cut-off mechanism therefor can be provided with simple constructions, and further the size of the main spring can be increased, so that the load of the main spring can be easily secured.

Still furthermore, the present invention is characterized in that the multiple plate clutch has a clutch outer (91) disposed at an outside in the radial direction of the clutch center (392), wherein the plurality of clutch plates (94) contain outer friction plates (94a) provided to the clutch outer (91) and inner friction plates (94b) provided to the clutch center (392), the outer friction plates and the inner friction plates being alternately arranged between the clutch center (392) and the pressure plate (393), a spring holder (315) is provided to a hub portion (392a) of the clutch center (392), and the sub spring (397), the sub pressure plate (310) and the main spring (395) are disposed between the spring holder (315) and the pressure plate (393).

According to the present invention, the sub spring, the sub pressure plate and the main spring are disposed between the spring holder and the pressure plate, so that the main spring and the sub spring can be compactly disposed at the same side.

Still furthermore, the present invention is characterized in that the sub spring (397) and the main spring (395) are provided as coil springs along the axial direction of the multiple plate clutch so as to be out of phase in a peripheral direction, and the sub pressure plate (310) is provided with a hole portion or cut-out portion (310c) in which the main spring (395) passes.

According to the present invention, the clutch capacity can be easily matched with the set value by the spring characteristic of the coil spring. Since the main spring is passed in the hole portion of the sub pressure plate or the cut-out portion, the sub pressure plate can be moved without affecting the main spring, and both of securing of the clutch load based on the main spring and the cut-off mechanism for an auxiliary load transmission passage can be established.

Still furthermore, according to the present invention, a multiple plate clutch having a main spring (95) that is provided between a clutch center (92) fixed in an axial direction and a pressure plate (93) displaceable in the axial direction and presses a plurality of clutch plates (94) in a clutch engagement direction, and a lifter plate (496) which is displaced by a lifter cam (84) to lift the pressure plate (93) in a clutch release direction, is characterized in that a sub lifter plate (410) which is separate from and displaceable relatively to the lifter plate (496) and disposed to be nearer to the lifter cam (84) side than the lifter plate (496) is provided, a sub spring (411) for pressing the pressure plate (93) in a clutch engagement direction through the sub lifter plate (410) is provided, and when the sub lifter plate (410) is lifted by a predetermined amount, the sub lifter plate (410) is separated from the pressure plate (93), whereby a sub spring load transmission passage (S1) to the pressure plate (93) is cut off.

According to the present invention, the clutch engaging loads of the main spring and the sub spring which press in the clutch engagement direction can be secured, and the clutch engaging load can be produced by the load excluding the urging force of the sub spring under gear shift. Accordingly, the clutch capacity can be set at multiple stages of the maximum capacity under the clutch engagement state and the intermediate capacity under the lifted state of the sub lifter plate. Therefore, a multiple plate clutch which can reduce the shift shock by changing the clutch capacity can be implemented with a simple structure.

Furthermore, the present invention is characterized in that the pressure plate (93) is provided with a pressure plate side boss (99b) projecting to the lifter plate (496) side, the lifter plate (496) is provided with a lifter plate side boss (415) which projects to the sub lifter plate (410) side and has a hole (415a) in which the pressure plate side boss (99b) penetrates, the sub lifter plate (410) is provided with a hole (422) in which the lifter plate side boss (415) penetrates, an end portion of the pressure plate side boss (99b) is provided with a fixing member (105, 106) by which the lifter plate side boss (415) and the sub lifter plate (410) are held while the lifter plate side boss and the sub lifter plate are assembled, and a load of the sub lifter plate (410) is transmitted to the fixing member (105, 106).

According to the present invention, the load of the sub lifter plate can be transmitted to the pressure plate through the fixing member, and the sub spring load transmission passage can be formed with a simple construction.

Furthermore, the present invention is characterized in that the lifter plate side boss (415) is set to be larger in length than the thickness of a peripheral portion of the hole (422) of the sub lifter plate, and when the sub lifter plate (410) is lifted by a predetermined amount (G1), the sub lifter plate comes into contact with the lifter plate (496) and displaces integrally with the lifter plate (496).

According to the present invention, the area of the intermediate capacity of the clutch can be adjusted on the basis of the relationship of the lifter plate side boss and the thickness of the peripheral portion of the hole of the sub lifter plate, and after the sub lifter plate is lifted by the predetermined amount, the sub lifter plate can directly lift the lifter plate.

Still furthermore, the present invention is characterized in that each of the lifter plate (496) and the sub lifter plate (410) has a ring-shaped portion (496a, 420) which is opened at the center side of a shaft (56) of the clutch, a circular pipe portion (421) which projects from an inner peripheral edge of the ring-shaped portion (420) of the sub lifter plate (410) to the lifter cam (84) side is integrally provided, a step portion (423) extending inwards in the radial direction is provided to the lifter cam (84) side of an inner peripheral surface of the circular pipe portion (421), and the sub spring (411) is disposed between the shaft (56) of the clutch and the circular pipe portion (421), and is in contact with the clutch center (92) and the step portion (423) of the circular pipe portion (421).

According to the present invention, the sub spring can be compactly disposed in the radial direction between the shaft and the circular pipe portion.

Still furthermore, the multiple plate clutch is disposed in a power unit case (30c), and a start clutch (24) through which rotation of an engine (21) is input to the multiple plate clutch is disposed within the same width in the axial direction as the circular pipe portion (421) in the power unit case (30c).

According to the present invention, the start clutch can be disposed by using the space of the circular pipe portion of the sub lifter plate, and even in the clutch for which the intermediate capacity can be set, the size of the power unit case can be suppressed to a compact size.

Furthermore, the present invention is characterized in that a second sub spring (497) for urging the pressure plate (93) in the clutch engagement direction through the lifter plate (410) is provided between the clutch center (92) and the lifter plate (410), and when the lifter plate (410) is lifted by a predetermined amount or more, the urging force of the second sub spring (497) to the pressure plate (93) is cut off.

According to the present invention, the clutch engaging load can be obtained by the urging force of the second sub spring, and when the clutch is released, the urging force of the second sub spring is cut off, whereby the number of stages of the clutch capacity can be further increased.

Still furthermore, according to the present invention, a multiple plate clutch having a main spring (595) that is provided between a clutch center (592) fixed in an axial direction and a pressure plate (593) displaceable in the axial direction and presses a plurality of clutch plates (94) in a clutch engagement direction, and a lifter plate (410) which is displaced by a lifter cam (84) to lift the pressure plate (593) in a clutch release direction, is characterized in that a release member (599) is provided between the pressure plate (593) and the lifter plate (410), the release member (599) is provided with a release boss (571) projecting to the lifter plate (410) side, an end portion at the lifter plate (410) side of the release boss (571) is provided with a small-diameter boss portion (571b) whose diameter is smaller than the diameter of the release boss (571) at the pressure plate (593) side, the lifter plate (410) is provided with a lifter plate side hole (422) in which the small-diameter boss portion (571b) penetrates, an end portion of the small-diameter boss portion (571b) is provided with a fixing member (505, 506) by which the lifter plate is held while the lifter plate (410) is assembled, a sub spring (411) for pressing the pressure plate (593) in the clutch engagement direction through the fixing member (505, 506) is provided between the clutch center (592) and the lifter plate (410), and when the lifter plate (410) is lifted by a predetermined amount, the lifter plate (410) is separated from the fixing member (505, 506), whereby a sub spring load transmission passage (S1) to the pressure plate (593) is cut off.

According to the present invention, under the clutch engagement state, the load of the sub spring for pressing in the clutch engagement direction is transmitted to the pressure plate through the fixing member and the release boss, and when the lifter plate is lifted by the predetermined amount to release the clutch, the sub spring load transmission passage of the sub spring to the pressure plate is cut off. Therefore, the clutch engaging loads of the main spring and the sub spring which press in the clutch engagement direction can be secured, and the clutch engaging load can be produced by the load excluding the urging force of the sub spring under gear shift. Accordingly, the clutch capacity can be set at plural stages of the maximum capacity under the clutch engagement state and the intermediate capacity under the state that the lifter plate is lifted. Therefore, a multiple plate clutch which can reduce shift shock by changing the clutch capacity can be implemented with a simple construction.

Furthermore, the present invention is characterized in that the small-diameter boss portion (571b) of the release member (599) is set to be longer in length than the thickness of a peripheral portion of the lifter plate side hole (422), and when the lifter plate (410) is lifted by a predetermined amount (G1), the lifter plate (410) comes into contact with and displaces integrally with a step portion (571c) of the release boss (571).

According to the present invention, the area of the intermediate capacity of the clutch can be adjusted on the basis of the relationship of the small-diameter boss portion and the thickness of the peripheral portion of the lifter plate side hole, and when the lifter plate is lifted by the predetermined amount, the lifter plate directly lifts the release boss.

Still furthermore, the present invention is characterized in that the lifter plate (410) has a ring-shaped portion (420) which is opened at the center side of a shaft (56) of the clutch, and integrally provided with a circular pipe portion (421) projecting from an inner peripheral edge of the ring-shaped portion (420) to the lifter cam (84) side, a step portion (423) extending inwards in the radial direction is provided to the lifter cam (84) side of an inner peripheral surface of the circular pipe portion (421), and the sub spring (411) is disposed between the shaft (56) and the circular pipe portion (421) and is in contact with the clutch center (592) and the step portion (423) of the circular pipe portion (421).

According to the present invention, the sub spring can be compactly disposed in the radial direction between the shaft and the circular pipe portion.

Furthermore, the present invention is characterized in that the multiple plate clutch is accommodated in the power unit case (30c), and the start clutch (24) through which the rotation of the engine (21) is input to the multiple plate clutch is disposed within the same width in the axial direction as the circular pipe portion (421) in the power unit case (30c).

According to the present invention, the start clutch can be disposed by using the space of the circular pipe portion of the lifter plate, and even in the construction that the circular pipe portion is provided, the power unit case can be miniaturized.

The present invention is characterized in that a sub pressure plate (510) which is separate from and displaceable relatively to the release member (599) and the pressure plate (593) is provided, a second sub spring (597) for pressing the pressure plate (593) in the clutch engagement direction through the sub pressure plate (510) is provided, and when the lifter plate (410) is lifted by a predetermined amount, the sub pressure plate (510) is separated from the pressure plate (593) through the release member (599), thereby cutting off a second sub spring load transmission passage (S2) to the pressure plate (593).

According to the present invention, the clutch engaging load can be obtained by the urging force of the second sub spring, and the number of stages of the clutch capacity can be further increased by cutting off the urging force of the second sub spring when the clutch is released.

Effect of the Invention

In the multiple plate clutch of the present invention, the clutch capacity can be set at multiple stages of the maximum capacity under the clutch engagement state and the intermediate capacity under the state that the lifter plate is lifted, and the multiple plate clutch which can reduce the shift shock by changing the clutch capacity can be implemented with a simple construction.

Furthermore, the construction of cutting off the urging force of the sub spring to the pressure plate can be implemented while suppressing the number of parts at maximum.

Furthermore, the number of parts serving as the seats for the main spring and the sub spring can be reduced, and the main spring and the sub spring can be compactly disposed.

Furthermore, the sub spring can be provided with a small number of parts, the degree of freedom for design of the sub spring can be secured by using the space at the outside in the radial direction of the release boss, and the load of the sub spring can be easily secured.

Furthermore, the clutch can be released with a simple construction while the construction of cutting off the urging force of the sub spring is provided.

Still furthermore, the clutch engaging load can be secured by the main spring and the sub spring acting in the clutch engaging direction, the sub spring load transmission passage can be cut off under gear shift, and the clutch engaging load can be produced by only the main spring.

Still furthermore, even in the construction that the sub spring is disposed at the opposite side to the lifter plate, the cut-off mechanism of the sub spring load transmission passage can be provided with a simple construction.

Furthermore, since the flange portion comes into contact with the pressure plate and directly moves the pressure plate, the clutch can be released by a simple construction although the construction is provided with the sub spring load transmission passage.

Still furthermore, the main spring and the sub spring can be compactly disposed at the same side.

The sub spring load transmission passage and the cut-off mechanism therefor can be provided with simple constructions, and the size of the main spring can be increased, so that the load of the main spring can be easily secured.

Furthermore, the sub spring, the sub pressure plate and the main spring are disposed between the spring holder and the pressure plate, so that the main spring and the sub spring can be compactly disposed at the same side.

Still furthermore, the clutch capacity can be easily matched with the set value by the spring characteristic of the coil spring. Furthermore, the sub pressure plate can be moved without affecting the main spring, so that both of securement of the clutch load based on the main spring and the cut-off mechanism of the auxiliary load transmission passage can be established.

The sub spring load transmission passage can be formed with a simple construction.

Furthermore, the area of the intermediate capacity of the clutch can be easily adjusted, and after lifted by the predetermined amount, the sub lifter plate can directly lift the lifter plate.

Still furthermore, the sub spring can be compactly disposed in the radial direction.

Still furthermore, even in the construction having the circular pipe portion, the power unit case can be miniaturized.

Still furthermore, the number of stages of the clutch capacity can be further increased by the second sub spring.

Still furthermore, the area of the intermediate capacity of the clutch can be easily adjusted, and after lifted by the predetermined amount, the lifter plate can directly lift the release boss.

BRIEF DESCRIPTION OF THE DRAWINGS

Figure 17:
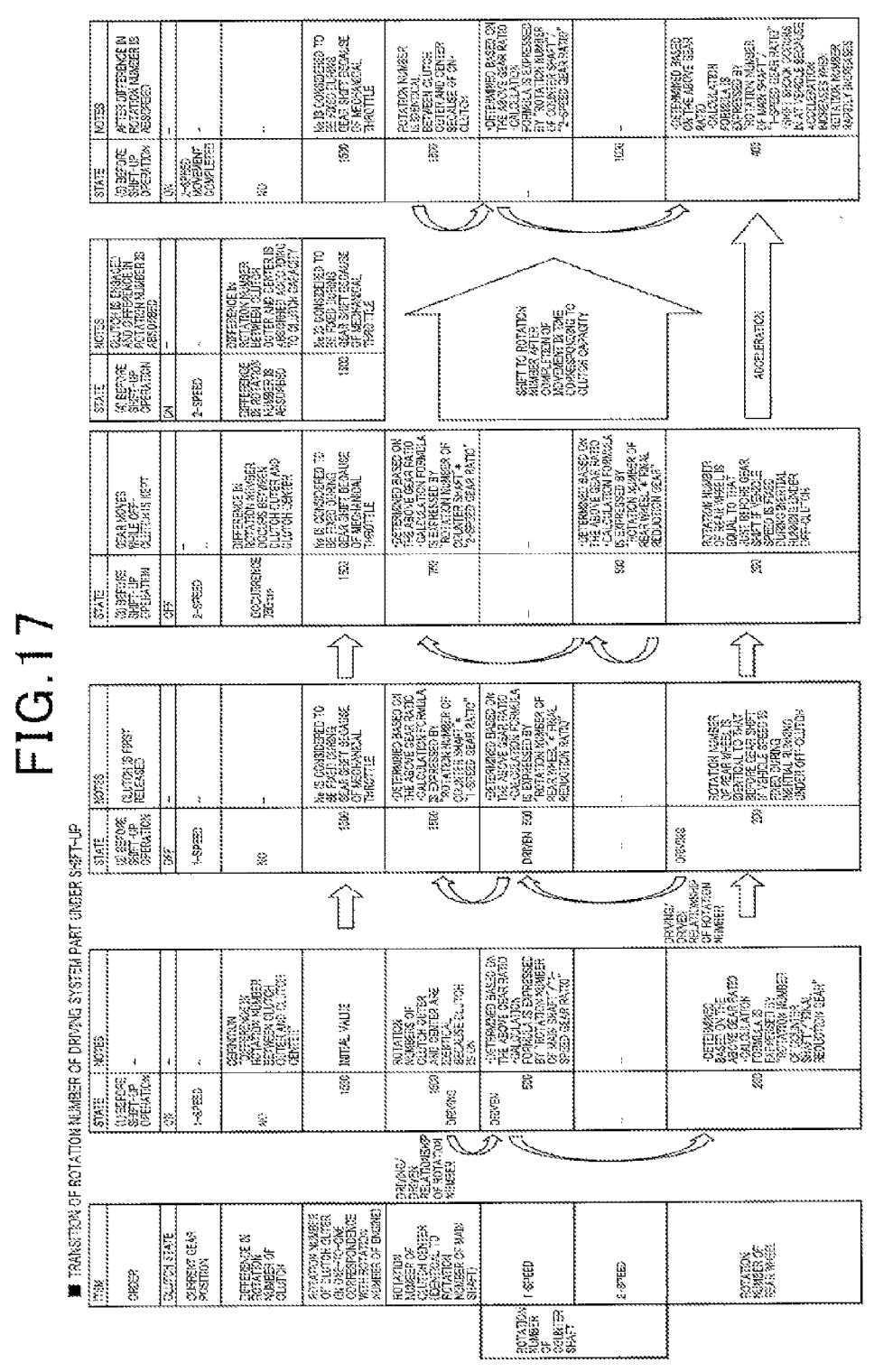

FIG. 17 is a diagram showing the background art.

FIG. 18 is a diagram showing the background art.

MODES FOR CARRYING OUT THE INVENTION

Embodiments according to the present invention will be described hereunder with reference to the drawings.

First Embodiment

Figure 1:
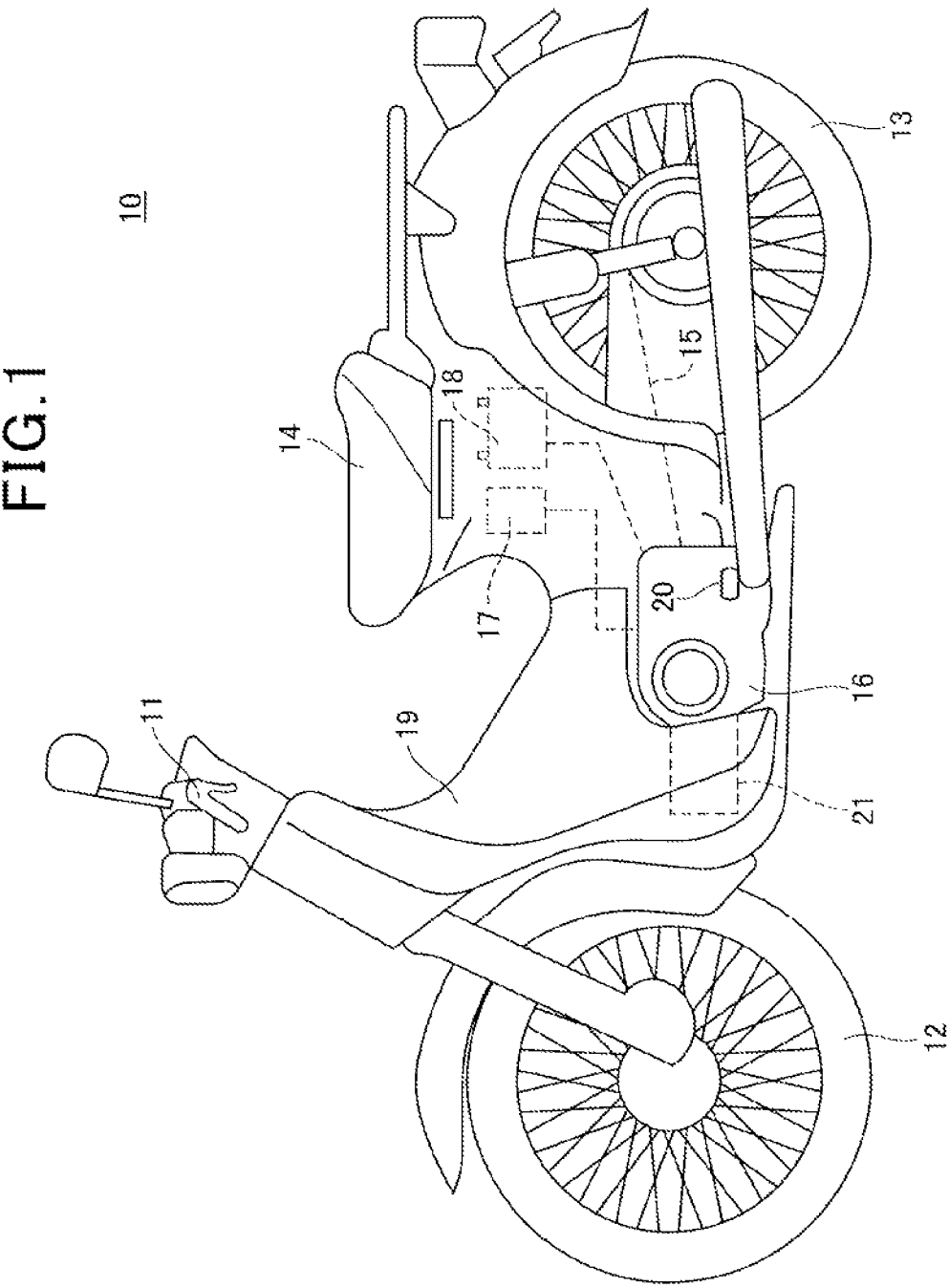
FIG. 1 is a left side view showing a motorcycle having a multiple plate clutch according to a first embodiment of the present invention.

FIG. 1 is a left-side view of a motorcycle having a multiple plate clutch according to a first embodiment of the present invention.

The motorcycle 10 has a handle 11 which is turnably pivotally supported by a head pipe (not shown), a front wheel 12 steered by the handle 11, a rear wheel 13 serving as a driving wheel, a seat 14 on which a driver sits, a power unit 16 for supplying driving force to the rear wheel 13 through a chain 15, a control unit 17 (controller) for controlling the power unit 16, and a battery 18.

The motorcycle 10 is configured with a vehicle body frame (not shown) as a base body, and the vehicle body frame is covered by a vehicle body cover 19. The control unit 17 and the battery 18 are disposed below the seat 14 in the vehicle body cover 18. The power unit 16 is provided substantially between the front wheel 12 and the rear wheel 13 and slightly in front of the lower side of the seat 14. A pair of right and left steps 20 for the driver are provided at the lower side of the power unit 16.

Figure 2:
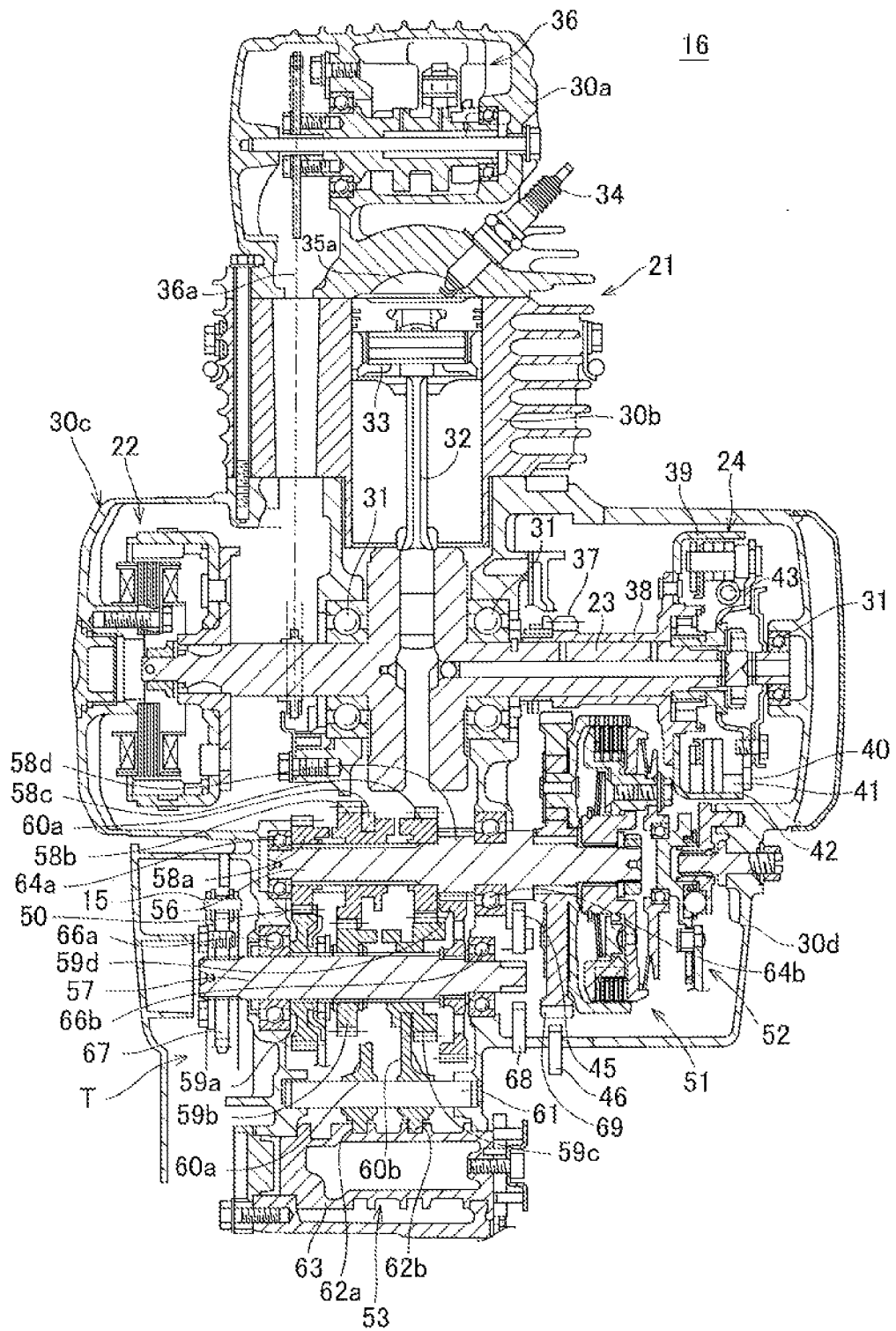
FIG. 2 is a cross-sectional plan view of a power unit.

The power unit 16 has an automatic transmission mechanism T (FIG. 2). The automatic transmission mechanism T has a transmission T for which clutch engagement(connection)/release operation is automated, and in this automatic transmission mechanism T, switching of the clutch mechanism 51 for gear shift and switching of a shift gear stage (shift) are automatically performed.

Next, the construction of the power unit 16 will be described.

FIG. 2 is a cross-sectional plan view of the power unit 16. In FIG. 2, the right-and-left-direction corresponds to the vehicle width direction, the upward direction corresponds to the forward direction of the vehicle, and the downward direction corresponds to the rearward direction of the vehicle.

The power unit 16 has an engine 21 for generating driving force for traveling, an electric generator 22, a starting clutch 24 provided to the crankshaft 23 of the engine 21, and an automatic transmission mechanism T for gear-shifting the driving force of the crankshaft 23 output through the starting clutch 24 and outputting the gear-shift driving force.

The power unit 16 is constructed by integrally coupling a cylinder head 30a, a cylinder 30b and a crankcase 30c. The crankshaft 23 is pivotally supported by plural bearings 31 so as to be freely rotatable. The engine 21 has a piston 33 connected to the crankshaft 23 through a connection rod 32, an ignition plug 34, and a valve gear mechanism 36 for performing intake and exhaust on a combustion chamber 35 by opening/closing a valve (not shown). The valve gear mechanism 36 is driven through a timing chain 36a by the crankshaft 23.

The starting clutch 24 performs connection and disconnection between the crankshaft 23 and a primary gear 37 at the start time and the stop time, and is disposed at the right end portion of the crankshaft 23. The starting clutch 24 has a cup-shaped outer case 39 fixed to one end of a sleeve 38 which is rotatable relatively to the outer periphery of the crankshaft 23, the primary gear 37 provided to the sleeve 38, an outer plate 40 fixed to the right end portion of the crankshaft 23, a shoe 42 which is secured to the outer peripheral portion of the outer plate 40 through a weight 41 so as to face the outside in the radial direction, and a spring 43 for urging the shoe 42 inwards in the radial direction. In the starting clutch 24, when the number of rotations of the engine is equal to a predetermined value or less, the outer case 39 and the shoe 42 are separated from each other, and thus the crankshaft 23 and the automatic transmission T are set to be released from each other (a separation state under which no driving force is transmitted). When the engine rotation number increases and exceeds a predetermined value, the weight 41 is moved outwards in the radial direction against the spring 43 by centrifugal force, whereby the shoe 42 comes into contact with the inner peripheral surface of the outer case 39. Accordingly, the rotation of the crankshaft 23 is transmitted to the primary gear 37 through the outer case 39, and a connection state where the driving force is transmitted is established.

The crankcase 30c has, at a right side face thereof, a crankcase cover 30d which covers the starting clutch 24 and the clutch mechanism 51 for gear shift (multiple plate clutch). When the crankcase cover 30d is removed, the starting clutch 24 and the clutch mechanism 51 for gear shift are exposed to the outside.

The automatic transmission mechanism T has a forward 4-stage transmission 50, a clutch mechanism 51 for gear shift for switching the connection between the crankshaft 23 side and the transmission 50, a clutch operating mechanism 52 for operating the clutch mechanism 51 for gear shift, a gear shift mechanism 53 for gear-changing the transmission 50, and an actuator mechanism 54 (FIG. 1) for driving the clutch operating mechanism 52 and the gear shift mechanism 53. The actuator mechanism 54 is controlled by a control unit 17 (FIG. 1).

The automatic transmission mechanism T is connected to a mode switch (not shown) for performing the switching operation between an automatic transmission (AT) mode and a manual transmission (MT) mode, and a shift select switch (not shown) with which the driver operates shift-up or shift-down. Under the control of the control unit 17, the automatic transmission mechanism T is configured to control the actuator mechanism 54 in accordance with output signals of each sensor, the mode switch and the shift select switch, whereby the shift stage of the transmission 50 can be automatically or semi-automatically switched.

That is, in the automatic transmission mode, the actuator mechanism 54 is controlled on the basis of the vehicle speed or the like, and gear shift is automatically performed in the transmission 50. In the manual transmission (MT) mode, the shift select switch is operated by the driver, whereby the gear shift is performed.

The transmission 50 gear shifts the rotation supplied from the clutch mechanism 51 for gear shift on the basis of an instruction of the control unit 17 and transmits the gear shift rotation to the rear wheel 13. The transmission 50 has a main shaft 56 (main shaft) as an input shaft, a countershaft 57 disposed in parallel to the main shaft 56, driving gears 58a, 58b, 58c and 58d provided to the main shaft 56, driven gears 59a, 59b, 59c and 59d provided to the countershaft 57, a shift fork 60a engaged with the driving gear 58a, a shift fork 60b engaged with the driven gear 59c, a support shaft 61 for holding the shift forks 60a, 60b so that the shift forks 60a, 60b are freely slidable in the axial direction, and a shift drum 63 for making the end portions of the shift forks 60a, 60b slide along grooves 62a, 62b. The driving gears 58a, 58b, 58c and 58d are respectively engaged with the driven gears 59a, 59b, 59c and 59d in this order. When the driving gear 58b slides to the right or left, a dog tooth on the side surface of the driving gear 58b is engaged with the adjacent driving gear 58c or 58a, and when the driven gear 59c slides to the right or left, a dog tooth on the side surface of the driven gear 59c is engaged with the adjacent driven gear 59d or 59b.

The driving gears 58a and 58c are held to be freely rotatable around the main shaft 56, and the driven gears 59b, 59d are held to be freely rotatable around the countershaft 57. The driving gear 58b and the driven gear 59c are spline-coupled with the main shaft 56 and the countershaft 57 and slidable in the axial direction. The driving gear 58d and the driven gear 59a are fixed to the main shaft 56 and the countershaft 57.

When the shift drum 63 is driven to be rotated by the actuator mechanism 54, the shift forks 60a, 60b are moved in the axial direction along the grooves 62a, 62b of the shift drum 63, and the driving gear 58b and the driven gear 59c slide in accordance with the shift stage.

In the transmission 50, a neutral state or power transmission which selectively uses a transmission gear pair of any one of 1-speed to 4-speed can be established between the main shaft 56 and the countershaft 57 in accordance with the slide of the driving gear 58b and the driven gear 59c.

The main shaft 56 and the countershaft 57 are freely rotatably held by bearings 64a, 64b, 66a, 66b.

A sprocket 67 is provided to the end portion of the countershaft 57, and the sprocket 67 transmits rotation to the rear wheel 13 through the chain 15. A vehicle speed sensor 68 for detecting the rotational speed of the countershaft 57 in a contactless style is provided in the neighborhood of the countershaft 57. The rotational speed of the countershaft 57 detected by the vehicle speed sensor 68 represents the speed of the vehicle.

The engine 21 has an input rotation sensor 45 for detecting the input rotation speed from the crankshaft 23 to the clutch mechanism 51 for gear shift, and an output rotation sensor 46 for detecting the output rotation speed of the main shaft 56. The motorcycle 10 has a throttle opening sensor (not shown) for detecting the opening degree of the throttle of an intake device. The vehicle speed sensor 68, the input rotation sensor 45, the output rotation sensor 46 and the throttle opening degree sensor supply the detection values to the control unit 17.

Figure 3:
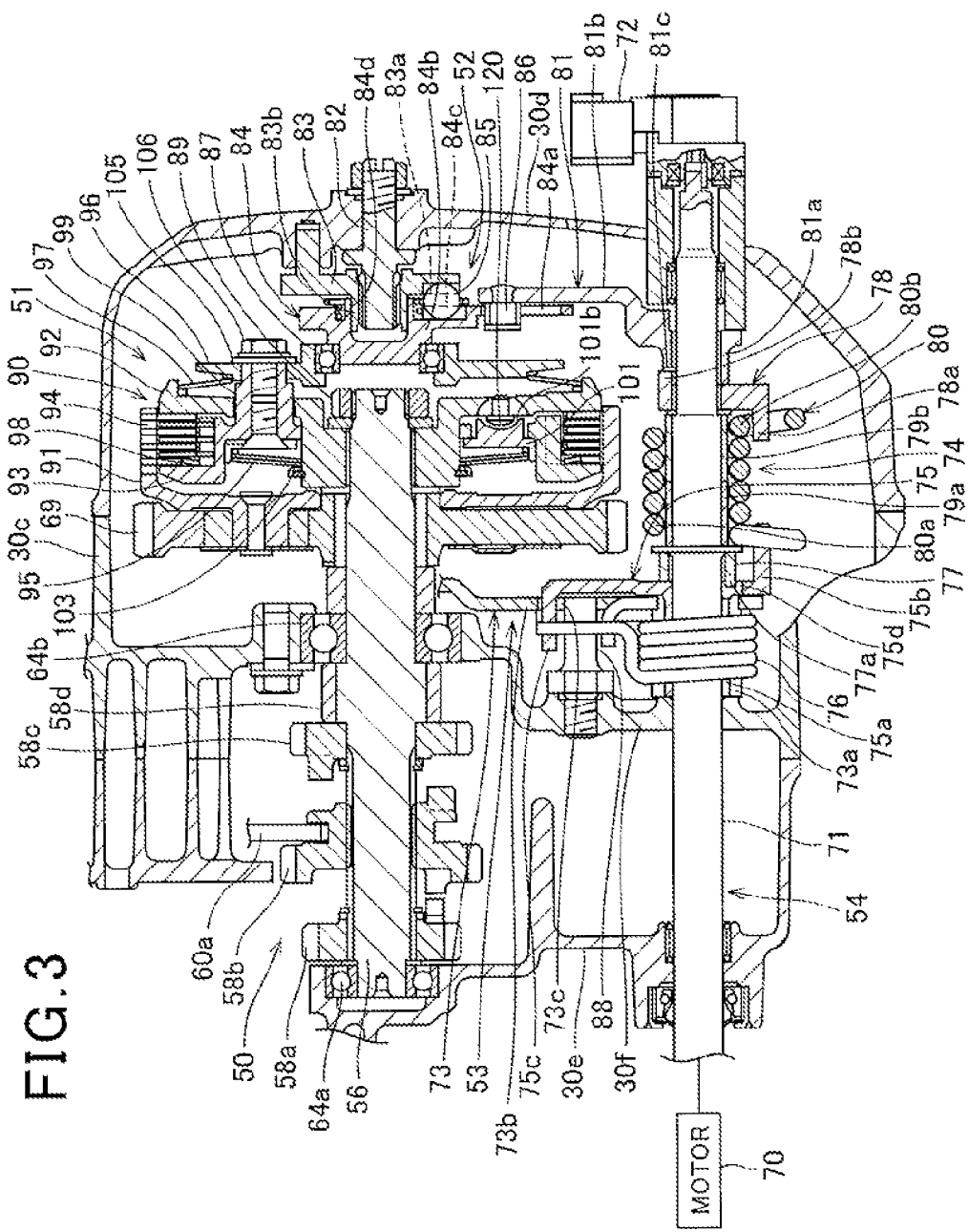
FIG. 3 is a cross-sectional view showing a gear shift mechanism, an actuator mechanism, a clutch mechanism for gear shift, and a clutch operating mechanism.

FIG. 3 is a cross-sectional view showing the gear shift mechanism 53, the actuator mechanism 54, the clutch mechanism 51 for gear shift and the clutch operating mechanism 52.

Referring to FIGS. 2 and 3, the actuator mechanism 54 has a motor 70, a shift spindle 71 extending in the vehicle width direction in the crankcase 30, and a train of gears (not shown) that decelerates the rotation of the motor 70 and drives the shift spindle 71.

The shift spindle 71 is pivotally supported at both the ends thereof by the left side wall 30e of the crankcase 30c and the crankcase cover 30d, and it is also pivotally supported at the intermediate portion thereof by an intermediate wall portion 30f for supporting a bearing 64b of the main shaft 56. The crankcase cover 30d is provided with an angle sensor 72 for detecting the rotation position of the shift spindle 71.

The gear shift mechanism 63 has a gear shift arm 73 supported by the shift spindle 71, and a power storage mechanism 74 that stores the power of the rotation of the shift spindle 71 and releases the stored power to turn the gear shift arm 73.

The gear shift arm 73 is connected to a shift drum 63, and the gear shift arm 73 is turned by the actuator mechanism 54, whereby the shift drum 63 is rotated and the gear shift is performed.

The power storage mechanism 74 has a turning arm 75 which is provided on the shaft of the shift spindle 71 so as to be rotatable relatively to the shift spindle 71, a return spring 76 which urges the gear shift arm 73 to a neutral position, a stopper collar which is fixed onto the shaft of the shift spindle 71 and rotates integrally with the shift spindle 71, a power storage collar 78 which is fixed onto the shaft of the shift spindle 71 at a position which is away from the stopper collar 77 in the axial direction and rotates integrally with the shift spindle 71, a pair of spring collars 79a, 79b which are provided on the shaft between the power storage collar 78 and the stopper collar 77 so as to be rotatable relatively to the shift spindle 71, and a power storage spring 80 which is provided so as to be wound around the outer peripheries of the spring collars 79a, 79b.

The turning arm 75 has an inner cylindrical portion 75a fitted to the outer peripheral surface of the shift spindle 71, an arm-side hook portion 75b which projects in the axial direction from the outer peripheral surface of the inner cylindrical portion 75a to the power storage spring 80 side, a press portion 75c which projects in the axial direction from the outer peripheral surface of the inner cylindrical portion 75a to the opposite side to the arm-side hook portion 75b, and a dog hole 75d which is opened to the stopper collar 77 side.

The gear shift arm 73 has an outer cylindrical portion 73a fitted to the outer peripheral surface of the inner cylindrical portion 75a of the turning arm 75, and an arm portion 73b extending outwards in the peripheral direction from the outer cylindrical portion 73a.

The gear shift arm 73 is provided rotatably relatively to the turning arm 75, and the press portion 75c of the turning arm 75 is inserted into a restricting opening portion 73c formed in the arm portion 73b of the gear shift arm 73.

The return spring 76 is a helical torsion spring, and provided so as to be wound around the outer cylindrical portion 73a of the gear shift arm 73 to urge the gear shift arm 73 to the neutral position through the press portion 75c. Here, the neutral position is a position under a normal state where the gear shift operation is not carried out. When the turning arm 75 is turned by only a predetermined angle, the restricting opening portion 73c presses the inner edge portion of the restricting opening portion 73c, and turns the gear shift arm 73. A pin 88 erected from the intermediate wall portion 30f is inserted in the restricting opening portion 73c, and the pin 88 restricts the turning range of the gear shift arm 73 through the restricting opening portion 73c.

The stopper collar 77 has a dog tooth 77a inserted in the dog hole 75d of the turning arm 75. When the stopper collar 77 rotates by only a predetermined angle in connection with the rotation of the shift spindle 71, the dog tooth 77a urges the turning arm 75 in the rotational direction through the inner edge of the dog hole 75d.

The power storage collar 78 has a collar-side hook portion 78a projecting in the axial direction to the power storage spring 80 side, and a clutch-side dog tooth 78b projecting in the axial direction to the opposite side to the collar-side hook portion 78a.

The power storage spring 80 is a helical torsion spring. One end of the power storage spring 80 is hooked to the arm-side hook portion 75b of the turning arm 75, and the other end of the power storage spring 80 is hooked to the collar-side hook portion 78a of the power storage collar 78.

The gear shift arm 73 and the turning arm 75 are constrained by the clutch mechanism 51 for gear shift by the transmission 50 and thus unturnable on the shift spindle 71 while the clutch mechanism 51 for gear shift is set to the engaged state and the driving force occurs in the transmission 50. When the shift spindle 71 is turned by the actuator mechanism 54 under the above state, the power storage collar 78 rotates relatively to the turning arm 75, and the power storage spring 80 is deformed because one end thereof is kept to be fixed to the arm-side hook portion 75b side and the other end thereof at the collar-side hook portion 78a side is turned, whereby power storage is started. Thereafter, when the clutch mechanism 51 for gear shift is released, the gear shift arm 73 and the turning arm 75 are allowed to be turnable, and the stored power is released, so that the gear shift arm 73 is pressed and turned through the press portion 75c of the turning arm 75 which is turned by the stored power of the power storing spring 80, whereby the shift drum 63 is rotated and the gear shift is performed.

When it is detected on the basis of the detection result of the angle sensor 72 that the gear shift is completed, the shift spindle 71 is inversely rotated, the gear shift arm 73 is returned to an original position, and the clutch mechanism 51 for gear shift is engaged.

In connection with the power storage, the power storing spring 80 is deformed so that the axial line of the coil-shaped portion thereof is inclined with respect to the axial line of the shift spindle 71, and both the end portions 80a, 80b of the coil-shaped portion come into contact with the spring collars 79a, 79b bisected in the axial direction, respectively. Specifically, those portions of both the end portions 80a, 80 which are different in the peripheral direction by substantially 180° come into contact with the spring collars 79a, 79b. In the first embodiment, the spring collars 79a, 79b are configured to be divided in the axial direction and turnable relatively to each other. Therefore, when both the end portions 8a, 80b come into contact with them, the spring collars 79a, 79b rotates independently of each other to release power. Therefore, friction when the power storage spring 80 is twisted to store power can be reduced, and power can be smoothly stored.

The clutch operating mechanism 52 has a clutch lever 81 which is pivotally supported turnably on the shift spindle 71, a support shaft 82 which is fixed to the inner surface of the crankcase cover 30d in a substantially coaxial positional relationship the main shaft 56, a plate-shaped base member 83 fixed to the support shaft 82, a lifter cam plate 84 as an operating member which is connected to the clutch lever 81 and provided to confront the base member 83, and plural balls 85 which are pinched between the lifter cam plate 84 and the base member 83.

The clutch lever 81 has a cylindrical portion 81a which is provided on the shift spindle 71 so as to be adjacent to the power storage collar 78, and a lever portion 81b extending outwards in the radial direction from the cylindrical portion 81a. A clutch-side dog hole 81c with which the clutch-side dog tooth 78b of the power storage collar 78 is engaged is formed in the cylindrical portion 81a.

The lifter cam plate 84 has a connection portion 84a connected to the pin 86 which is provided to the tip of the lever portion 81b of the clutch lever 81, and a press operating portion 84b which faces the base member 83. Cam portions 84c, 83a which are configured to have sloped faces are formed on the mutually confronting faces of the press operation portion 84b and base member 83, and the ball 85 is pinched between the cam portions 84c, 83a. The guide shaft 83b of the base member 83 is fitted in the guide hole 84d provided at the center of the lifter cam plate 84, whereby the movement in the axial direction of the lifter cam plate 84 is guided. Furthermore, a ball bearing 87 is provided at the tip portion of the press operating portion 84b, and the lifter cam plate 84 is connected to the clutch mechanism 51 for gear shift through the ball bearing 87.

When the clutch lever 81 is turned, the lifter cam plate 84 is turned around the guide shaft 83b through the pin 86, and the cam portion 84c slips on the ball 85, whereby the lifter cam plate moves in the axial direction. Interlocking with the movement in the axial direction of the lifter cam plate 84, the clutch mechanism 51 for gear shift is engaged or released.

The clutch-side dog hole 81c of the clutch lever 81 has a larger width in the peripheral direction than the clutch-side dog tooth 78b of the power storage collar 78, and the clutch-side dog tooth 78b does not press the clutch dog hole 81c in the peripheral direction and turns the clutch lever 81 until the power storage collar 78 is rotated by only a predetermined angle. Here, the predetermined angle of the power storage collar 78 is set to be larger than an angle at which the power storage spring 80 can store sufficient power. That is, in the first embodiment, after the power storage of the power storing spring 80 is completed, the clutch lever 81 is turned, and the clutch mechanism 51 for gear shift is released, so that stored power is released. Therefore, the gear shift can be quickly performed.

Figure 4:
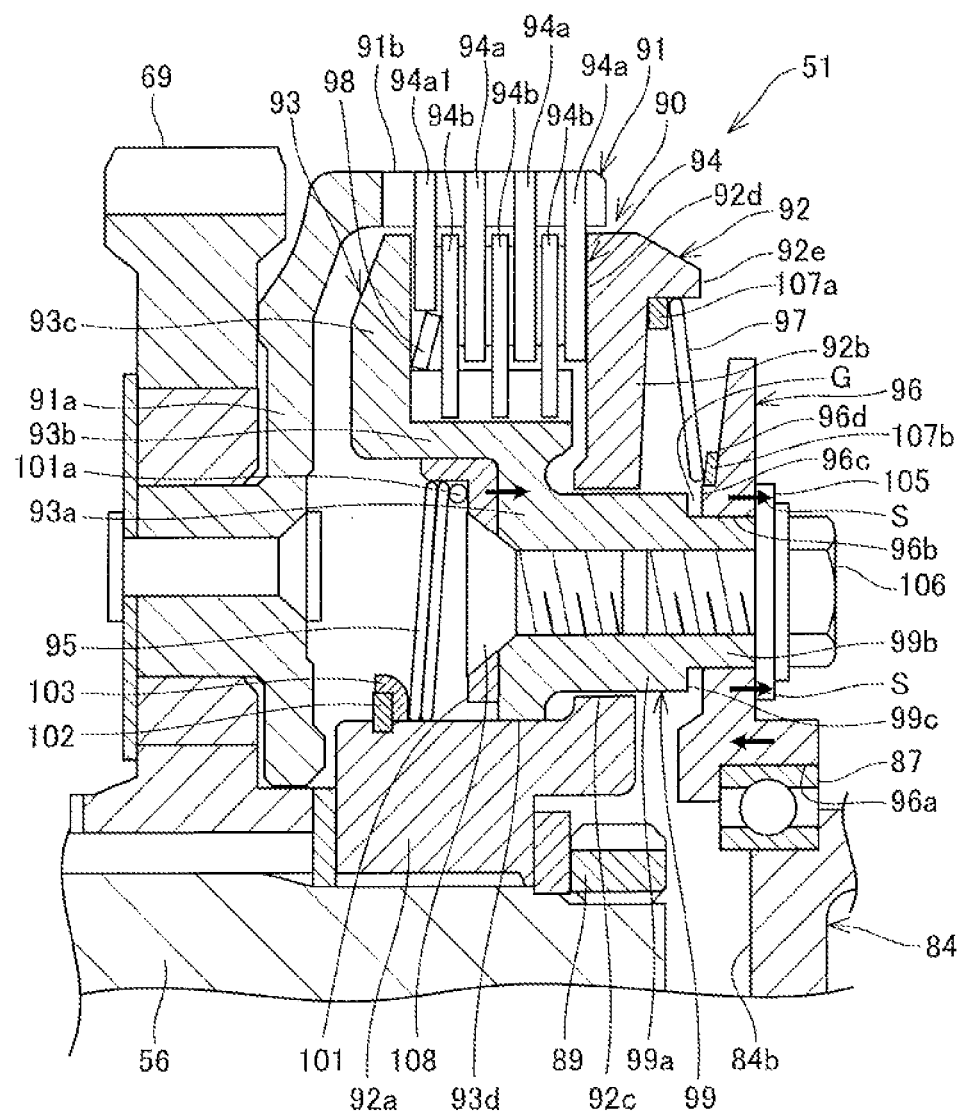
FIG. 4 is a cross-sectional view showing the clutch mechanism for gear shift.

FIG. 4 is a cross-sectional view showing the clutch mechanism 51 for gear shift.

As shown in FIGS. 2 to 4, a primary driven gear 69 which is engaged with the primary gear 37 of the crankshaft 23 is pivotally supported at the shaft end of the main shaft 56 so as to be rotatable relatively to the main shaft 56.

The clutch mechanism 51 for gear shift has a cup-shaped clutch outer 91 fixed to the primary driven gear 69, a clutch center 92 which is provided at the inside of the clutch outer 91 in the radial direction and integrally fixed to the main shaft 56, a pressure plate 93 which movable in the axial direction of the main shaft 56, a clutch plate 94 provided between the pressure plate 93 and the clutch center 92, a main spring 95 for urging the pressure plate 93 in the clutch engaging direction, a lifter plate 96 for moving the pressure plate 93 in the clutch releasing direction, a sub spring 97 pinched between the lifter plate 96 and the clutch center 92, and a judder spring 98 pinched between the clutch plate 94 and the pressure plate 93. The clutch center 92 and the pressure plate 93 are assembled and unified, and constitutes a clutch inner 90 disposed inside the clutch outer 91.

The clutch outer 91 has a disc portion 91a which is integrally fixed to the outer surface of the primary driven gear 69, and an outer cylindrical portion 91b extending from the peripheral edge portion of the disc portion 91a in a substantially coaxial positional relationship with the main shaft 56. The clutch outer 91 is rotatable relatively to the main shaft 56 integrally with the primary driven gear 69.

The clutch center 92 has a cylindrical hub portion 92a fixed to the main shaft 56, and a disc-shaped receiving plate portion 92b extending outwards in the radial direction from the axial end portion of the hub portion 92a till a neighborhood of the inner peripheral surface of the clutch outer 91. A support hole 92c in which a part of the pressure plate 93 is inserted is formed in the receiving plate portion 92b. A plurality of support holes 92c are formed to be arranged in the peripheral direction of the receiving plate portion 92b. Furthermore, the receiving plate portion 92b has a reception face 92d which is provided at the outer peripheral portion of the receiving plate portion 92b and receives the clutch plate 94, and has a spring holding convex portion 92e which is provided on the surface opposite to the reception surface 92d and annularly projects to the lifter plate 96 side along the outer peripheral portion. The clutch center 92 is fixed to the main shaft 56 by spline engagement and a nut 89, so that it is unrotatable relatively to the main shaft 56 and unmovable in the axial direction.

The pressure plate 93 has an inner disc portion 93a which is disposed to confront the receiving plate portion 92b of the clutch center 92 inside the clutch outer 91, an inner cylindrical portion 93b which extends from the peripheral edge portion of the inner disc portion 93a to the disc portion 91a side of the clutch outer 91 in a substantially coaxial positional relationship with the main shaft 56, and a press plate portion 93c extending outwards in the radial direction from the tip portion of the inner cylindrical portion 93b to a neighborhood of the inner peripheral surface of the clutch outer 91. The pressure plate 93 is formed to be rotatable relatively to the clutch center 92 by only a predetermined rotational angle.

A fitting hole 93d which is freely slidably fitted to the outer peripheral surface of the hub portion 92a of the clutch center 92 is formed in the inner disc portion 93a. A release boss 99 which penetrates through the support hole 92c of the clutch center 92 and extends to the lifter plate 96 side is formed around the fitting hole 93d in the inner disc portion 93a.

A plurality of release bosses 99 are formed to be arranged at substantially equal intervals in the peripheral direction of the inner disc portion 93a. The release boss 99 has a column portion 99a inserted in the support hole 92c and a guide shaft portion 99b formed to be smaller in diameter than the column portion 99a at the tip portion, and a step portion 99c having a larger diameter than the guide shaft portion 99b is formed at the boundary portion between the guide shaft portion 99b and the column portion 99a.

A stopper plate 105 constructed by a washer having a larger diameter than the guide shaft portion 99b is provided to the tip surface of the guide shaft portion 99b, and the stopper plate 105 is fixed to the release boss 99 by a fixing bolt which is screwed to the tip surface of the guide shaft portion 99b.

The clutch plate 94 has outer friction plates 94a provided to the clutch outer 91, and inner friction plates 94b provided to the clutch center 92, and a plurality of outer friction plates 94a and a plurality of inner friction plates 94b are alternately stacked and arranged between the pressure plate 93 and the clutch center 92. Each outer friction plate 94a is supported on the outer cylindrical portion 91b of the clutch outer 91 through spline engagement, and it is provided so as to be movable in the axial direction of the clutch outer 91 and unrotatable relatively to the clutch outer 91.

Each inner friction plate 94b is supported on the outer peripheral surface of the inner cylindrical portion 93b of the pressure plate 93 through spline engagement, and it is provided so as to be movable in the axial direction of the pressure plate 93 and unrotatable relatively to the pressure plate 93.

An outer friction plate 94a1 which is directly in contact with the press plate portion 93c of the pressure plate 93 out of the outer friction plates 94a is larger in diameter at the inner peripheral portion 100 thereof than the other outer friction plates 94a, and a judder spring 98 is provided between the inner peripheral portion 100 and the inner cylindrical portion 93b. The judder spring 98 is a ring-shaped disc spring, and presses each inner friction plate 94b and each outer friction plate 94a except for the outer friction plate 94a1 to the receiving plate portion 92b side of the clutch center 92.

A plate-shaped back torque limit member 101 is fixed to the inner disc portion 93a inside the inner cylindrical portion 93b of the pressure plate 93. The back torque limit member 101 is fixed by a bolt 108 which is provided coaxially with the fixing bolt 106.

The back torque limit member 101 and a lifter pin 120 fixed to the receiving plate portion 92b of the clutch center 92 constitutes a back torque limiter mechanism. The back torque limiter mechanism is a publicly known technique disclosed in JP-H08-93786, for example, and it is a mechanism for setting the clutch from the engagement state to a half clutch (partial engagement) state when a torque having a predetermined value or more acts in the opposite direction to power transmission in a forward direction.

The back torque limit member 101 has a cam portion 101b which penetrates through the pressure plate 93 and is fitted to the lifter pin. When back torque of a predetermined value or more acts from the rear wheel 13 side, the pressure plate 93 rotates relatively to the clutch center 92, whereby the cam portion 101b slides on the lifter pin 120, and the pressure plate 93 moves in the clutch release direction. According to the back torque limit mechanism, shift shock caused by back torque can be reduced.

A ring-shaped clip 102 is press-fitted in the outer peripheral surface at the disc portion 91a side of the hub portion 92a of the clutch center 92, and the clip 102 supports a ring-shaped retainer 103 for receiving the main spring 95.

The main spring 95 is a ring-shaped disc spring, and pinched between the back torque limit member 101 at the pressure plate 93 side and the retainer 103. Specifically, the main spring 95 is disposed between the hub portion 92a of the clutch center 92 and the inner cylindrical portion 93b of the pressure plate 93, and the outer diameter portion of the main spring 95 is supported by the back torque limit member 101 through the spring receiving member 101a while the inner diameter portion of the main spring 95 is supported by the retainer 103.

The main spring 95 urges the pressure plate 93 in the direction along which the clutch plate 94 is pinched by the pressure plate 93 and the clutch center 92, that is, in the clutch engaging direction.

The lifter plate 96 is formed to be disc-shaped, and disposed between the clutch center 92 and the lifter cam plate 84 (FIG. 3). The lifter plate 96 has a bearing support hole portion 96a in which a ball bearing 87 is fitted, and a hole portion 96b in which the release boss 99 of the pressure plate 93 is inserted.

The outer wheel of the ball bearing 87 is fitted in the bearing support hole portion 96a, and the inner wheel of the ball bearing 87 is fitted on the outer peripheral surface of the press operation portion 84b of the lifter cam plate 84. Therefore, the lifter plate 96 is movable in the axial direction together with the lifter cam plate 84, and rotatable relatively to the lifter cam plate 84.

The hole portion 96b is a hole having a smaller diameter than the stopper plate 105 and the step portion 99c, and a contact face 96c which is substantially parallel to the step portion 99c is formed at the peripheral edge portion of the hole portion 96b.

A plurality of hole portions 96b are formed around the bearing support hole portion 96a provided to the center portion of the lifter plate 96. Each hole portion 96b is fitted to the guide shaft portion 99b of each release boss 99. Each hole portion 96b is fitted to the guide shaft portion 99b, and then the stopper plate 105 and the fixing bolt 106 are fixed, whereby the lifter plate 96 is connected to the pressure plate 93.

The lifter plate 96 has a sub spring receiving portion 96d for receiving the sub spring 97 on a surface thereof which confronts the receiving plate portion 92b of the clutch center 92. The sub spring receiving portion 96d is located at an outside of each hole portion 96b in the radial direction.

The sub spring 97 is a ring-shaped disc spring, and pinched between the sub spring receiving portion 96d of the lifter plate 96 and the receiving plate portion 92b of the clutch center 92. Specifically, the outer diameter portion of the sub spring 97 is supported by the clutch center 92 through a supporting member 107a disposed at the inside of the spring holding convex portion 92e, and the inner diameter portion of the sub spring 97 is supported by the lifter plate 96 through a supporting member 107b disposed at the sub spring receiving portion 96d.

The sub spring 97 urges the lifter plate 96 in such a direction that the lifter plate 96 comes into contact with a stopper plate 105 while the clutch center 92 fixed to the main shaft serves as a spring seat. The urging force of the sub spring 97 is transmitted to a pressure plate 93 through the lifter plate 96, the stopper plate 105 and the fixing bolt 106, and the pressure plate 93 presses the clutch plate 94 in such a way that the pressure plate 93 is pulled to the sub spring 97 side. That is, the urging direction of the sub spring 97 is identical to the urging direction of the main spring 95, which is the clutch engagement direction.

The lifter plate 96 also functions as a sub pressure plate for urging the pressure plate 93 in the clutch engagement direction through the sub spring 97.

Under the clutch engagement state, the clutch plate 94 is pinched by the urging force of the main spring 95 and the sub spring 97, and the rotation of the clutch outer 91 which is rotated by the primary gear 37 is enabled to be transmitted to the clutch center 92 through the clutch plate 94, so that the main shaft 56 is rotated integrally with the clutch center 92.

When the pressure plate 93 is moved against the urging force of the main spring 95 and the sub spring 97 through the lifter cam plate 84, the pinching of the clutch plate 94 is released, whereby the clutch release state is set.

The thickness of the portion corresponding to the contact face 96c of the lifter plate 96 is set to be smaller than the length of the guide shaft portion 99b, and a gap G is formed between the step portion 99c of the release boss 99 and the contact face 96c under the clutch engagement state.

When the clutch lever 81 is turned in connection with the shift spindle 71 and thus the lift cam plate 84 is moved in the axial direction, the lifter plate 96 is pressed through the ball bearing 87 and lifted so as to be away from the stopper plate 105, whereby the lifter plate 96 is moved to the clutch center 92 side so that the gap G is reduced.

Figure 5:
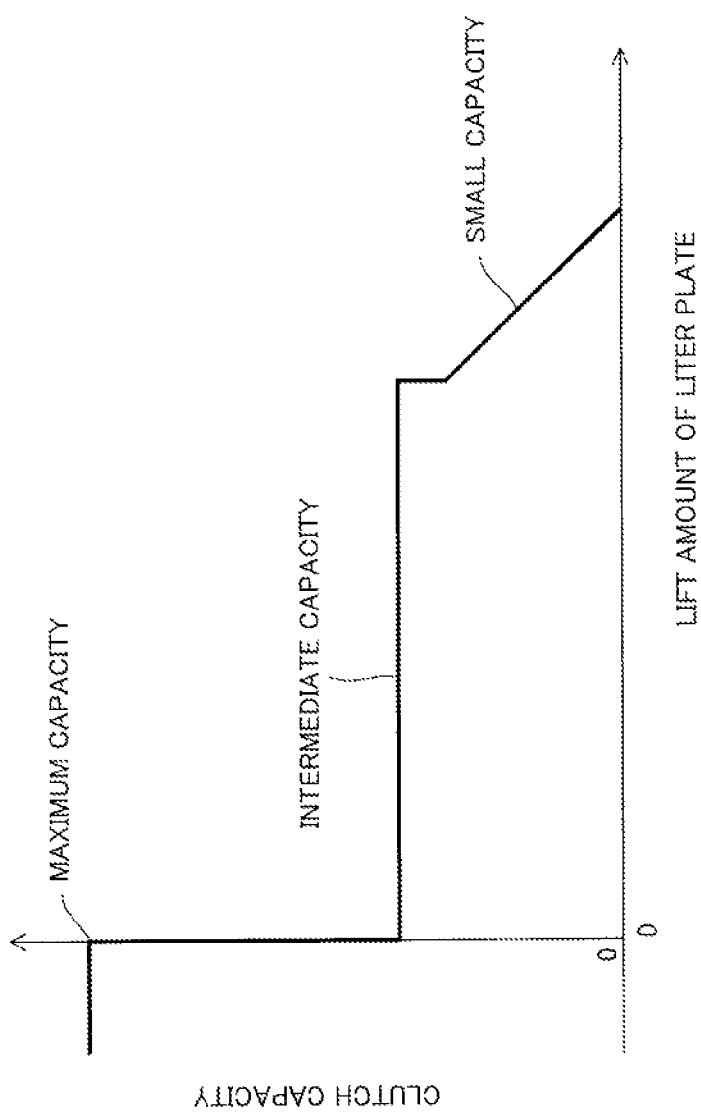
FIG. 5 is an example of a diagram showing the clutch capacity of the clutch mechanism for gear shift.

FIG. 5 is an example of a diagram showing the clutch capacity of the clutch mechanism 51 for gear shift.

As shown in FIG. 5, in the first embodiment, the capacity of the clutch mechanism 51 for gear shift is made variable by changing a spring which contributes to the clutch capacity. Specifically, the clutch capacity is variable at plural stages among a maximum capacity at which the clutch capacity is determined by the urging force of the main spring 95 and the sub spring 97, an intermediate capacity at which the clutch capacity is determined by the urging force of the main spring 95 and a small capacity at which the clutch capacity is determined by the urging force of the judder spring 98 pressed by the main spring 95.

The maximum capacity of the clutch capacity is obtained under the clutch engagement state shown in FIG. 4, and under this state, the lifter plate 94 is in contact with the stopper plate 105, and the urging force of the sub spring 97 is transmitted to the pressure plate 93 through the lifter plate 96 and the stopper plate 105. Therefore, the urging force of the pressure plate 93 with which the clutch plate 94 is pressed is equal to the sum of the urging force of the main spring 95 and the urging force of the sub spring 97, and thus it becomes the maximum force.

That is, the lifter plate 96 and the stopper plate 105 constitutes a sub spring load transmission passage S for transmitting the urging force of the sub spring 97 to the pressure plate 93.

Figure 6:
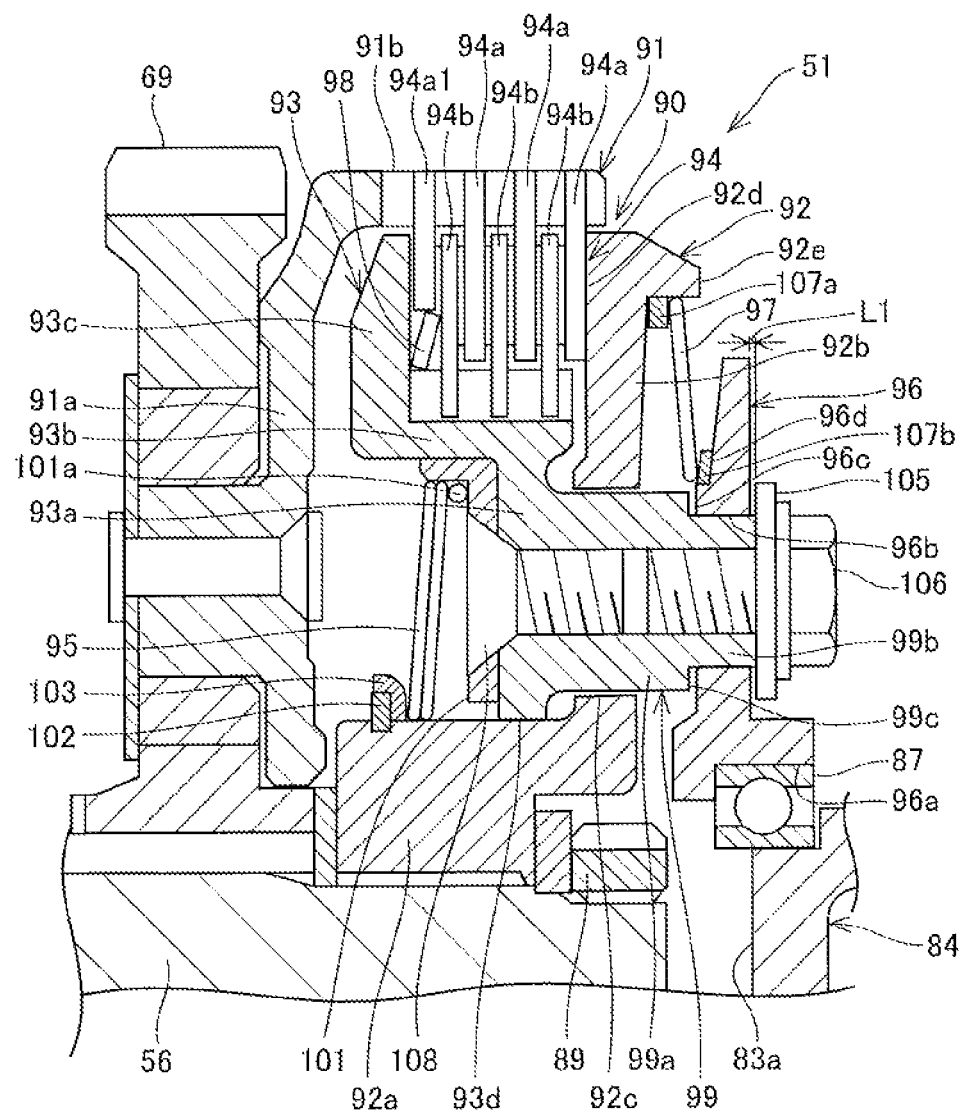
FIG. 6 is a cross-sectional view showing the clutch mechanism for gear shift under an intermediate-capacity state.

FIG. 6 is a cross-sectional view showing the clutch mechanism 51 for gear shift under the intermediate capacity state.

When the lifter cam plate 84 is moved in the clutch release direction in connection with the rotation of the shift spindle 71 by the actuator mechanism 54 (FIG. 3), the lifter plate 96 is lifted against the urging force of the sub spring 97 to the step portion 99c side along the guide shaft portion 99b, and separated from the stopper plate 105 as shown in FIG. 6.

The lifter plate 96 is separated from the stopper plate 105, so that the sub spring load transmission passage S is cut off, the urging force of the sub spring 97 is not transmitted to the pressure plate 93, and the clutch capacity is determined by only the main spring 95. Therefore, as shown in FIG. 5, the clutch capacity decreases from the maximum capacity to the intermediate capacity instantaneously when the lifter plate 96 separates from the stopper plate 105. A first predetermined lift amount L1 (first predetermined amount) of the lifter plate 96 at which the sub spring load transmission passage S is cut off may be set to be larger than zero, and it is determined by the dimensional precision of each part, etc.

When the movement of the lifter cam plate 84 is continued after the lifter plate 96 separates from the stopper plate 105, the lifter plate 96 continues to further move to the step portion 99c side. The section from the separation of the lifter plate 96 from the stopper plate 105 till the contact of the lifter plate 96 with the step portion 99c corresponds to an intermediate-capacity section. In this section, the lifter plate 96 merely moves relatively to the step portion 99c, and has no effect on the load of the main spring 95. Therefore, as shown in FIG. 5, the clutch capacity is determined by only the main spring 95 in the intermediate-capacity section, and the intermediate capacity is fixed. In the first embodiment, a backlash based on the gap G is provided. The section in which the intermediate capacity is obtained can be set to be long, and the clutch capacity can be made variable without any highly precise part and control method.

Figure 7:
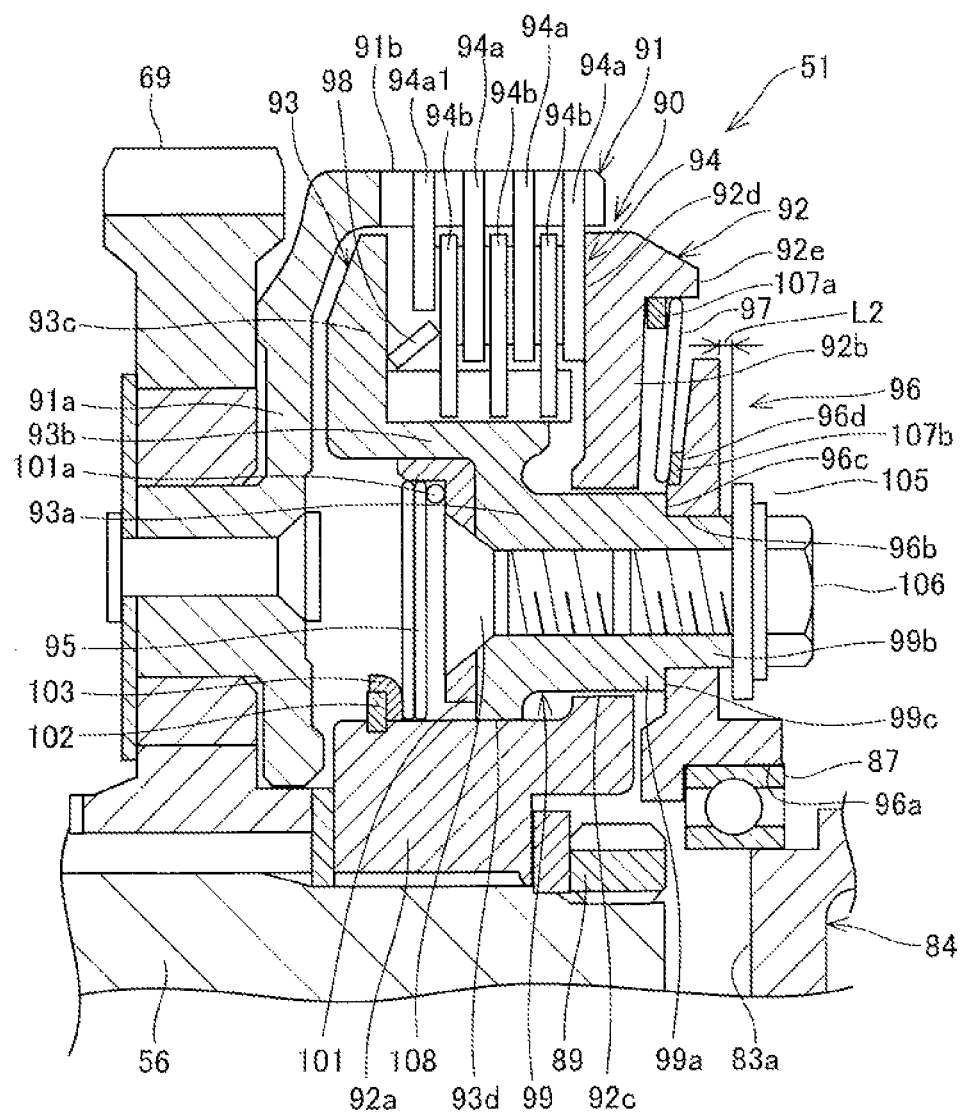
FIG. 7 is a cross-sectional view showing the clutch mechanism for gear shift under a small-capacity state.

FIG. 7 is a cross-sectional view showing the clutch mechanism 51 for gear shift under the small-capacity state.

When the lifter plate 96 is moved by only a second predetermined lift amount L2 (second predetermined amount) by the lifter cam plate 84 and thus the lifter plate 96 comes into contact with the step portion 99c as shown in FIG. 7, the pressure plate 93 is pressed by the lifter plate 96, and moves in the clutch release direction against the urging force of the main spring 95. A small-capacity section is the section from the contact of the lifter plate 96 with the step portion 99c till the perfect release of the clutch.

When the pressure plate 93 moves and the press plate portion 93c separates from the outer friction plate 94a1, the judder spring 98 determines the clutch capacity. The judder spring 98 presses the clutch plates 94 excluding the outer friction plate 94a1 through the inner friction plate 94b which is adjacent to the outer friction plate 94a1. The compression state of the judder spring 98 is gradually released as the pressure plate 93 moves to the clutch release direction, so that the clutch capacity in the small-capacity section moderately decreases. Therefore, the torque variation in the neighborhood of the clutch release can be suppressed, and thus shift shock can be reduced. When the judder spring 98 separates from the pressure plate 93 or the clutch plate 94, the clutch capacity is equal to zero.

Figure 16:
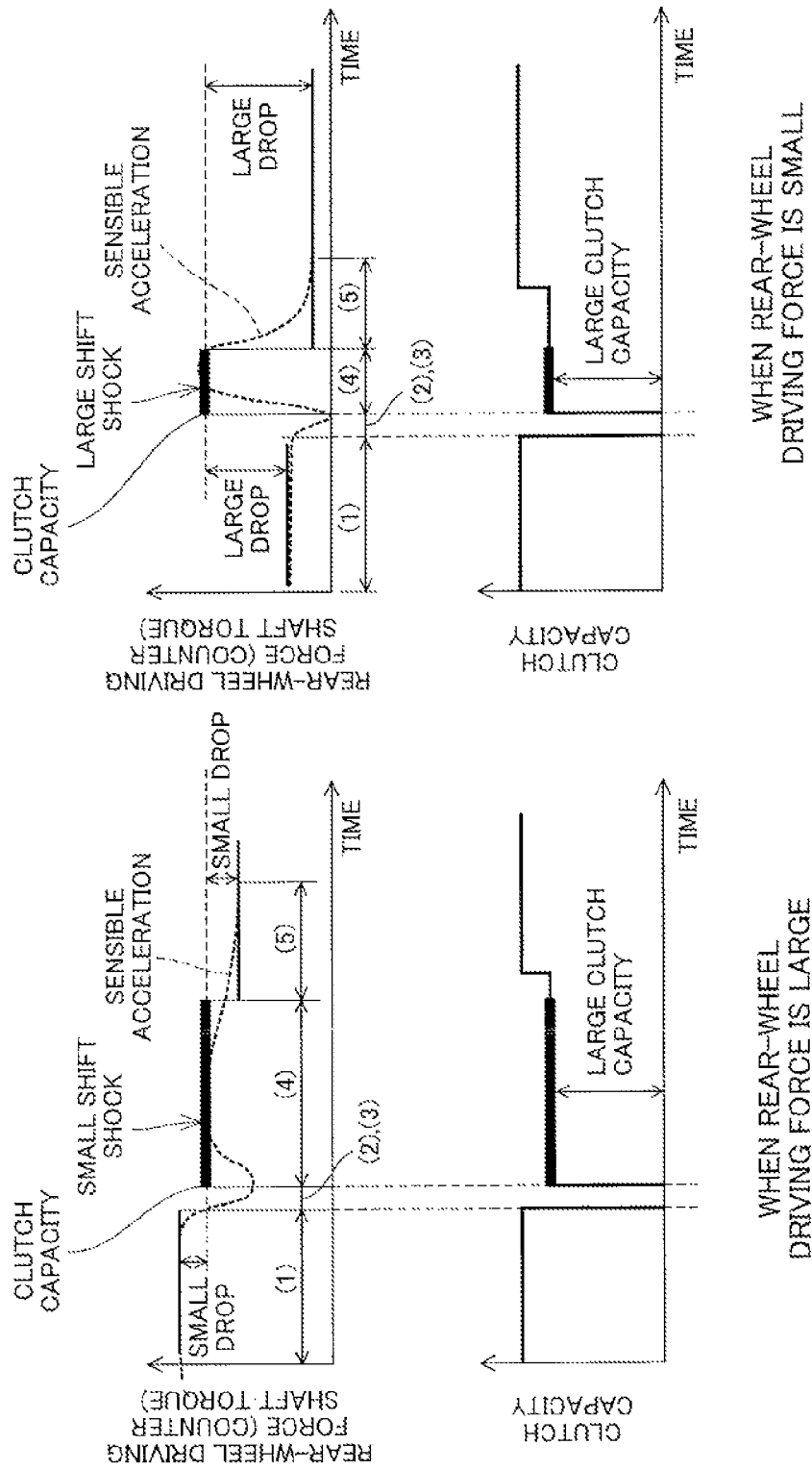
FIG. 16 is a diagram showing a background art.

When automatic transmission is performed, the control unit 17 operates the actuator mechanism 54 on the basis of the torque of the countershaft 57, and selects the clutch capacity which can reduce the shift shock. For example, when shift-up from 1-speed to 2-speed is performed, the control unit 17 selects the clutch capacity of the maximum capacity or the intermediate capacity on the basis of the detected torque of the countershaft 57 before gear shift so as to reduce the shift shock, and engages the clutch mechanism 51 for gear shift with the selected clutch capacity after the train of gears of the transmission 50 is shifted. Specifically, as shown at the left side of the paper surface of FIG. 16, the clutch capacity is selected so that the clutch capacity of the clutch mechanism 51 for gear shift is not so away from the gap between the countershaft torque before gear shift and the countershaft torque after gear shift or the band thereof.

Accordingly, the difference in rotation between the countershaft 57 side and the crankshaft 23 side can be properly absorbed by the clutch mechanism 51 for gear shift, and the shift shock can be reduced. Here, the toques of the countershaft 57 before and after gear shift are determined on the basis of a map in which the relationship of the engine speed, the throttle opening degree and the toque of the countershaft 57 is stored, for example.

As described above, according to the first embodiment to which the present invention is applied, the sub spring 97 for urging the pressure plate 93 in the clutch engagement direction through the lifter plate 96 is provided between the clutch center 92 fixed in the axial direction of the main shaft 56 and the lifter plate 96 for lifting the pressure plate 93 in the clutch release direction, and the urging force of the sub spring 97 to the pressure plate 93 is cut off by lifting the lifter plate 96 by the first predetermined lift amount L1 or more. Therefore, the clutch engaging load can be secured by the main spring 95 and the sub spring 97 which act in the clutch engagement direction, and also the lifter plate 96 is lifted under gear shift, whereby the urging force of the sub spring 97 to the pressure plate 93 is cut off, and the engagement load of the clutch can be produced by only the main spring 95. Accordingly, the clutch capacity can be set to plural stages of the maximum capacity under the clutch engagement state and the intermediate capacity under the state that the lifter plate 96 is lifted, so that the clutch mechanism 51 for gear shift in which the shift shock can be reduced by changing the clutch capacity can be implemented with a simple construction. According to the clutch mechanism 51 for gear shift, even when the system parts for controlling the intermediate capacity of the clutch and the control method are relatively simple, the intermediate capacity of the clutch can be easily matched with a set value.

The pressure plate 93 is provided with the release boss 99 extending to the lifter plate 96 side, and the stopper plate 105 fixed to the end portion of the release boss 99, the lifter plate 96 is provided with the hole portion 96b having a smaller diameter than the stopper plate 105, and the release boss 99 is inserted in the hole portion 96b. Therefore, the construction of cutting off the urging force of the sub spring 97 to the pressure plate 93 can be implemented with reducing the number of parts at maximum. Furthermore, the lifter plate 96 functions as a sub pressure plate which is separate from the pressure plate 93 and displaceable relatively to the pressure plate 93, the sub spring load transmission passage S is provided so that the sub spring 97 presses the pressure plate 93 through the lifter plate 96, and the lifter plate 96 separates from the stopper plate 105 of the pressure plate 93 when the lifter plate 96 lifts by the first predetermined lift amount or more, thereby cutting off the sub spring load transmission passage S. Therefore, the sub spring load transmission passage S can be provided with a simple construction.

The clutch mechanism 51 for gear shift has the clutch outer 91 disposed at the outside of the clutch center 92 in the radial direction, and the plural clutch plates 94 are configured so that the outer friction plates 94a provided to the clutch outer 91 and the inner friction plates 94b provided to the clutch center 92 are alternately arranged between the clutch center 92 and the pressure plate 93, the main spring 95 is disposed at the opposite side to the lifter plate 96 in the axial direction and between the hub portion 92a of the clutch center 92 and the pressure plate 93, and the main spring 95 and the sub spring 97 can be disposed at both the sides of the clutch center 92. Therefore, the number of parts serving as seats of the main spring 95 and the sub spring 97 can be reduced, and the main spring 95 and the sub spring 97 can be compactly disposed.

Furthermore, the sub spring 97 is disposed at the outside of the release boss 99 of the pressure plate 93 in the radial direction and provided as a ring-shaped disc spring. Therefore, the sub spring 97 can be provided with a small number of parts, and the degree of freedom for the design of the sub spring 97 can be secured by utilizing a space at the outside of the release boss 99 in the radial direction, so that the load of the sub spring 97 can be easily secured.

The step portion 99c having a larger diameter than the hole portion 96b of the lifter plate 96 is provided at the pressure plate 93 side of the release boss 99 of the pressure plate 93, and when the lifter plate 96 is lifted by only the second predetermined lift amount L2, the lifter plate 96 comes into contact with the step portion 99c, and directly moves the pressure plate 93. Therefore, the clutch can be released with a simple construction while the construction for cutting off the urging force of the sub spring 97 is provided.

Furthermore, the judder spring 98 for urging the clutch plate 94 in the engagement direction is provided between the pressure plate 93 and the clutch plate 94. Therefore, in a state near to the clutch release state, the capacity of the clutch is determined by the judder spring 98, and gradually decreases due to the movement of the pressure plate 93 in the clutch release direction. Therefore, the clutch capacity can be moderately reduced from the intermediate capacity to the clutch release, and the torque variation of the countershaft 57 can be moderated in the neighborhood of the clutch release state. Therefore, the shift shock can be reduced.

The first embodiment described above is an example to which the present invention is applied, and the present invention is not limited to the above embodiment.

In the first embodiment, the main spring 95 and the sub spring 97 are described as the disc springs. However, the present invention is not limited to this style, and they may be coil springs, for example. The back torque limit member 101 is configured to be fixed to the pressure plate 93 by the bolt 108. However, the back torque limit member 101 may be provided with a convex portion protruding in the radial direction, and a concave portion which is engaged with the convex portion may be formed in the pressure plate 93, whereby the back torque limit member 101 is fixed to the pressure plate 93 by a circlip while the rotation thereof is stopped. The back torque limit member 101 and the pressure plate 93 are described as separate bodies. However, they may be formed integrally with each other.

Second Embodiment

A second embodiment to which the present invention is applied will be described hereunder with reference to FIGS. 8 to 11. In the second embodiment, those parts which are configured to have the same constructions as the first embodiment are represented by the same reference numerals, and the descriptions thereof are omitted.

In the first embodiment, the sub spring 97 is pinched between the lifter plate 96 and the clutch center 92. However, the second embodiment is different from the first embodiment in that a sub pressure plate 210 which is separate from the lifter plate 296 is provided at the opposite side to the lifter plate 296 through the pressure plate 293, and the sub pressure plate 210 is urged by a sub spring 297 provided at the same side as the main spring 295.

Figure 8:
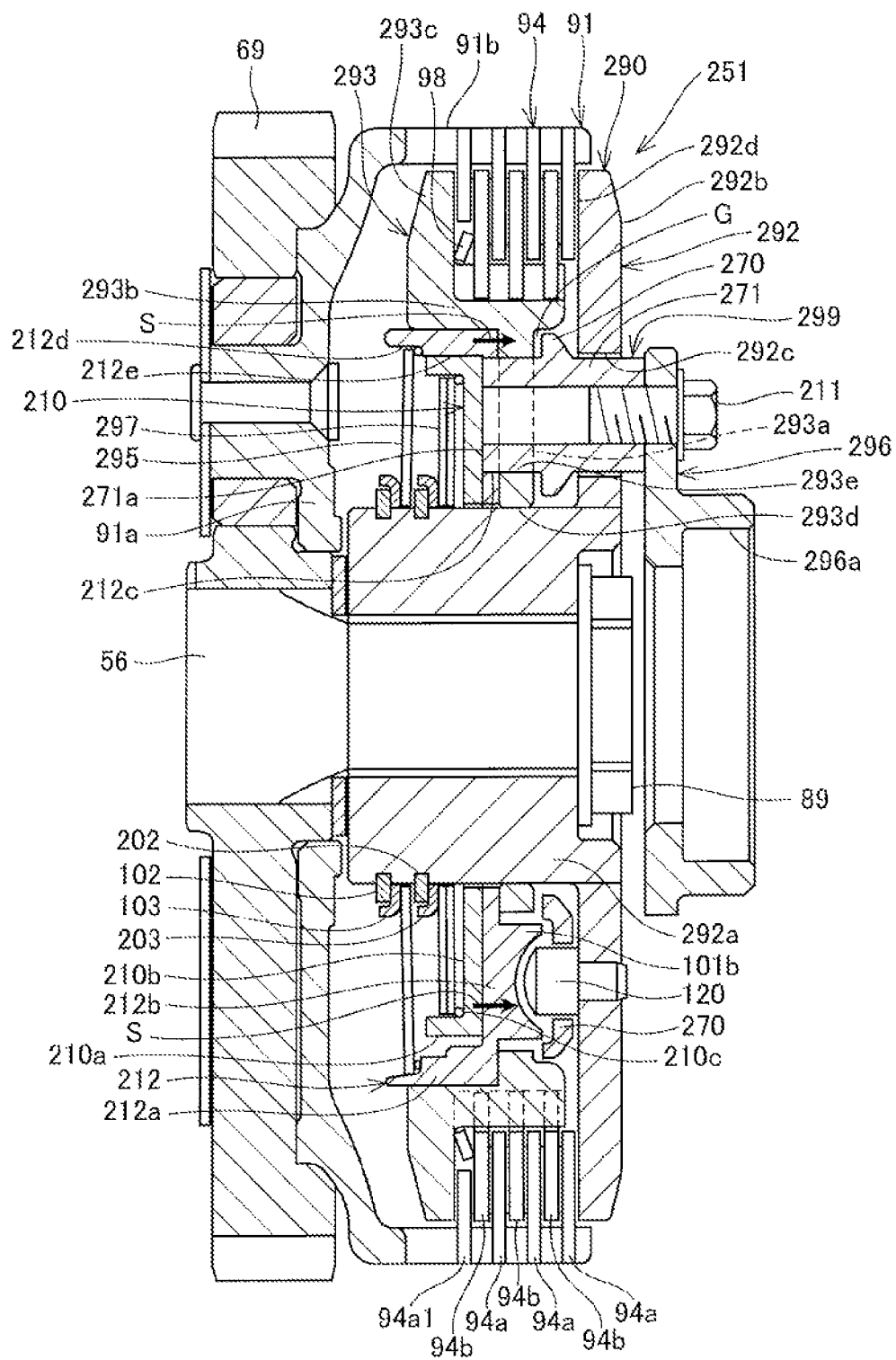
FIG. 8 is a cross-sectional view showing a clutch mechanism for gear shift according to according to a second embodiment.

FIG. 8 is a cross-sectional view showing the clutch mechanism 251 for gear shift according to the second Embodiment.

The clutch mechanism 251 for gear shift has a clutch outer 91, a clutch center 292 which is provided at the inside of the clutch outer 91 in the radial direction and fixed integrally to the main shaft 56, a pressure plate 293 which is movable in the axial direction of the main shaft 56, a clutch plate 94 provided between the pressure plate 293 and the clutch center 292, a main spring 295 for urging the pressure plate 293 in a clutch engagement direction, a lifter plate 296 for moving the pressure plate 293 in a clutch release direction, a sub pressure plate 210 which is provided at the inside of the pressure plate 293 in the radial direction and movable in the axial direction relatively to the pressure plate 293, a sub spring 297 for urging the pressure plate 293 through the sub pressure plate 210 in the clutch engagement direction, and a judder spring 98 pinched between the clutch plate 94 and the pressure plate 293. The clutch center 292 and the pressure plate 293 are assembled and unified, and disposed inside the clutch outer 91, thereby constituting a clutch inner 290.

The lifter plate 296 is formed in a disc-shape, and disposed between the clutch center 292 and the lifter cam plate 84 (FIG. 3). The lifter plate 296 has, at the center portion thereof, a bearing support hole portion 296a in which the ball bearing 87 is fitted.

The lifter plate 296 further has a release member 299 on a surface thereof which faces the clutch center 292.

Figure 9:
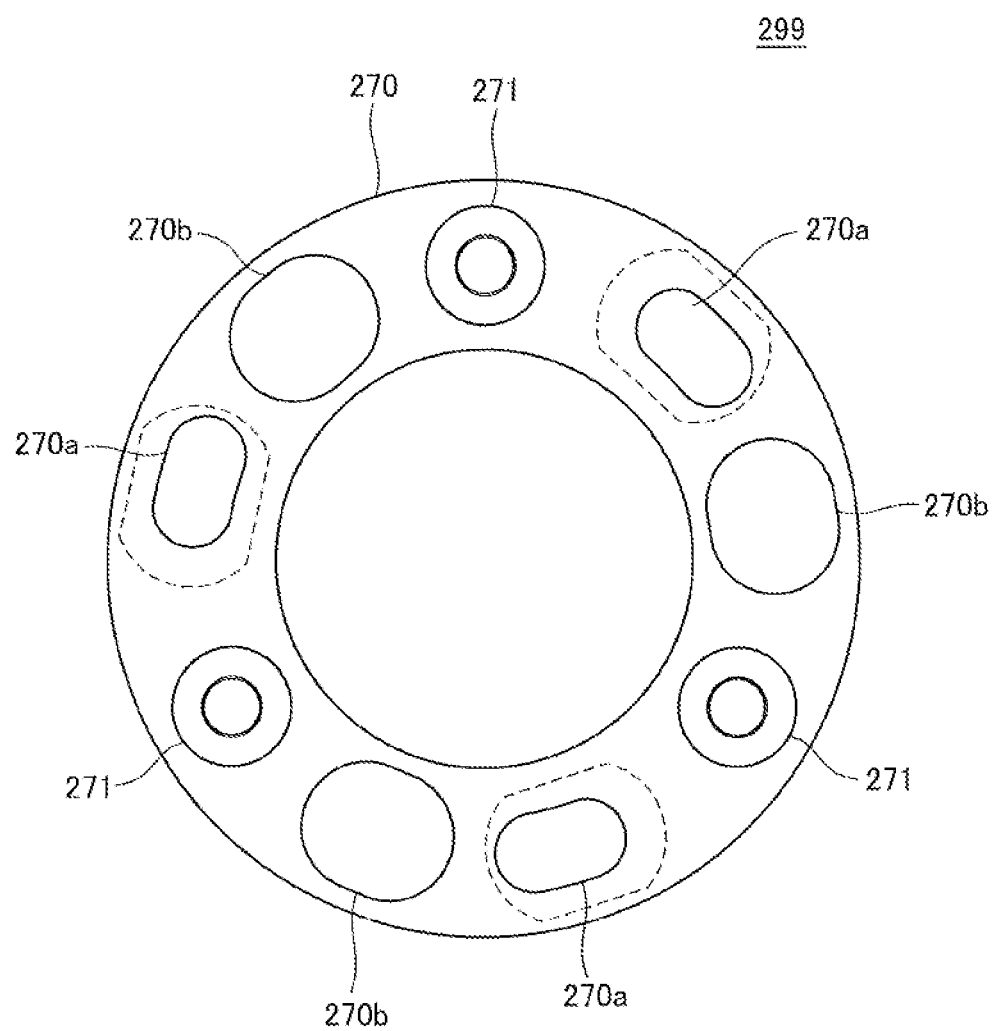
FIG. 9 is a plan view of a release member.

FIG. 9 is a plan view showing the release member 299.

The release member 299 has a flange ring 270 (flange portion) having a larger diameter than the hub portion 292a of the clutch center 292, and release bosses 271 which are provided so as to penetrate through the plate-like flange ring 270 in the axial direction and erected from both the surfaces of the flange ring 270.

A plurality of release bosses 271 are provided to be spaced from one another at substantially equal intervals in the peripheral direction of the flange ring 270.

Each release boss 271 is formed in a cylindrical shape, and the flange ring 270 is provided at the center portions in the axial direction of the release bosses 271 to integrally connect the respective bosses 271.

The release member 299 is integrally fixed to the lifter plate 296 while the respective release bosses 271 arranged on the surface of the lifter plate 296 at the clutch center 292 side are fastened by a bolt 211 inserted from the lifter cam plate 84 side into the lifter plate 296. The release bosses 271 press the sub pressure plate 210 by the press faces 271a at the tips of the release bosses 271.

A release hole 270a for releasing a lifter pin 120 and a lightening hole 270b are formed between the respective adjacent release bosses 271 in the flange ring 270.

As shown in FIG. 8, the clutch center 292 has a cylindrical hub portion 292a fixed to the main shaft 56, and a disc-shaped receiving plate portion 292b which extends outwards in the radial direction from the axial end portion of the hub portion 292a to a neighborhood of the inner peripheral surface of the clutch outer 91. Through-holes 292c through which the release bosses 271 of the lifter plate 296 penetrate are formed in the receiving plate portion 292b. A plurality of through-holes 292c are formed to be arranged in the peripheral direction of the hub portion 292a. The receiving plate portion 292b has a reception face 292d for receiving the clutch plate 94 at an outer peripheral portion outside the through-holes 292c.

The pressure plate 293 has an inner disc portion 293a which is disposed to confront the receiving plate portion 292b of the clutch center 292 at the inside of the clutch outer 91, an inner cylindrical portion 293b which extends from the peripheral edge portion of the inner disc portion 293a to the disc portion 91a side of the clutch outer 91 in a substantially coaxial positional relationship with the main shaft 56, and a press plate portion 293c which extends outwards in the radial direction from the tip portion of the inner cylindrical portion 293b to a neighborhood of the inner peripheral surface of the clutch outer 91. The pressure plate 293 is formed to be rotatable relatively to the clutch center 292 by only a predetermined rotational angle so that back torque is released.

A fitting hole 293d which is freely slidably fitted to the outer peripheral surface of the hub portion 292a of the clutch center 292 is formed at the center of the inner disc portion 293a. Hole portions 293e in which the release boss 271 of the release member 299 is inserted is provided around the fitting hole 293d in the inner disc portion 293a. A plurality of hole portions 293e are arranged in the peripheral direction of the inner disc portion 293a. The flange ring 270 which is larger than the hole portion 293e in the radial direction comes into contact with the inner disc portion 293a, whereby the position in the axial direction of the release boss 271 is regulated. Each of the inner friction plates 94b is provided to the outer peripheral surface of the inner cylindrical portion 293b.

A back torque limit member 212 is integrally fixed to the pressure plate 293 inside the inner cylindrical portion 293b of the pressure plate 293. The back torque limit member 212 has a cylindrical portion 212a fitted to the inner peripheral surface of the inner cylindrical portion 293b, and a disc-shaped bottom plate portion 212b which blocks the bottom portion of the cylindrical portion 212a and is in contact with the inner disc portion 293a, and receives the main spring 295. A receiving groove portion 212d (a seat portion of the main spring) having an inner peripheral portion which is larger in diameter by one stage is formed at the tip portion of the cylindrical portion 212a.

A plurality of tip through-holes 212c through which the tip portions of the release bosses 271 penetrate are formed in the disc-shaped bottom portion 212b, and a cam portion 101b penetrating through the inner disc portion 293a is provided. The cam portion 101b is engaged with the lifter pin 120 fixed to the clutch center 292.

The main spring 295 is a ring-shaped disc spring, and pinched between the back torque limit member 212 and the retainer 103 which is nearer to the disc portion 91a side than the back torque limit member 212. Specifically, the main spring 295 is disposed between the hub portion 292a of the clutch center 292 and the inner cylindrical portion 293b of the pressure plate 293, and the outer diameter portion of the main spring 295 is supported by the receiving groove portion 212d while the inner diameter portion of the main spring 295 is supported by the retainer 103.

The main spring 295 urges the pressure plate 293 in the direction along which the clutch plate 94 is pinched by the pressure plate 293 and the clutch center 292, that is, in the clutch engagement direction.

The sub pressure plate 210 has a sliding cylindrical portion 210a which is press-fitted in the inner diameter portion 212e (inlay fitting hole) of the cylindrical portion 212a of the back torque limit member 212, and a disc-shaped bottom plate portion 212b which blocks the bottom portion of the sliding cylindrical portion 210a. The bottom plate portion 210b comes into contact with the disc-shaped bottom plate portion 212b of the back torque limit member 212, and a part thereof comes into contact with the press face 271a of the release boss 271. The sub pressure plate 210 is movable in the axial direction relatively to the pressure plate 293 inside the back torque limit member 212.

On the outer peripheral surface of the cylindrical hub portion 292a of the clutch center 292, a ring-shaped clip 202 is inlaid between the main spring 295 and the sub pressure plate 210, and the clip 202 supports a ring-shaped retainer 203 for receiving the sub spring 297.

The sub spring 297 is a ring-shaped disc spring, and pinched between the retainer 203 and the bottom plate portion 210b of the sub pressure plate 210. Specifically, the sub spring 297 is disposed between the sliding cylindrical portion 210a and the hub portion 292a, and the outer diameter portion of the sub spring 297 is supported by the seat portion 210c at the outer peripheral side of the sub pressure plate 210 while the inner diameter portion of the sub spring 297 is supported by the retainer 203.

The sub spring 297 urges the pressure plate 293 through the sub pressure plate 210 and the back torque limit member 212 while the retainer 203 fixed to the hub portion 292a serves as a spring seat, thereby pressing the clutch plate 94.

That is, the urging direction of the sub spring 297 is the same as the urging direction of the main spring 295, and it corresponds to the clutch engagement direction.

In the clutch engagement state shown in FIG. 8, the urging force of the pressure plate 293 on the clutch plate 94 is equal to the sum of the urging force of the main spring 295 and the urging force of the sub spring 297, and becomes the maximum value. The sub pressure plate 210 and the back torque limit member 212 constitutes a sub spring load transmission passage S for transmitting the urging force of the sub spring 297 to the pressure plate 293.

Under the clutch engagement state, the pressure plate 293 is pressed to the clutch center 292 side by the urging force of the main spring 295 and the sub spring 297. Furthermore, under this state, the lifter plate 296 is pressed to the lifter cam plate 84 side by the urging force of the sub spring 297 through the sub pressure plate 210 and the release bosses 271, and a gap G is formed between the flange ring 270 of the release member 299 and the inner disc portion 293a of the pressure plate 293. That is, under the clutch engagement state, the flange ring 270 is separated from the inner disc portion 293a, and located between the inner disc portion 293a and the receiving plate portion 292b of the clutch center 292.

Figure 10:
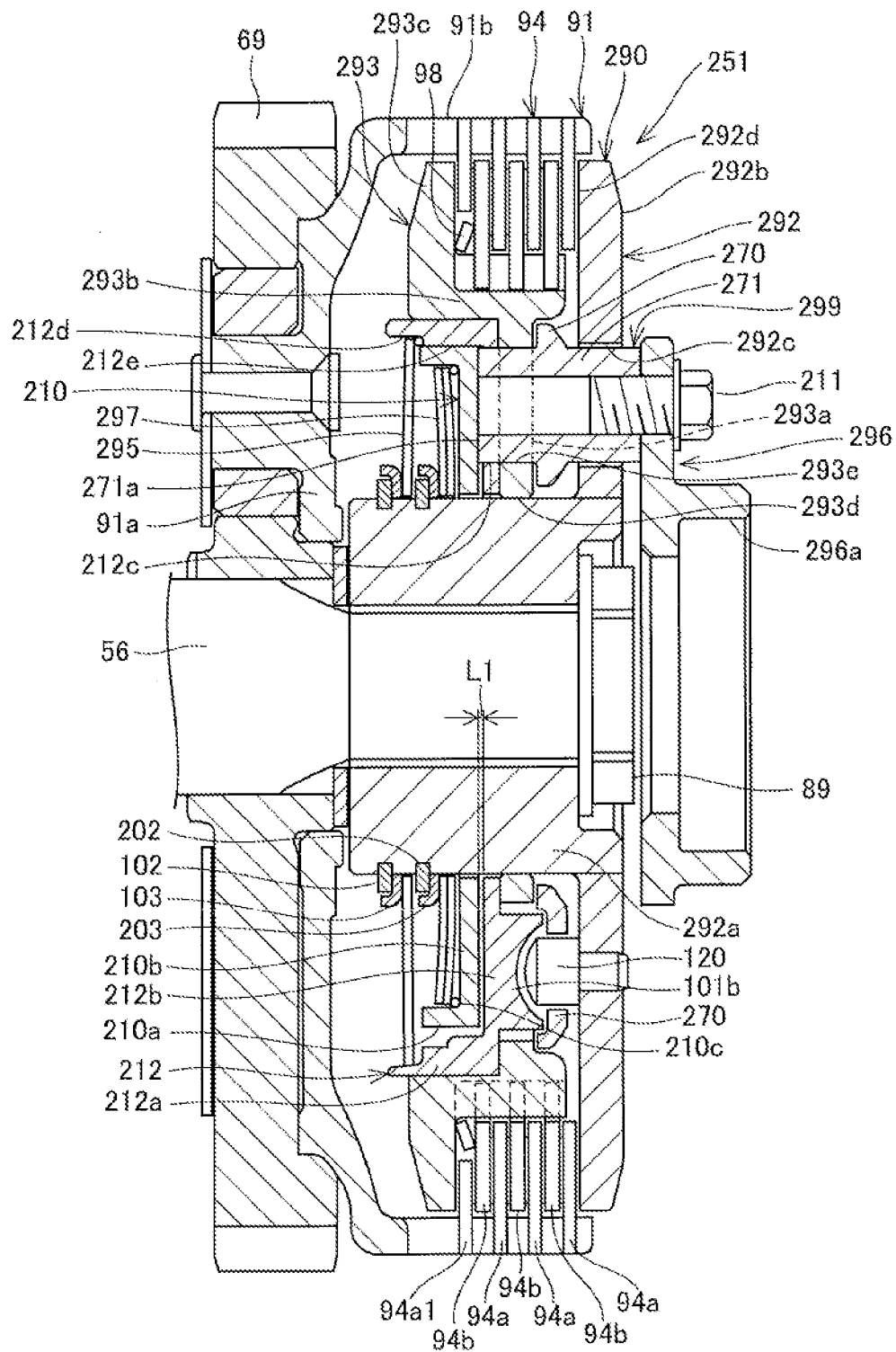
FIG. 10 is a cross-sectional view showing the clutch mechanism for gear shift under an intermediate-capacity state.

FIG. 10 is a cross-sectional view showing the clutch mechanism 251 for gear shift under the intermediate-capacity state.

When the lifter cam plate 84 is moved in the clutch release direction in connection with the rotation of the shift spindle 71 by the actuator mechanism 54, as shown in FIG. 10, the release bosses 271 of the release member 299 are moved against the urging force of the sub spring 297, and the bottom plate portion 210b of the sub pressure plate 210 is pressed and lifted by the press face 271a and thus separated from the disc-shaped bottom plate portion 212b of the back torque limit member 212.

The bottom plate portion 210b is separated from the disc-shaped bottom plate portion 212b, whereby the sub spring load transmission passage S is cut off, and the urging force of the sub spring 297 is not transmitted to the pressure plate 293, so that the clutch capacity is determined by only the main spring 295. Therefore, as shown in FIG. 5, the clutch capacity decreases from the maximum capacity to the intermediate capacity instantaneously when the sub pressure plate 210 separates from the disc-shaped bottom plate portion 212b. A first predetermined lift amount L1 (first predetermined amount) of the lifter plate 296 at which the sub spring load transmission passage S is cut off may be set to be larger than zero, and it is determined by the dimensional precision of each part or the like.

When the movement of the lifter cam plate 84 is continued after the bottom plate portion 210b separates from the disc-shaped bottom plate portion 212b, the lifter plate 296 continues to further move to the pressure plate 293 side. The section from the separation of the bottom plate portion 210b from the disc-shaped bottom plate portion 212b till the contact of the flange ring 270 of the release member 299 with the inner disc portion 293a corresponds to an intermediate-capacity section. In this section, the sub pressure plate 210 is merely moved relatively to the pressure plate 293, and has no effect on the load of the main spring 295. Therefore, as shown in FIG. 5, the clutch capacity is determined by the main spring 295 and the intermediate capacity is fixed in this intermediate-capacity section. In the second embodiment, since a backlash based on the gap G is provided, the section in which the intermediate capacity is obtained can be lengthened, and the clutch capacity can be made variable without providing any high-precision part and control method.

When the lifter plate 296 is moved by only a second predetermined lift amount (second predetermined amount) by the lifter cam plate 84 and thus the flange ring 270 comes into contact with the inner disc portion 293a of the pressure plate 293 (not shown), the pressure plate 293 is pressed by the flange ring 270, and moved in the clutch release direction against the urging force of the main spring 295 and the sub spring 297. A small-capacity section corresponds to the section from the contact of the flange ring 270 with the inner disc portion 293a till the perfect release of the clutch.

When the pressure plate 293 moves and the press plate portion 293c separates from the external friction plate 94a1, the clutch capacity is determined by the judder spring 98.

As described above, according to the second embodiment to which the present invention is applied, there is provided the sub pressure plate 210 which is separate from and movable relatively to the pressure plate 293 which is displaceable in the axial direction of the main shaft 56, the sub spring 297 for pressing the pressure plate 293 in the clutch connection direction through the sub pressure plate 210 is provided, and when the lifter plate 296 is lifted by only the first predetermined lift amount L, the sub pressure plate 210 is separated from the pressure plate 293, thereby cutting off the sub spring load transmission passage S to the pressure plate 293. Therefore, the clutch engaging load can be secured by the main spring 295 and the sub spring 297 which act in the clutch connection direction, and when the lifter plate 296 is lifted under gear shift, the sub spring load transmission passage S to the pressure plate 293 can be cut off, so that the clutch engaging load can be produced by only the main spring 295. Accordingly, the clutch capacity can be set at multiple stages of the maximum capacity under the clutch engagement state and the intermediate capacity under the state that the lifter plate 296 is lifted. Therefore, the clutch mechanism 251 for gear shift that can reduce the shift shock by making the clutch capacity variable can be implemented with a simple construction.

Furthermore, the sub spring 297 and the sub pressure plate 210 are disposed at the opposite side to the lifter plate 296 through the pressure plate 293, the pressure plate 293 is provided with the hole portion 293e, the lifter plate 296 is provided with the release bosses 271 inserted in the hole portion 293e, and when the lifter plate 296 is lifted by the first predetermined lift amount L1 or more, the release bosses 271 come into contact with the sub pressure plate 210, whereby the sub pressure plate 210 separates from the pressure plate 293. Therefore, even when the sub spring 297 is configured to be disposed at the opposite side to the lifter plate 296, the cut-off mechanism for the sub spring load transmission passage S can be provided with a simple construction.

The flange ring 270 having a larger diameter than the hole portion 293e of the pressure plate 293 is provided to the intermediate portion in the axial direction of the release bosses 271 of the lifter plate 296, and when the lifter plate 296 is lifted by only the second predetermined amount, the flange ring 270 comes into contact with the pressure plate 293 and directly moves the pressure plate 293. Therefore, the clutch can be released with a simple construction even in the construction that the sub spring load transmission passage S is provided.

Furthermore, the sub spring 297 and the sub pressure plate 210 are disposed between the hub portion 292a of the clutch center 292 and the pressure plate 293, and the main spring 295 is disposed to be nearer to the clutch outer 91 side than the sub spring 297 and between the hub portion 292a of the clutch center 292 and the pressure plate 293, so that the main spring 295 and the sub spring 297 can be compactly disposed at the same side.

Still furthermore, the sub spring 297 and the main spring 295 are provided as ring-shaped disc springs, the sub pressure plate 210 is inlaid in the pressure plate 293, the seat portion 210c of the sub spring 297 is provided at the outside in the radial direction, and the pressure plate 293 is provided with the receiving groove portion 212d of the main spring 295 at the outside in the radial direction of the inner diameter portion 212e in which the sub pressure plate 210 is fitted. Therefore, the sub spring load transmission passage S and the cut-off mechanism therefor can be provided with simple constructions. Furthermore, the main spring 295 can be enlarged, so that the load of the main spring 295 can be easily secured.

The second embodiment is an example to which the present invention is applied, and the present invention is not limited to the above embodiment.

In the second embodiment, the respective release bosses 271 are integrally connected to one another by the flange ring 270. However, the present invention is not limited to this construction. For example, the second embodiment may be modified so that the flange ring 270 is not provided, a flange portion having a larger diameter than the hole portion 293e is formed at the intermediate portion in the axial direction of each release portion 271, and the pressure plate 293 is pressed by the flange portions.

Third Embodiment

A third embodiment to which the present invention is applied will be described hereunder with reference to FIGS. 11 to 15. In the third embodiment, the same constructions as the first embodiment are represented by the same reference numerals, and the descriptions thereof are omitted.

In the first embodiment, it is described that the sub spring 97 is pinched between the lifter plate 96 and the clutch center 92. However, the third embodiment is different from the first embodiment in that a sub pressure plate 310 which is separate from the lifter plate 396 is mainly provided at the opposite side to the lifer plate 396 through a pressure plate 393, the sub pressure plate 310 is urged by a sub spring 397 provided at the same side as a main spring 395, and the main spring 395 and the sub spring 397 are configured as coil springs.

Figure 11:
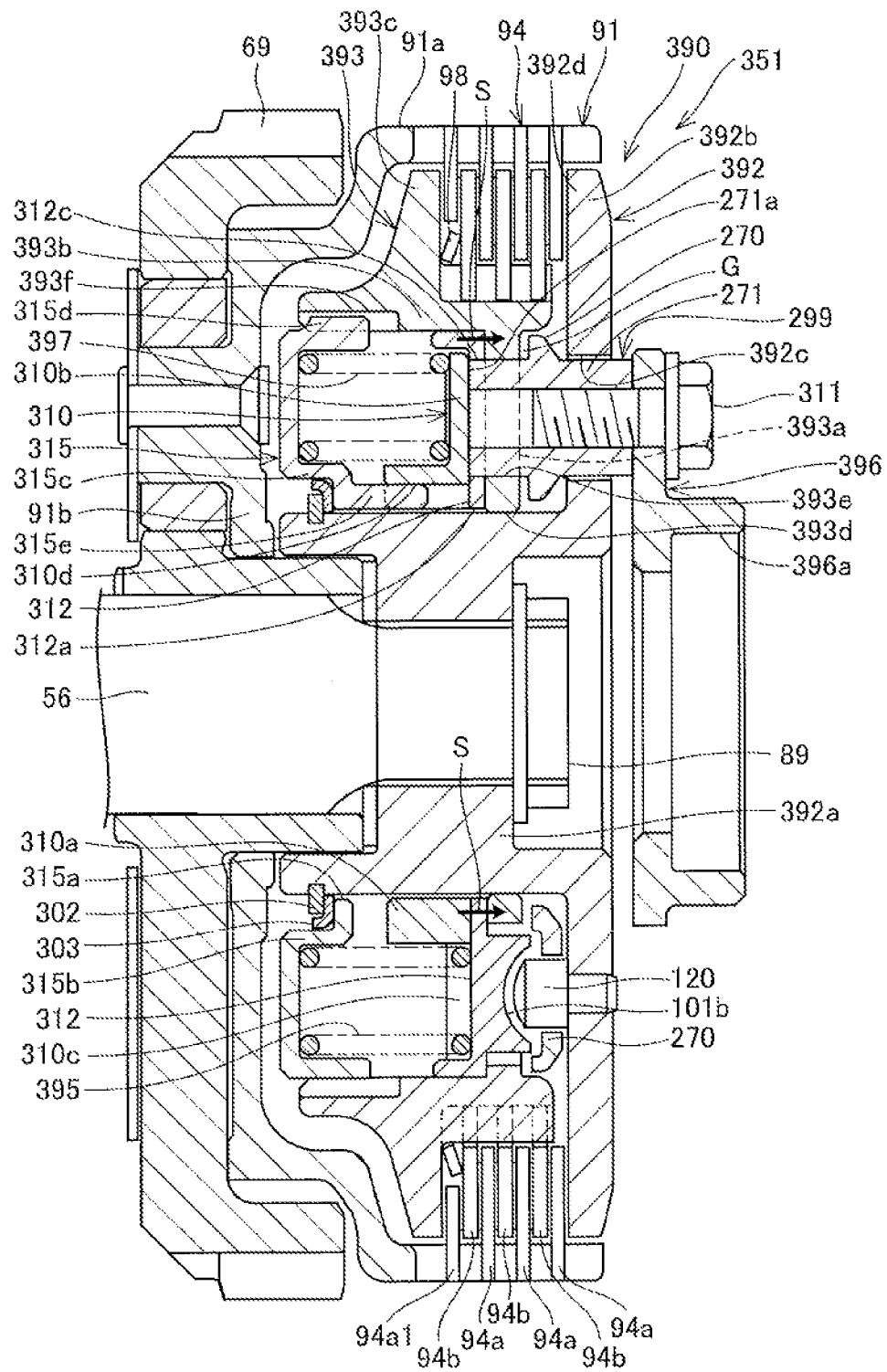
FIG. 11 is a cross-sectional view showing a clutch mechanism for gear shift according to a third embodiment.

FIG. 11 is a cross-sectional view showing a clutch mechanism 351 for gear shift according to the third embodiment.

The clutch mechanism 351 for gear shift has a clutch outer 91, a clutch center 392 which is provided inside the clutch outer 91 in the radial direction and integrally fixed to a main shaft 56, a pressure plate 393 which is movable in the axial direction of the main shaft 56, a clutch plate 94 provided between the pressure plate 393 and the clutch center 392, a main spring 395 for urging the pressure plate 393 in a clutch engagement direction, a lifter plate 396 for moving the pressure plate 393 in a clutch release direction, a sub pressure plate 310 which is provided inside the pressure plate 393 in the radial direction and movable in the axial direction relatively to the pressure plate 393, a sub spring 397 for urging the pressure plate 393 in the clutch engagement direction through the sub pressure plate 310, a judder spring 98 pinched between the clutch plate 94 and the pressure plate 393, and a spring holder 315 for receiving the main spring 395 and the sub spring 397. The clutch center 392 and the pressure plate 393 are integrally assembled with each other, and constitutes a clutch inner 390 disposed inside the clutch outer 91.

The lifter plate 396 is formed in a disc-shape, and disposed between the clutch center 392 and the lifter cam plate 84 (FIG. 3). The lifter plate 396 has, at the center portion thereof, a bearing support hole portion 396a in which a ball bearing 87 is fitted.

The lifter plate 396 further has a release member 299 on a face thereof which confronts the clutch center 392. The release member 299 corresponds to the release member 299 described with reference to the second embodiment, and it is fixed to the lifter plate 396 by a bolt 211. The release bosses 271 of the release member 299 press the sub pressure plate 310 by press faces 271a at the tips of the release bosses 271.

The clutch center 392 has a cylindrical hub portion 392a fixed to the main shaft 56, and a disc-shaped receiving plate portion 392a which extends outwards in the radial direction from the axial end portion of the hub portion 392a till a neighborhood of the inner peripheral surface of the clutch outer 91. Through-holes 392c through which the release bosses 271 of the lifter plate 396 penetrate are formed in the receiving plate portion 392b. A plurality of through-holes 392c are formed to be arranged in the peripheral direction of the hub portion 392a. Furthermore, the receiving plate portion 392b has a reception face 392d for receiving the clutch plate 94 at an outer peripheral portion of the receiving plate portion 392c which is located at the outside of the through holes 392c.

The pressure plate 393 has an inner disc portion 393a which is disposed to confront the receiving plate portion 392b of the clutch center 392 inside the clutch outer 91, an inner cylindrical portion 393b which extends from the peripheral edge portion of the inner disc portion 393a to the disc portion 91a side of the clutch outer 91 in a substantially coaxial positional relationship with the main shaft 56, and a press plate portion 393c which extends outwards in the radial direction from the tip portion of the inner disc portion 303b till a neighborhood of the inner peripheral surface of the clutch outer 91. Each inner friction plate 94b is provided to the outer peripheral of the surface of the inner cylindrical portion 393b. The pressure plate 393 is formed to be rotatable relatively to the clutch center 392 by only a predetermined rotational angle so that back torque is released.

A fitting hole 393d which is freely slidably fitted to the outer peripheral surface of the hub portion 392a of the clutch center 392 is formed at the center of the inner disc portion 393a. A hole portion 393e in which the release bosses 271 of the release member 299 are inserted is provided around the fitting hole 393d in the inner disc portion 393a. The flange ring 270 of the release bosses 271 is larger in diameter than the hole portion 393e in the radial direction of the release bosses 271.

A back torque limit member 312 which is in contact with the substantially whole surface of the inner disc portion 393a is integrally fixed to the pressure plate 393 inside the inner cylindrical portion 393b.

Figure 12:
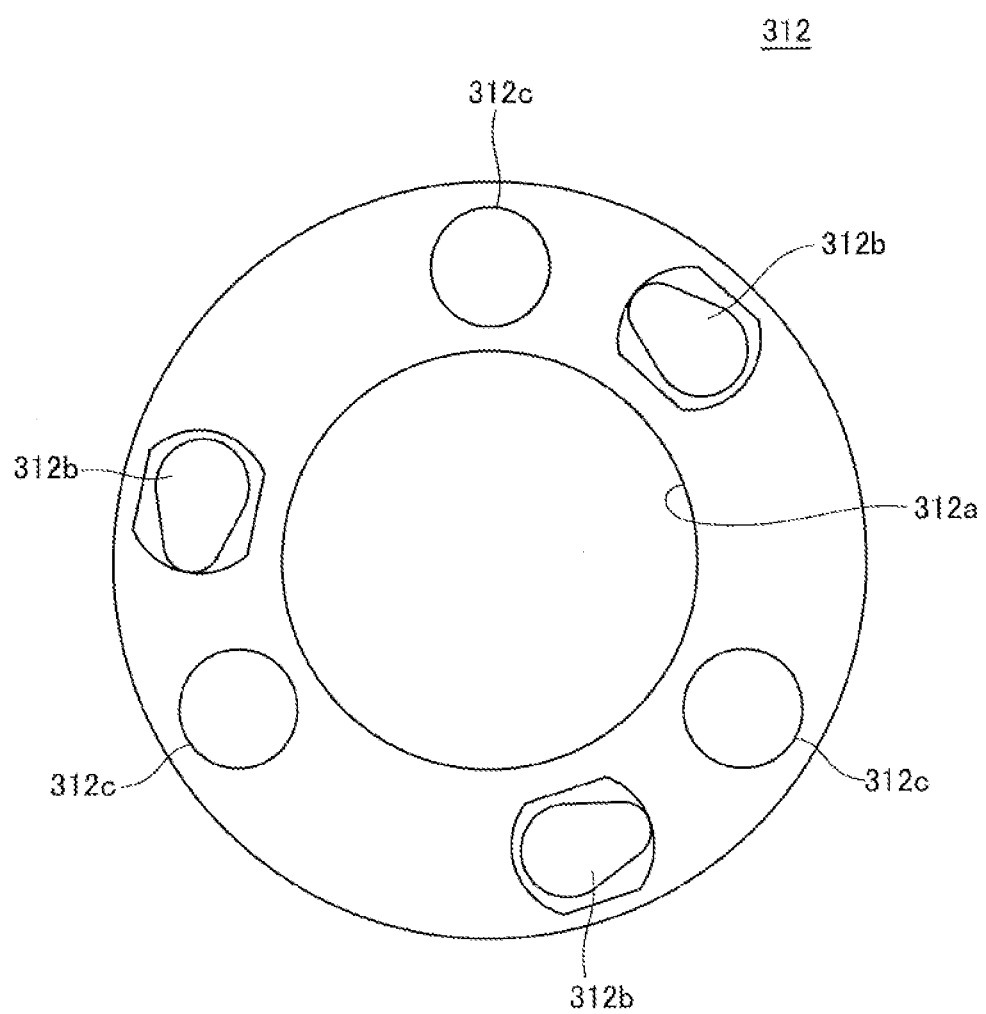
FIG. 12 is a plan view showing aback torque limit member.

FIG. 12 is a plan view showing the back torque limit member 312.

The back torque limit member 312 is formed in a disc-shape, and has, at the center portion thereof, a hole 312a in which the hub portion 392a penetrates. A cam portion 101b which penetrates through the inner disc portion 393a and a plurality of releasing hole portions 312c through which the release bosses 271 penetrate are provided around the hole 312a.

As shown in FIG. 11, the main spring 395 and the sub spring 397 are arranged at substantially equal positions in the radial direction of the pressure plate 393 in the space between the inner disc portion 393a of the pressure plate 393 and the hub portion 392a.

The main spring 395 is a coil spring extending in the axial direction of the pressure plate 393. A plurality of main springs are arranged to be spaced from one another at substantially equal intervals in the peripheral direction.

The sub spring 397 is a coil spring extending in the axial direction of the pressure plate 393, and disposed between the respective adjacent main springs 395. That is, the main springs 395 and the sub springs 397 are arranged to be out of phase with each other in the peripheral direction of the pressure plate 393 inside the inner disc portion 393a.

A ring-shaped clip 302 is inlaid in the outer peripheral surface of the hub portion 392a, and the clip 302 supports a ring-shaped retainer 303.

Figure 13:
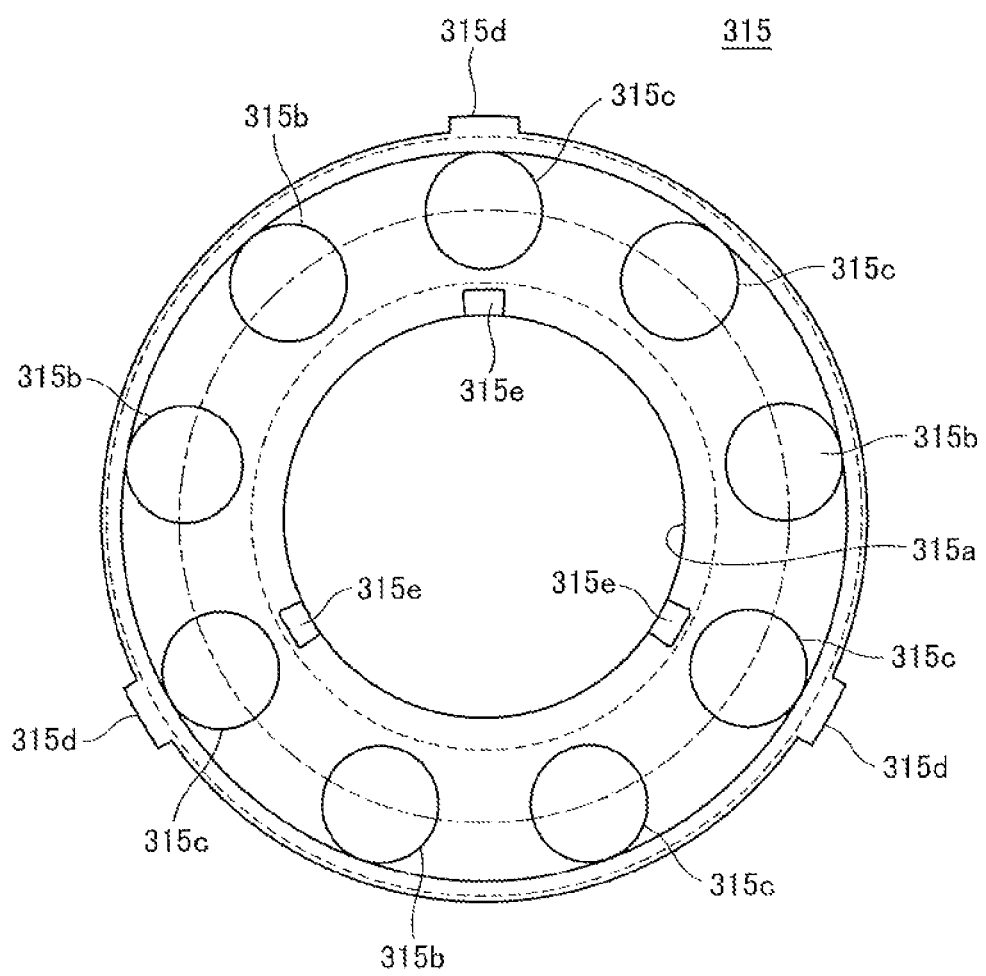
FIG. 13 is a plan view showing a spring holder.

FIG. 13 is a plan view showing the spring holder 315.

The spring holder 315 is formed in a disc-shape and disposed to confront the inner disc portion 393a.

The spring holder 315 has a hole 315a at the center thereof, and a plurality of cylindrical pocket portions 315b, 315c which are configured to have bottoms and provided around the hole 315a and in which one ends of each main spring 395 and each sub spring 397 are accommodated. The spring holder 315 is fitted to the hub portion 392a through the hole 315a, and locked in the axial direction by the retainer 303.

Each main spring 395 and each sub spring 397 are fitted in the packet portions 315b, 315c, whereby they are positioned in the peripheral direction.

Furthermore, the spring holder 315 has a plurality of projections 315d projecting outwards in the radial direction at the outer peripheral portion thereof. The projections 315 are fitted in groove portions 393f formed on the inner periphery of the inner cylindrical portion 393b, whereby the spring holder 315 is positioned in the peripheral direction.

At the peripheral edge portion of the hole 315a of the spring holder 315, a projection portion 315e extending in the axial direction to the inner disc portion 393a side is erected in the neighborhood of the pocket portion 315c in which the sub spring 397 is accommodated.

Figure 14:
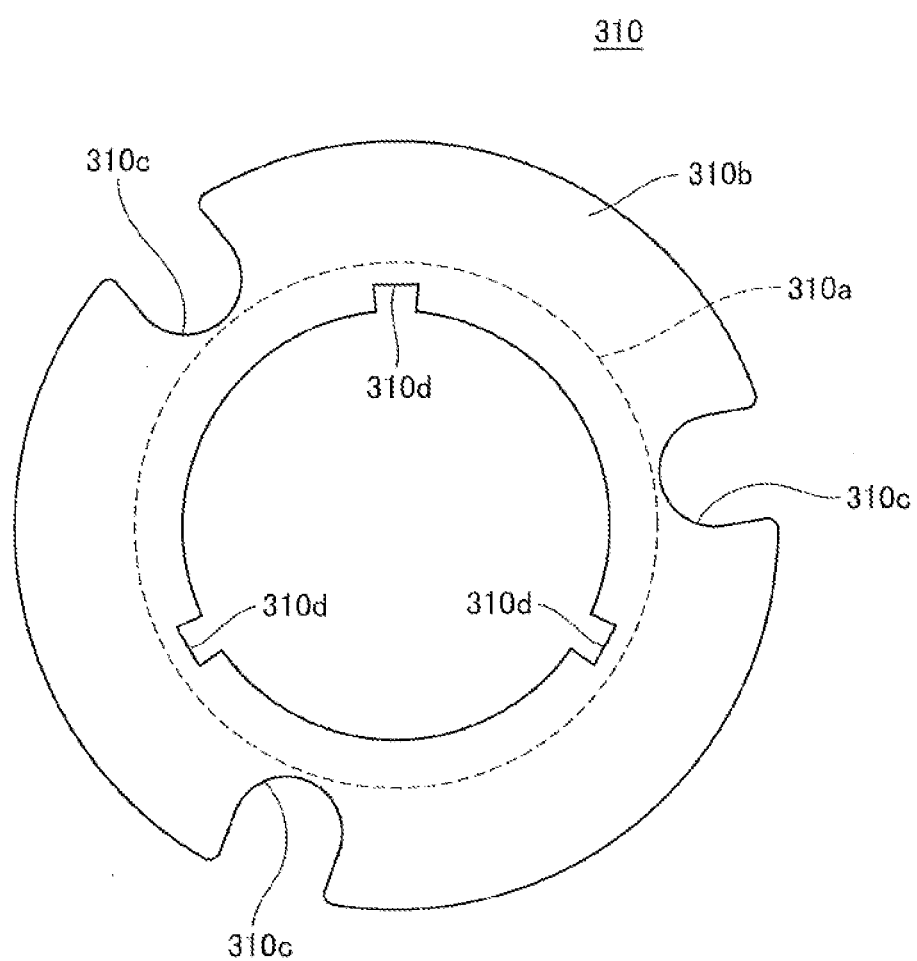
FIG. 14 is a plan view showing a sub pressure plate.

FIG. 14 is a plan view showing the sub pressure plate 310.

As shown in FIGS. 11 and 14, the sub pressure plate 310 is disposed inside the inner cylindrical portion 393b, and has a sliding cylindrical portion 310a fitted to the outer peripheral surface of the hub portion 392a, and a disc-shaped spring receiving portion 310b extending outwards in the radial direction from the axial end of the sliding cylindrical portion 310a.

The sub pressure plate 310 is movable in the axial direction along the hub portion 392a. The projection portion 315e of the spring holder 315 is fitted in a groove portion 310d formed on the inner peripheral portion of the sliding cylindrical portion 310a, whereby the sub pressure plate 310 is positioned in the peripheral direction.

The spring receiving portion 310b is pressed by the other end of the sub spring 397, and brought into contact with the back torque limit member 312. The press face 271a of the release boss 271 inserted in the hole portion 393e is brought, from the opposite side, into contact with a part of the spring receiving portion 310b which is pressed by each sub spring 397.

A cut-out portion 310c which avoids the main spring 395 is formed at a part of the spring receiving portion 310b which is overlapped with each main spring 395 in plan view, and the other end of the main spring 395 passes through the cut-out portion 310c and comes into contact with the back torque limit member 312.

The main spring 395 urges the pressure plate 393 through the back torque limit member 312 to press the clutch plate 94 while the spring holder 315 fixed to the hub portion 392a serves a spring seat.

The sub spring 397 urges the pressure plate 393 through the sub pressure plate 310 and the back torque limit member 312 to press the clutch plate 94 while the spring holder 315 serves as a spring seat.

That is, the urging direction of the sub spring 397 is identical to the urging direction of the main spring 395, which is the clutch engagement direction.

Under the clutch engagement state shown in FIG. 11, the urging force with which the pressure plate 393 presses the clutch plate 94 is equal to the sum of the urging force of the main spring 395 and the urging force of the sub spring 397, and becomes the maximum value. The sub pressure plate 310 constitutes a sub spring load transmission passage S for transmitting the urging force of the sub spring 397 to the pressure plate 393.

Under the clutch engagement state, the pressure plate 393 is pressed to the clutch center 392 by the urging force of the main spring 395 and the urging force of the sub spring 397. Furthermore, under this state, the lifter plate 396 is pressed to the lifter cam plate 84 side through the sub pressure plate 310 and the release bosses 271 by the urging force of the sub spring 397, and a gap G is formed between the flange ring 270 of the release bosses 271 and the inner disc portion 393a of the pressure plate 393. That is, under the clutch engagement state, the flange ring 270 is separated from the inner disc portion 393a, and located between the inner disc portion 393a and the receiving plate portion 392b of the clutch center 392.

Figure 15:
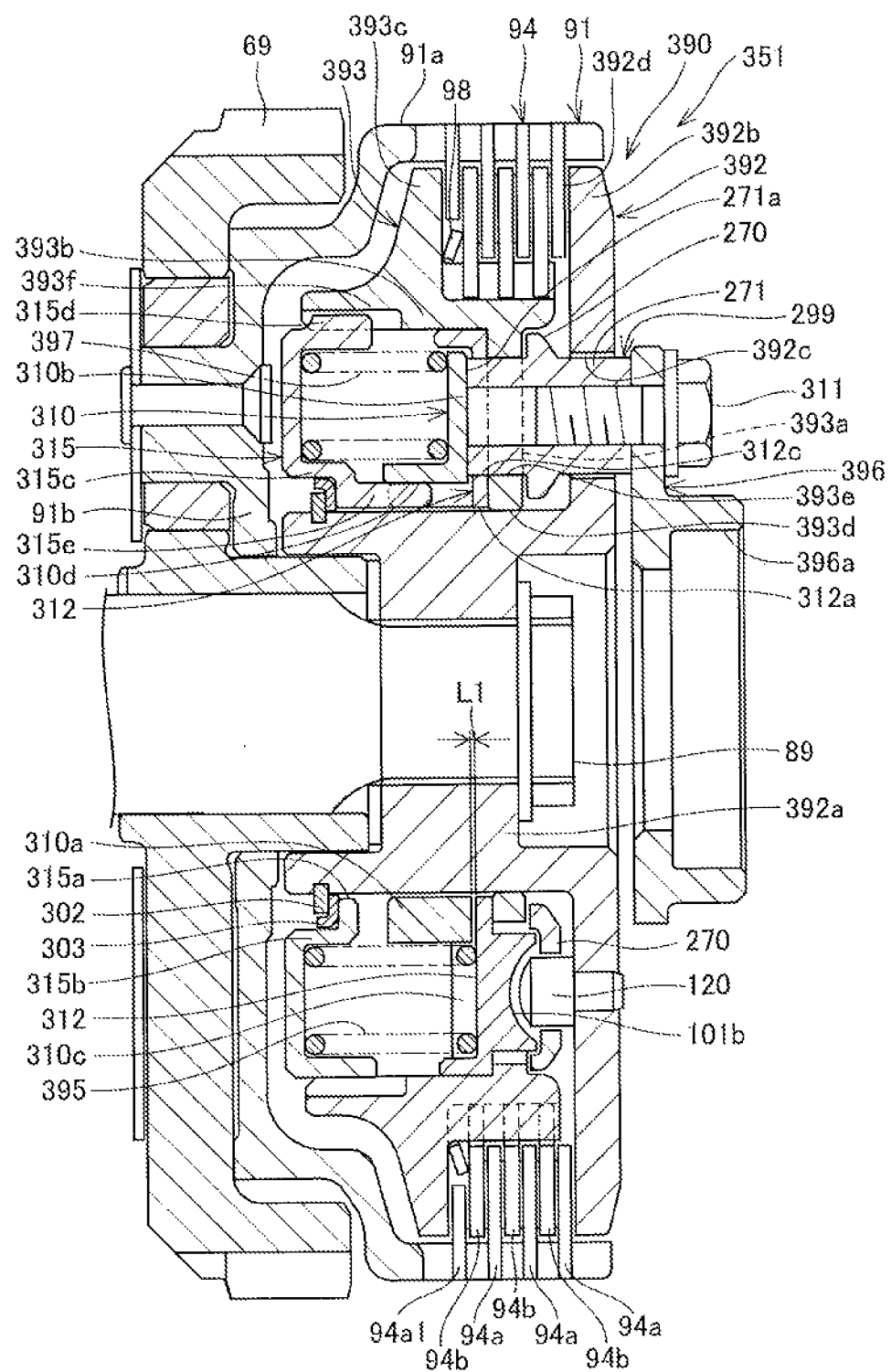
FIG. 15 is a cross-sectional view showing the clutch mechanism for gear shift under an intermediate-capacity state.

FIG. 15 is a cross-sectional diagram showing the clutch mechanism 351 for gear shift under the intermediate-capacity state.

When the lifter cam plate 84 is moved in the clutch release direction in connection with the rotation of the shift spindle 71 by the actuator mechanism 54, as shown in FIG. 15, the release bosses 271 of the lifter plate 396 are moved against the urging force of the sub spring 397, and the spring receiving portion 310b of the sub pressure plate 310 is pressed and lifted by the press face 271a, so that the spring receiving portion 310b separates from the back torque limit member 312 of the pressure plate 393.

The separation of the spring receiving portion 310b from the back torque limit member 312 cuts off the sub spring load transmission passage S, so that the urging force of the sub spring 397 is not transmitted to the pressure plate 393 and thus the clutch capacity is determined by only the main spring 395. Therefore, as shown in FIG. 5, the clutch capacity decreases from the maximum capacity to the intermediate capacity instantaneously when the sub pressure plate 31 separates from the back torque limit member 312. A first predetermined lift amount L1 (first predetermined amount) of the lifter plate 396 at which the sub spring load transmission passage S is cut off may be set to be larger than zero, and it is determined by the dimensional precision of each part or the like.

The section from the separation of the sub pressure plate 310 from the back torque limit member 312 till the contact of the flange ring 270 of the release bosses 271 with the inner disc portion 393a corresponds to an intermediate-capacity section. In this section, the sub pressure plate 310 merely moves relatively to the pressure plate 393, and has no effect on the load of the main spring 395. Therefore, as shown in FIG. 5, the clutch capacity is determined by only the main spring 395 in the intermediate-capacity section, and the intermediate capacity is fixed.

When the lifter plate 396 is moved by only the second predetermined lift amount (second predetermined amount) by the lifter cam plate 84 and the flange ring 270 comes into contact with the inner disc portion 393a of the pressure plate 393 (not shown), the pressure plate 393 is pressed by the flange ring 270, and moves against the urging force of the main spring 395 and the sub spring 397 in the clutch release direction. A small-capacity section corresponds to the section from the contact of the flange ring 270 with the inner disc portion 393a till the perfect release of the clutch.

When the pressure plate 393 moves and thus the press plate portion 393c separates from the outer friction plate 94a1, the clutch capacity is determined by the judder spring 98.

As described above, according to the third embodiment to which the present invention is applied, the hub portion 392a of the clutch center 392 is provided with the spring holder 315, and the sub spring 397, the sub pressure plate 310 and the main spring 395 are disposed between the spring holder 315 and the pressure plate 393, so that the main spring d395 and the sub spring 397 can be compactly disposed at the same side.

The sub spring 397 and the main spring 395 are provided as coil springs along the axial direction of the clutch mechanism 351 for gear shift to be out of phase in the peripheral direction, and the sub pressure plate 310 is provided with a cut-out portion 310c through which the main spring 395 is passed. Therefore, the spring characteristic of the coil springs makes it easy to match the clutch capacity with a set value. Furthermore, the main spring 395 is passed through the cut-out portion 310c of the sub pressure plate 310, so that the sub pressure plate 310 can be moved without affecting the main spring 395, and both the securing of the clutch load by the main spring 395 and the cut-off mechanism of the sub spring load transmission passage S are compatible with each other. A hole portion may be provided to the spring receiving portion 310b in place of the cut-out portion 310c, the main spring 395 may be passed through this hole portion.

Fourth Embodiment

A fourth embodiment to which the present invention is applied will be described with reference to FIGS. 19 to 24. In the fourth embodiment, the same constituent parts as the first embodiment are represented by the same reference numerals, and the descriptions thereof are omitted.

The fourth embodiment is different from the first embodiment in that a sub lifter plate 410 for urging the pressure plate 93 in the clutch engagement direction by a sub spring 411 which is provided in addition to the sub spring 97 is provided between a lifter plate 496 and the lifer cam plate 84, and the sub lifter plate 410 is lifted by a predetermined lift amount or more, whereby the urging force of the sub spring 411 to the pressure plate 93 is cut off. In the fourth embodiment, the sub spring 97 is referred as a second sub spring 497 to be discriminated from the sub spring 411.

Figure 19:
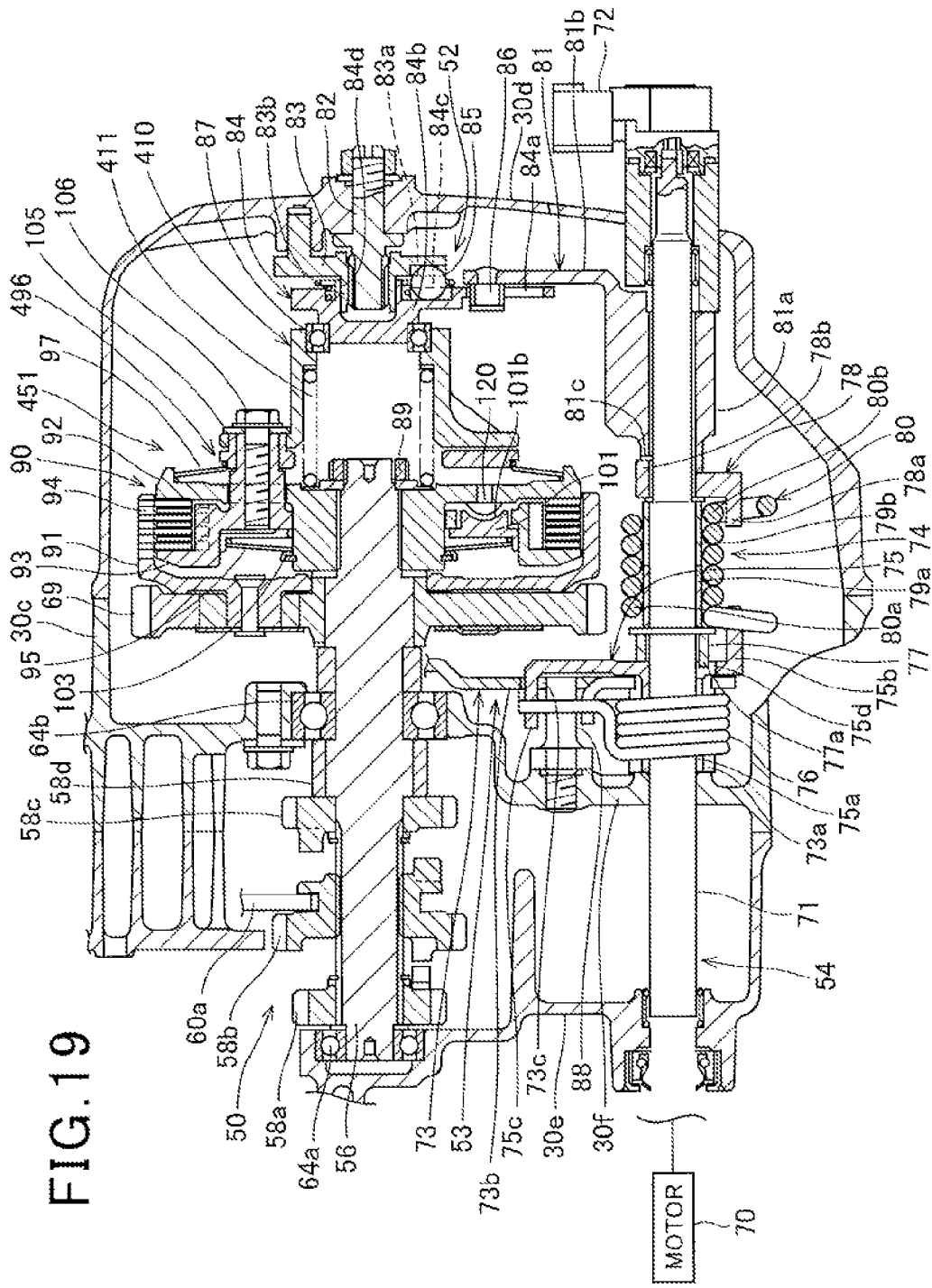
FIG. 19 is a cross-sectional view showing a gear shift mechanism, an actuator mechanism, a clutch mechanism for gear shift, and a clutch operating mechanism according to a fourth embodiment.

FIG. 19 is a cross-sectional view showing a gear change mechanism 53, an actuator mechanism 54, a clutch mechanism 451 for gear shift and a clutch operation mechanism 52 according to the fourth embodiment.

The clutch mechanism 451 for gear shift has a lifter plate 496 for urging the pressure plate 93 in the clutch engagement direction by the urging force of the second sub spring 497.

The clutch mechanism 451 for gear shift has a sub lifer plate 410 which is disposed between the lifter plate 496 and the lifter cam plate 84 (lifter cam) and pressed to the lifter cam plate 84 to lift the lifter plate 496 in the clutch release direction, and a sub spring 411 which is provided between the sub lifter plate 410 and the clutch center 92 and urges the sub lifter plate 410 in the clutch engagement direction.

In the fourth embodiment, the clutch mechanism 451 for gear shift is longer in the axial direction by the amount corresponding to the provision of the sub lifter plate 410, so that the cylindrical portion 81a of the clutch lever 81, the shift spindle 71, etc. are configured to extend in the axial direction in connection with the increase in length of the clutch mechanism 451 for gear shift.

Figure 20:
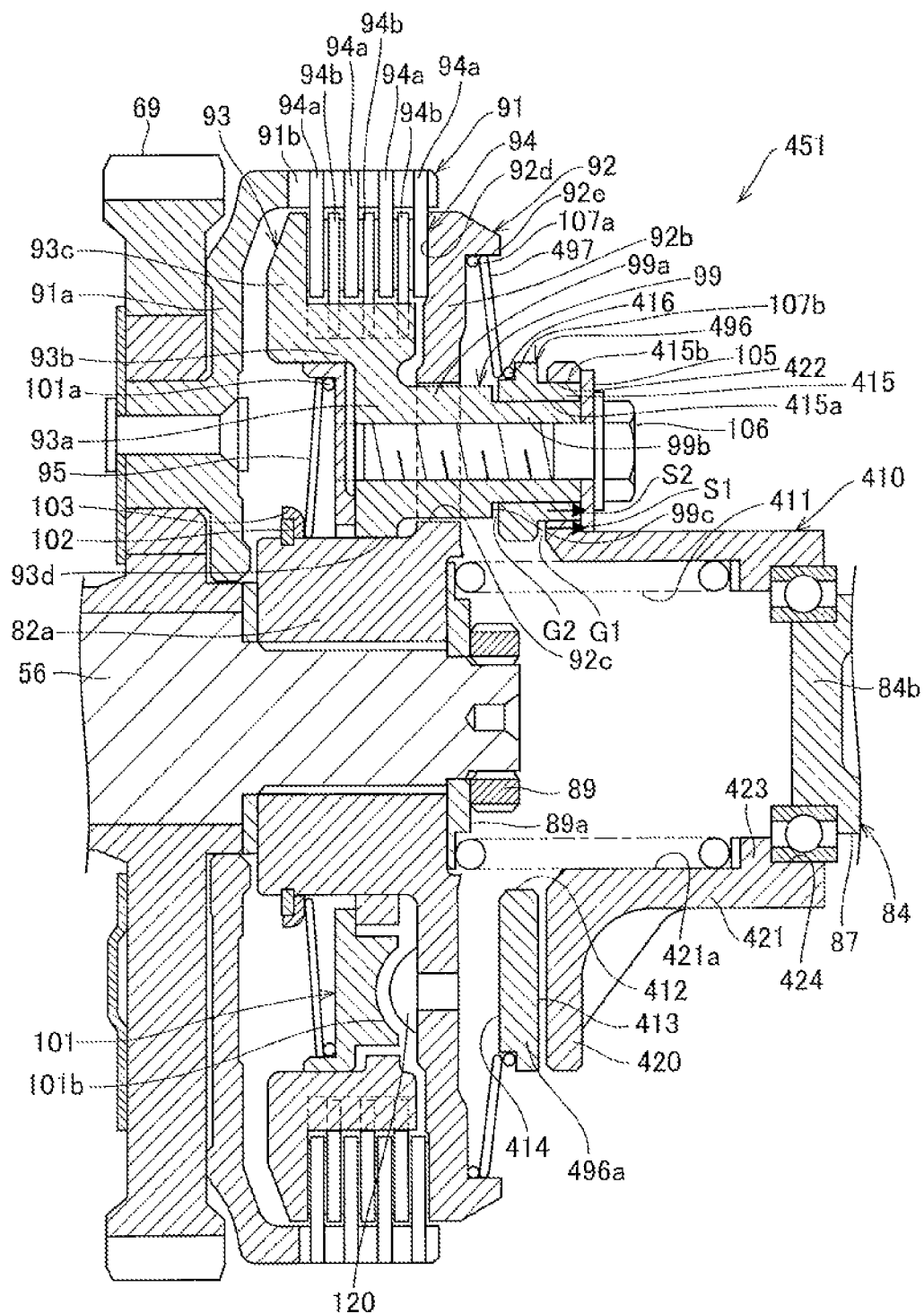
FIG. 20 is a cross-sectional view showing the clutch mechanism for gear shift.

FIG. 20 is a cross-sectional view showing the clutch mechanism 451 for gear shift.

The lifter plate 496 is formed in a disc-shape to be smaller in diameter than the clutch center 92, and disposed between the clutch center 92 and the lifter cam plate 84. The lifter plate 496 has a ring-shaped portion 496a, a spring pass hole 412 provided at the center of the ring-shaped portion 496a, a sub lifter plate contact face 413 which confronts the sub lifter plate 410, and a pressure plate contact face 414 which confronts the clutch center 92 at the back side of the sub lifter plate contact face 413. The lifter plate 496 has a lifter plate side boss 415 which projects from a neighborhood of the outer periphery of the sub lifter plate contact face 413 to the lifter cam plate 84 side, and an annular sub spring receiving portion 416 provided on the whole periphery of the outer peripheral portion of the pressure plate contact face 414. The sub spring receiving portion 416 is formed by inlaying the receiving member 107b into the step portion provided to the outer peripheral portion of the pressure contact face 414.

A plurality of lifter plate side bosses 415 are formed and arranged to be spaced from one another at substantially equal intervals in the peripheral direction of the lifter plate 496. The lifter plate side boss 415 is formed in a cylindrical shape, and has a hole portion 415a in which the guide shaft portion 99b of the release boss 99 (pressure plate side boss) is inserted (a hole in which the pressure plate side boss is inserted), and an outer peripheral portion 415b to which the sub lifter plate 410 is fitted. The diameter of the hole portion 415a is set to be smaller than the outer diameter of the step portion 99c and the outer diameter of the stopper plate 105, and also slightly larger than the guide shaft portion 99b so that the lifter plate side boss 415 is slidable on the guide shaft portion 99b.

The sub lifter plate 410 has a ring-shaped press plate portion 420 (ring-shaped portion) which confronts the lifter plate 496, and a cylindrical circular pipe portion 421 projecting from the inner peripheral edge of the center of the press plate portion 420 to the lifter cam plate 84 side. The press plate portion 420 is provided with the circular pipe portion 421, so that the center portion which is substantially coincident with the center of the main shaft 56 is opened. The main shaft 56 is a shaft for the clutch for supporting the clutch mechanism 451 at one end of the main shaft 56.

The press plate portion 420 has a hole portion 422 (a hole in which the lifter plate side boss penetrates) in which the lifter plate side boss 415 of the lifter plate 496 is fitted. A plurality of hole portions 422 are formed at the positions corresponding to the respective lifter plate side bosses 415. The hole portion 42 is formed to be slightly larger in diameter than the outer peripheral portion 415a so that the press plate portion 420 is slidable on the outer peripheral portion 415b of the lifter plate side boss 415.

A bearing support hole portion 424 to which the outer wheel of the ball bearing 87 is fitted is provided to the inner peripheral surface of the tip portion of the circular pipe portion 421, and the lifter cam plate 84 is rotatable relatively to the sub lifter plate 410 through the ball bearing 87.

The circular pipe portion 421 has an annular spring receiving step portion 423 which is provided on the inner peripheral portion 421a so as to project inwards in the radial direction (a step portion extending inwards in the radial direction). The bottom portion of the bearing support hole portion 424 is constructed by the spring receiving step portion 423. The sub spring 411 is a coil spring provided coaxially with the main shaft 56, and accommodated in the inner peripheral portion 421a of the circular pipe portion 421. The sub spring 411 is supported at one end thereof by the spring receiving step portion 423, and the other end is passed through the spring pass hole 412 and supported by the clutch center 92. Specifically, the other end of the sub spring 411 is supported by the clutch center 92 through a step portion which is provided to a washer 89a interposed between a nut 89 and the clutch center 92.

The sub spring 411 urges the press plate portion 420 of the sub lifter plate 410 in such a direction that the press plate portion 420 is brought into contact with the stopper plate 105 while the clutch center 92 fixed to the main shaft 56 serves as a spring seat. The urging force of the sub spring 411 is transmitted to the pressure plate 93 through the stopper plate 105 and the fixing bolt 106, and the pressure plate 93 presses the clutch plate 94 as if it is pulled to the sub lifter plate 410 side. That is, the urging direction of the sub spring 411 is identical to the urging direction of the main spring 95, which is the clutch engagement direction.

The lifter plate 496 is provided to the release boss 99 while fitted to the guide shaft portion 99b, and the sub lifter plate 410 is fitted to the lifter plate side boss 415 of the lifter plate 496. Thereafter, the topper plate 105 (fixing member) and the fixing bolt 106 (fixing member) are fixed to the tip portion of the release boss 99, whereby the lifter plate 496 and the sub lifter plate 410 are assembled between the step portion 99c and the stopper plate 105.

The length in the axial direction of the lifter plate side boss 415 is set to be smaller than the interval between the step portion 99c and the stopper plate 105. Under the clutch engagement state shown in FIG. 20, the lifter plate 496 is urged to the stopper plate 105 side by the second sub spring 497, and a gap G2 is formed between the step portion 99c and the pressure plate contact face 414. That is, under the clutch connection state, the tip of the lifter plate side boss 415 presses the stopper plate 105 in the clutch engagement direction.

The plate thickness of the peripheral portion of the hole portion 422 of the sub lifter plate 410 is set to be smaller than the length in the axial direction of the lifter plate side bosses 415, that is, the interval between the stopper plate 105 and the sub lifter plate contact face 413. Under the clutch engagement state shown in FIG. 20, the sub lifter plate 410 is urged to the stopper plate 105 side by the sub spring 411, and a gap G1 (predetermined amount) is formed between the sub lifter plate contact face 413 and the press plate portion 420.

Under the clutch engagement state, the clutch plate 94 is pinched by the urging forces of the main spring 95, the second sub spring 497 and the sub spring 411, whereby the rotation of the clutch outer 91 rotated by the primary gear 37 is allowed to be transmitted to the clutch center 92 through the clutch plate 94 and the pressure plate 93, and the main shaft 56 is rotated integrally with the clutch center 92.

When the pressure plate 93 is moved against the urging forces of the main spring 95, the second sub spring 497 and the sub spring 411 through the lifter cam plate 84, the pinch of the clutch plate 94 is released and thus the clutch is set to the release state.

Figure 21:
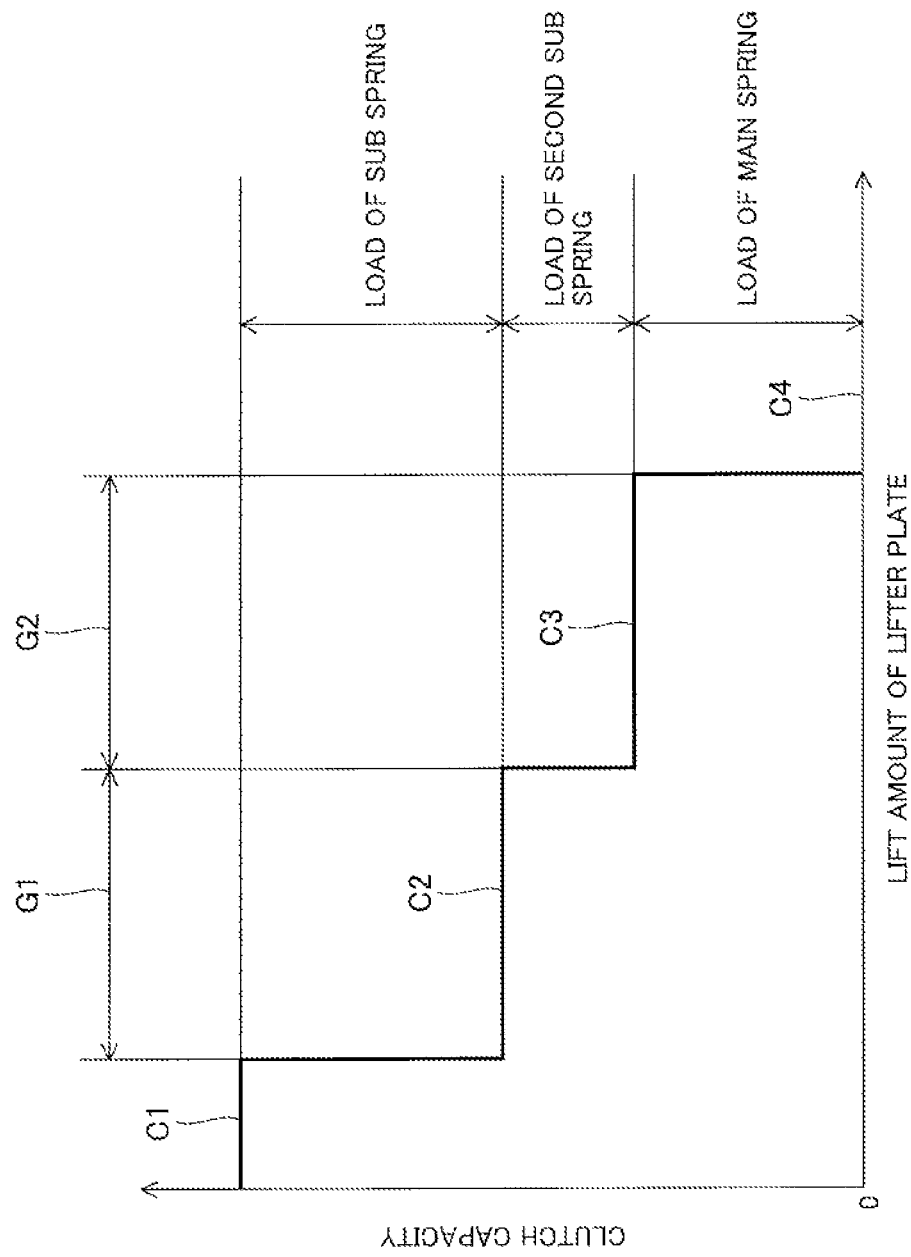
FIG. 21 is an example of a diagram showing the clutch capacity of the clutch mechanism for gear shift.

FIG. 21 is an example of a diagram showing the clutch capacity of the clutch mechanism 451 for gear shift.

As shown in FIG. 21, in the fourth embodiment, the capacity of the clutch mechanism 45 for gear shift is made variable by changing a spring which contributes to the clutch capacity. Specifically, the clutch capacity is variable among plural stages of a maximum capacity C1 at which the clutch capacity is determined by the urging forces of the main spring 95, the second sub spring 497 and the sub spring 411, a first intermediate capacity C2 at which the clutch capacity is determined by the urging forces of the main spring 95 and the second sub spring 497, a second intermediate capacity C3 at which the clutch capacity is determined by only the urging force of the main spring 95, and a release capacity C4 at which the whole urging force of the main spring 95 is removed.

The maximum capacity C1 of the clutch capacity is obtained under the clutch engagement state shown in FIG. 20. Under this state, both the sub lifter plate 410 and the lifter plate 496 are in contact with the stopper plate 105 through the press plate portion 420 and the lifter plate side boss 415, and the urging forces of the sub spring 411 and the second sub spring 497 are transmitted to the pressure plate 93 through the stopper plate 105 and the fixing bolt 106. Therefore, the urging force with which the pressure plate 93 presses the clutch plate 94 is equal to the sum of the urging forces of the main spring 95, the second sub spring 49 and the sub spring 411, and it becomes the maximum value.

That is, the lifter plate 496 and the stopper plate 105 constitute the second sub spring load transmission passage S2 for transmitting the urging force of the second sub spring 497 to the pressure plate 93. Furthermore, the sub lifter plate 410 and the stopper plate 105 constitutes the sub spring load transmission passage S1 for transmitting the urging force of the sub spring 411 to the pressure plate 93.

Figure 22:
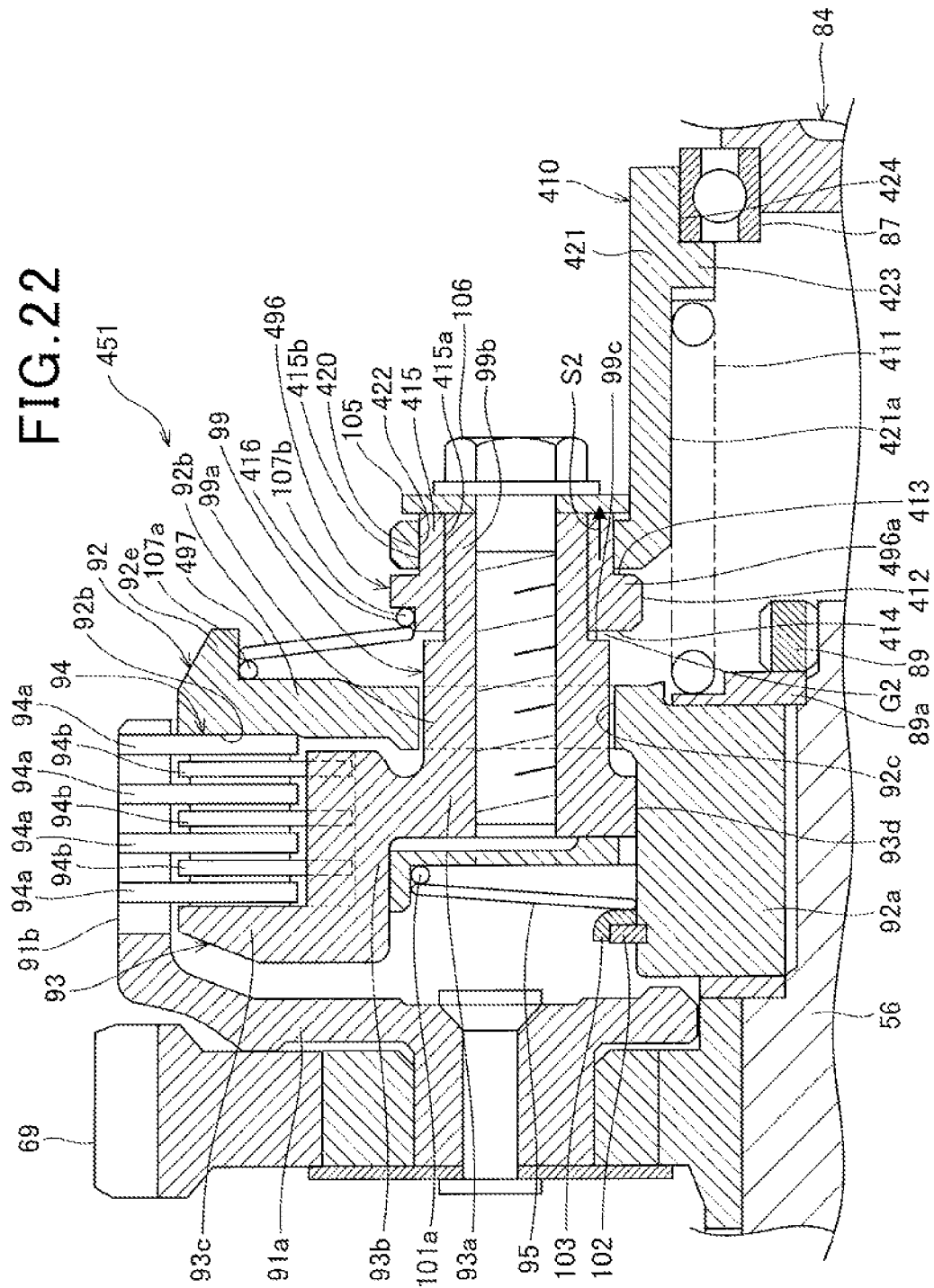
FIG. 22 is a cross-sectional view showing the clutch mechanism for gear shift under a first intermediate-capacity state.

FIG. 22 is a cross-sectional view showing the clutch mechanism 451 for gear shift under the state of the first intermediate capacity C2.

When the lifter cam plate 84 is moved in the clutch release direction in connection with the rotation of the shift spindle 71 by the actuator mechanism 54 (FIG. 3), as shown in FIG. 22, the sub lifter plate 410 is lifted to the sub lifter plate contact face 413 side along the lifter plate side boss 415 against the urging force of the sub spring 411, and separates from the stopper plate 105.

The sub lifter plate 410 separates from the stopper plate 105, whereby the sub spring load transmission passage S1 is cut off, and the urging force of the sub spring 411 is not transmitted to the pressure plate 93, so that the clutch capacity is determined by the main spring 95 and the second sub spring 497. Therefore, the clutch capacity decreases from the maximum capacity C1 to the first intermediate capacity C2 instantaneously when the sub lifter plate 410 separates from the stopper plate 105 as shown in FIG. 21. A first predetermined lift amount of the sub lifter plate 410 at which the sub spring load transmission passage S1 is cut off may be set to be larger than zero.

When the movement of the lifter cam plate 84 is continued after the sub lifter plate 410 separates from the stopper plate 105, the sub lifter plate 410 continues to further move to the sub lifter plate contact face 413 side so as to reduce the gap G1 (FIG. 20). The section from the separation of the press plate portion 420 of the sub lifter plate 410 from the stopper plate 105 till the contact of the press plate portion 420 with the sub lifter plate contact face 413 corresponds to the section of the first intermediate capacity C2. That is, the first intermediate capacity C2 is obtained in the section of the lift amount of the lifter cam plate 84 which corresponds to the size of the gap G1.

In the section of the first intermediate capacity C2, the sub lifter plate 410 merely moves relatively to the sub lifter plate contact face 413, and has no effect on the loads of the main spring 95 and the second sub spring 497. Therefore, as shown in FIG. 21, in the section of the first intermediate capacity C2, the clutch capacity is determined by the main spring 95 and the second sub spring 497, and the first intermediate capacity C2 is fixed. In the fourth embodiment, since a backlash based on the gap G1 is provided, the section in which the first intermediate capacity C2 is obtained can be lengthened, and the intermediate capacity of the clutch can be easily matched with a set value without providing any high-precision part and control method.

Figure 23:
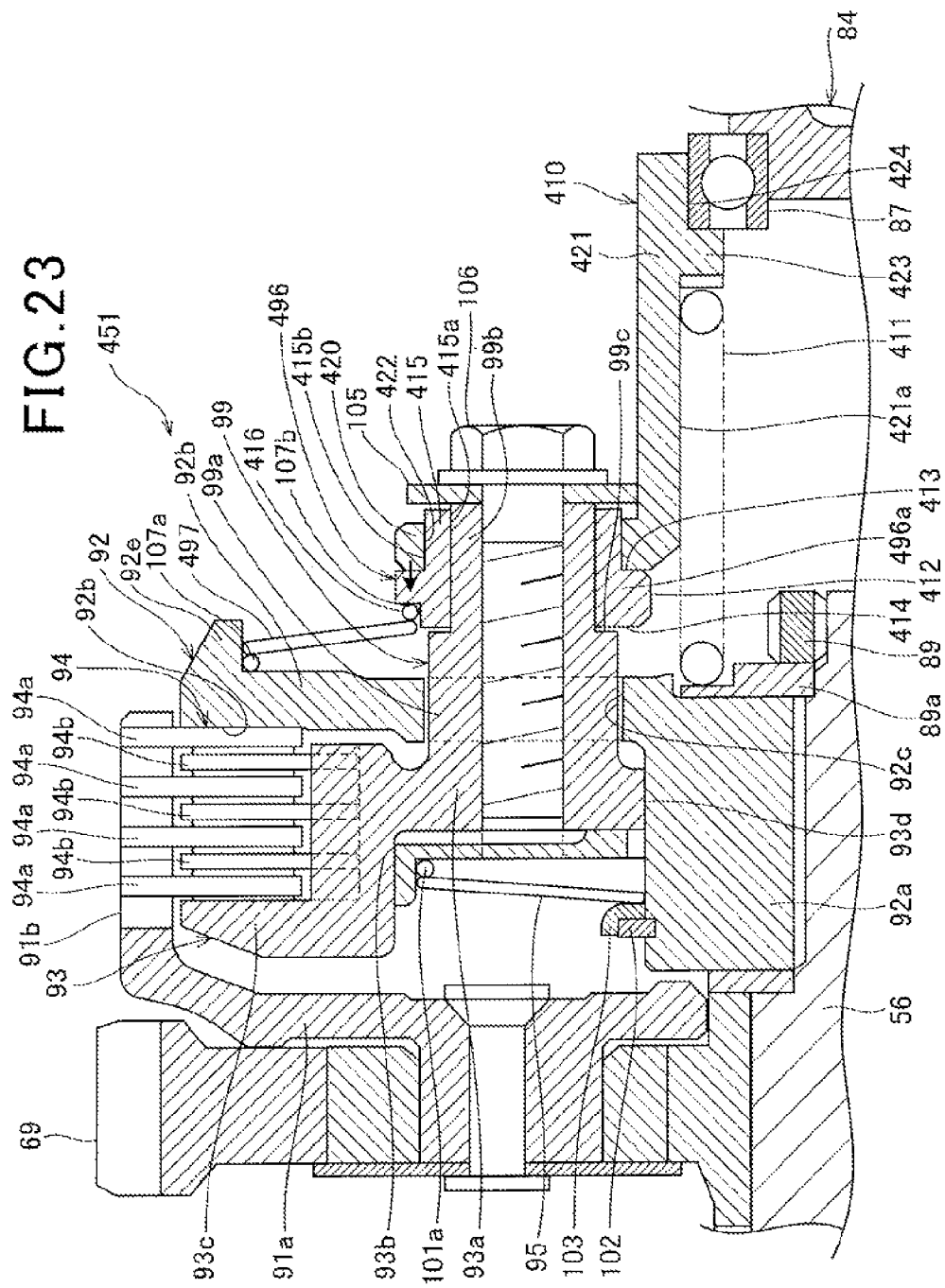
FIG. 23 is a cross-sectional view showing the clutch mechanism for gear shift under a second intermediate-capacity state.

FIG. 23 is a cross-sectional view showing the clutch mechanism 451 for gear shift under the state of the second intermediate capacity C3.

When the lifter cam plate 84 is further lifted in the clutch release direction from the state of FIG. 22, the press plate portion 420 of the sub lifter plate 410 comes into contact with the sub lifter plate contact face 413, and the section of the first intermediate capacity C2 is finished. Thereafter, when the lifter cam plate 84 further moves from the above state, as shown in FIG. 23, the lifter plate 496 is pressed through the sub lifter plate 410, lifted to the step portion 99c side along the guide shaft portion 99b against the urging force of the second sub spring 497 and separated from the stopper plate 105.

The tip of the lifter plate side boss 415 of the lifter plate 496 separates from the stop plate 105, whereby the second sub spring load transmission passage S2 is cut off, and the urging force of the second sub spring 497 is not transmitted to the pressure plate 93, so that the clutch capacity is determined by only the main spring 95. Therefore, as shown in FIG. 21, the clutch capacity decreases from the first intermediate capacity C2 to the second intermediate capacity C3 instantaneously when the lifter plate 496 separates from the stopper plate 105. A second predetermined lift amount of the lifter plate 496 at which the second sub spring load transmission passage S2 is cut off may be set to be larger than zero.

When the movement of the lifter cam plate 84 is continued after the lifter plate 496 separates from the stopper plate 105, the lifter plate 96 continues to further move to the step portion 99c side so as to reduce the gap G2. The section from the separation of the lifter plate 496 from the stopper plate 105 till the contact of the lifter plate 496 with the step portion 99c corresponds to the section of the second intermediate capacity C3. That is, the second intermediate capacity C3 is obtained in the section of the lift amount of the lifter cam plate 84 which corresponds to the size of the gap G2.

In the section of the second intermediate capacity C3, the lifter plate 496 merely moves relatively to the step portion 99c, and has no effect on the load of the main spring 95. Therefore, as shown in FIG. 21, the clutch capacity is determined by only the main spring 95 and the second intermediate capacity C3 is fixed in the section of the second intermediate capacity C3. In the fourth embodiment, a backlash based on the gap G2 is provided. Therefore, the section in which the second intermediate capacity C3 is obtained can be lengthened, and the intermediate capacity of the clutch can be easily matched with a set value without providing any high-precision part and control method.

Figure 24:
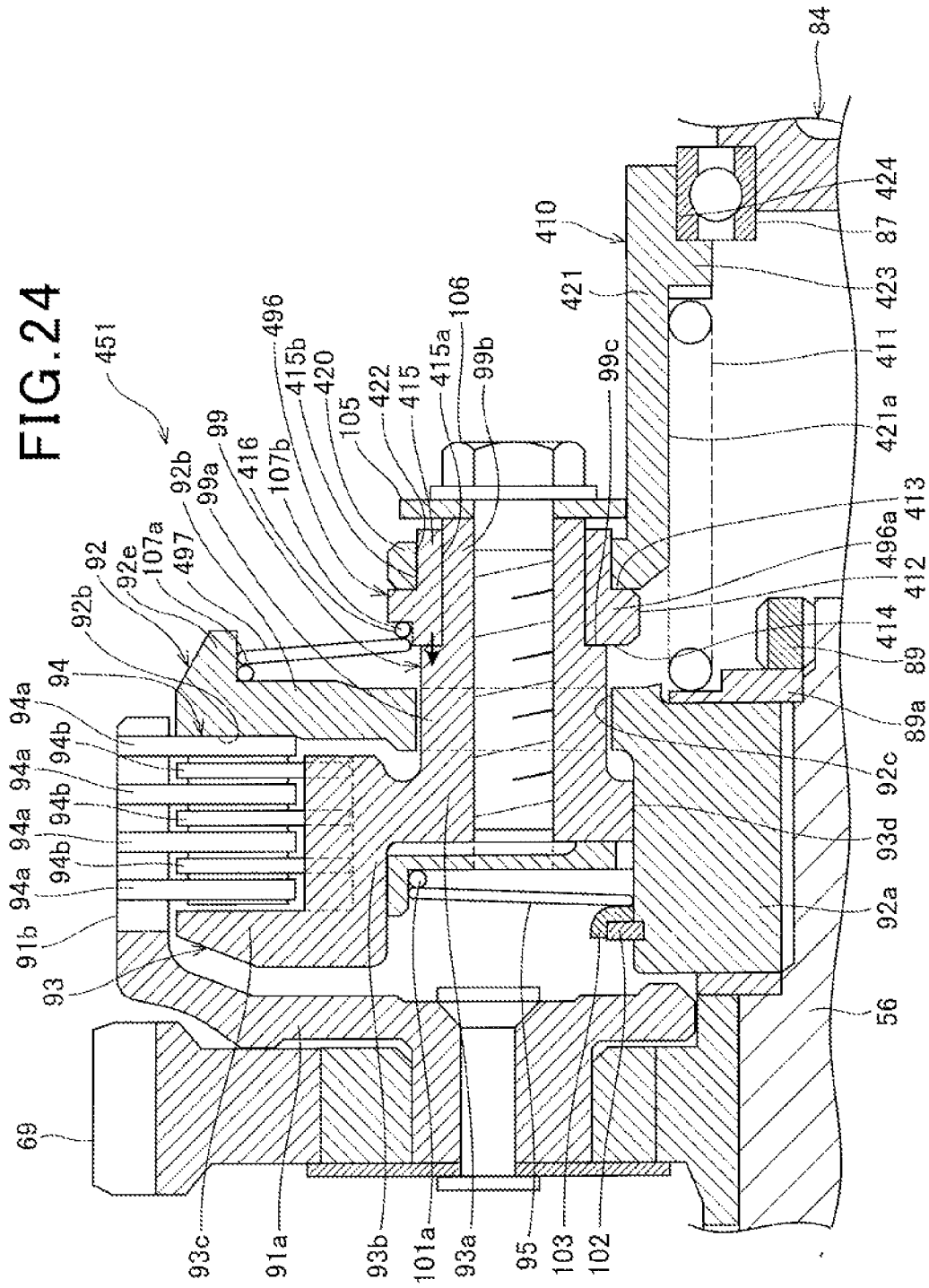
FIG. 24 is a cross-sectional view showing the clutch mechanism for gear shift under a released capacity state.

FIG. 24 is a cross-sectional view showing the clutch mechanism 451 for gearshift under the state of the release capacity C4.

When the lifter cam plate 84 is further lifted in the clutch release direction from the state shown in FIG. 23, the lifter plate 496 comes into contact with the step portion 99c, and the section of the second intermediate capacity C3 is finished. Thereafter, when the lifter cam plate 84 further moves from the above state in the clutch release direction, the pressure plate 93 is pressed through the sub lifter plate 41 and the lifter plate 496 as shown in FIG. 24, whereby the pressure plate 93 moves in the clutch release direction, and the press plate portion 93c of the pressure plate 93 separates from the outer friction plates 94a, whereby the clutch is released.

In the fourth embodiment, the judder spring 98 of the first embodiment is not provided.

As described above, according to the fourth embodiment to which the present invention is applied, the clutch mechanism 451 for gear shift is provided with the main spring 95 for pressing the plural clutch plates 94 in the clutch engagement direction between the clutch center 92 fixed in the axial direction and the pressure plate 93 displaceable in the axial direction, the lifter plate 496 which is displaced by the lifter cam plate 84 to lift the pressure plate 93 in the clutch release direction, the sub lifter plate 410 which is separate from the lifter plate 496, displaceable relatively to the lifter plate 496 and disposed to be nearer to the lifter cam plate 84 side than the lifter plate 496, the sub spring 411 which presses the pressure plate 93 in the clutch engaging direction through the sub lifter plate 410, and the sub lifter plate 410 is lifted by a predetermined amount, whereby the sub lifter plate 410 separates from the stopper plate 105 of the pressure plate 93 and the sub spring load transmission passage S1 to the pressure plate 93 is cut off. Accordingly, under the clutch engagement state, the load of the sub spring 411 which presses in the clutch engagement direction is transmitted to the pressure plate 93 through the sub lifter plate 410, and when the sub lifter plate 410 is lifted by a predetermined amount to release the clutch, the sub spring load transmission passage S1 to the pressure plate 93 of the sub spring 411 is cut off. Therefore, the clutch engaging load can be secured by the main spring 95 and the sub spring 411 which press in the clutch engagement direction, and under gear shift, the clutch engaging load can be produced by a load excluding the urging force of the sub spring 411. Accordingly, the clutch capacity can be set at multi-stages based on the maximum capacity C1 under the clutch engagement state and the first intermediate capacity C2 under the state that the sub lifter plate 410 is lifted. Therefore, the clutch mechanism 451 for gear shift which can reduce shift shock by changing the clutch capacity can be implemented with a simple construction.

The pressure plate 93 is provided with the guide shaft portion 99b projecting to the lifter plate 496 side, the lifer plate 496 is provided with the lifter plate side boss 415 which projects to the sub lifter plate 410 side and has the hole portion 415a through which the guide shaft portion 99b penetrates, the sub lifter plate 410 is provided with the hole portion 422 through which the lifter plate side boss 415 penetrates, the stopper plate 105 and the fixing bolt 106 which are held under the state that the lifter plate side boss 415 and the sub lifter plate 410 are assembled are provided at the end portion of the guide shaft portion 99b, and the load of the sub lifter plate 410 is transmitted to the stopper plate 105 and the fixing bolt 106. Therefore, the load of the sub lifter plate 410 can be transmitted to the pressure plate 93 through the stopper plate 105 and the fixing bolt 106, and the sub spring load transmission passage S1 can be formed with a simple construction.

Furthermore, the length of the lifer plate side boss 415 is set to be longer than the length of the peripheral portion of the hole portion 422 of the sub lifter plate 410, and when the sub lifter plate 410 is lifted by the gap G1 as the predetermined amount, the sub lifter plate 410 is brought into contact with and displaced integrally with the lifter plate 496. Therefore, the area of the first intermediate capacity C2 can be adjusted on the basis of the relationship of the lifter plate side boss 415 and the thickness of the peripheral portion of the hole portion 422, and the lifter plate 496 can be directly lifted by the sub lifter plate 410 after the sub lifter plate 410 is lifted by the gap G1.

Furthermore, the lifter plate 496 and the sub lifter plate 410 have the ring-shaped portion 496a and the press plate portion 420 which are configured as ring-shaped portions and opened at the center side of the main haft 56 of the clutch, and integrally provided with the circular pipe portion 421 which projects from the inner peripheral edge of the press plate portion 420 to the lifter cam plate 84 side, the spring receiving step portion 423 extending inwards in the radial direction is provided to the lifter cam plate 84 side of the inner peripheral surface of the circular pipe portion 421, and the sub spring 411 is disposed between the main shaft 56 and the circular pipe portion 421 in the radial direction and is in contact with the clutch center 92 and the spring receiving step portion 423. Therefore, the sub spring 411 can be disposed compactly in the radial direction.

The second sub spring 497 for urging the pressure plate 93 in the clutch engagement direction through the lifter plate 496 is provided between the clutch center 92 and the lifter plate 496, and the lifter plate 496 is lifted by a predetermined amount or more, whereby the urging force of the second sub spring 497 to the pressure plate 93 is cut off. Therefore, the clutch engaging load can be obtained by the urging force of the second sub spring 497, and also when the clutch is released, the number of stages of the clutch capacity can be further increased by cutting off the urging force of the second sub spring 497.

[Modification 1]

A modification 1 of the fourth embodiment to which the present invention is applied will be described hereunder with reference to FIG. 25. In this modification 1, those parts which have the same constructions as the fourth embodiment are represented by reference numerals, and the descriptions thereof are omitted.

In this modification 1, the construction that the sub spring 411 as shown in the fourth embodiment is applied to the clutch mechanism for gear shift in which the sub spring and the sub pressure plate are disposed between the clutch outer 91 and the pressure plate.

In this modification 1, only one lifter plate exists, and thus the sub lifter plate 410 described with reference to the fourth embodiment will be described while referred to as lifter plate 410.

Figure 25:
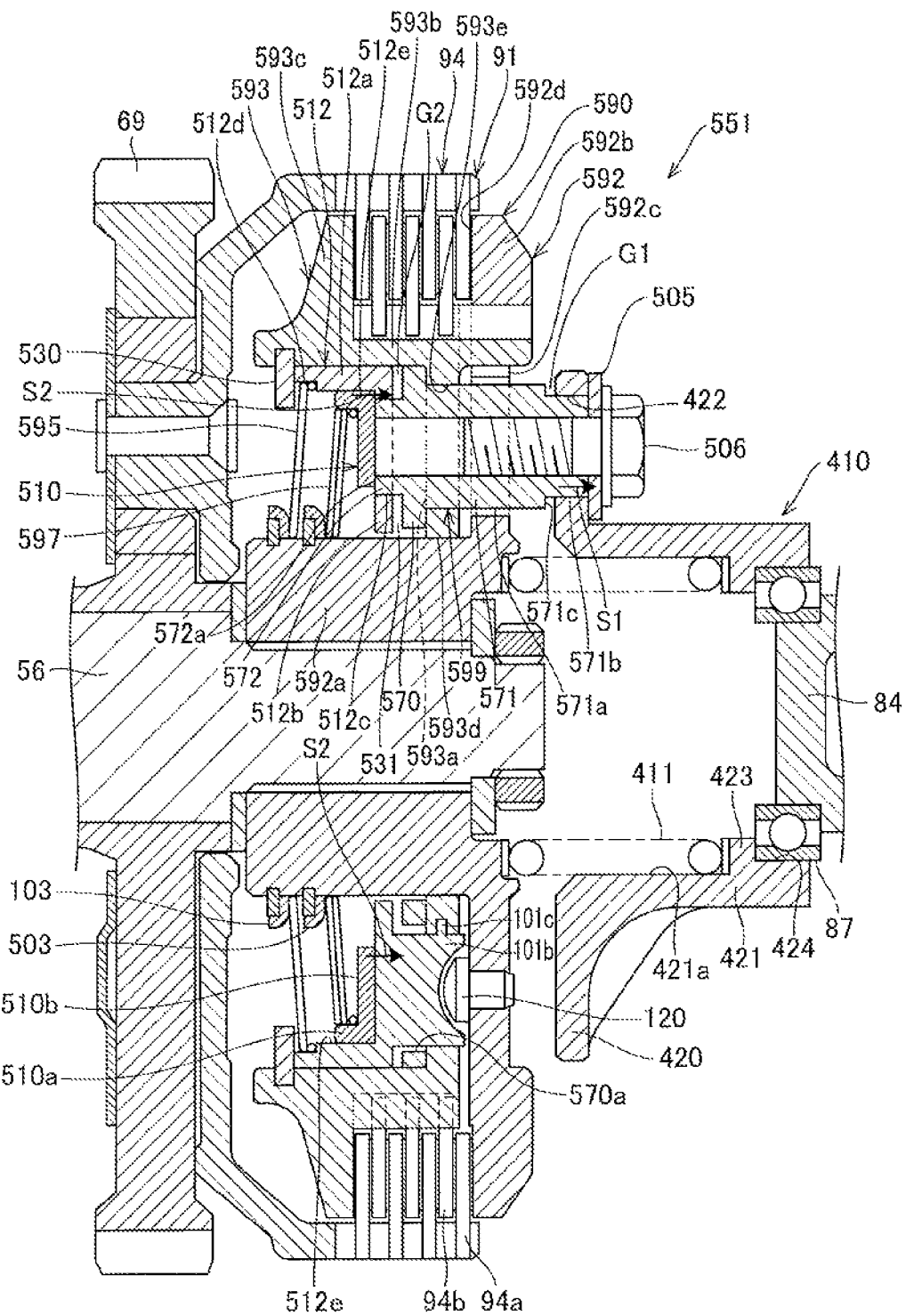
FIG. 25 is a cross-sectional view showing a clutch mechanism for gear shift according to a modification 1.

FIG. 25 is a cross-sectional view showing the clutch mechanism 551 for gear shift according to the modification 1.

The clutch mechanism 551 for gear shift has a clutch outer 91, a clutch center 592 which is provided inside the clutch outer 91 in the radial direction and integrally fixed to the main shaft 56, a pressure plate 593 movable in the axial direction of the main shaft 56, a back torque limit member 512 provided inside the pressure plate 593, a clutch plate 94 provided between the pressure plate 593 and the clutch center 592, and a main spring 595 for urging the pressure plate 593 in the clutch engagement direction.

Furthermore, the clutch mechanism 551 for gear shift has a lifter plate 410 for moving the pressure plate 593 in the clutch release direction, a sub spring 411 for urging the lifter plate 410 in the clutch engagement direction, a release member 599 provided between the lifter plate 410 and the pressure plate 593, a sub pressure plate 510 which is provided inside the pressure plate 593 in the radial direction and movable in the axial direction relatively to the pressure plate 593, and a second sub spring 597 for urging the pressure plate 593 in the clutch engagement direction through the sub pressure plate 510. The clutch center 592 and the pressure plate 593 are assembled and integrated into one body, and constitute a clutch inner 590 disposed inside the clutch outer 91.

The lifter plate 410 is formed to be substantially disc-shaped, and disposed between the clutch center 592 and the lifter cam plate 84.

The release member 599 has a plate-shaped flange ring 570 which is formed to have a larger diameter than the hub portion 592a of the clutch center 592, a cylindrical release boss 571 which projects in the axial direction from the surface of the flange ring 570 to the lifter plate 410 side, and a cylindrical press boss portion 572 which projects from the surface of the flange ring 570 in the opposite side to the release boss 571. The press boss portion 572 is smaller in diameter than the release boss 571, and provided substantially coaxially with the release boss 571. The release boss 571 is longer in the axial direction than the press boss portion 572.

A plurality of release bosses 571 and a plurality of press boss portions 572 are provided to be spaced from one another in the peripheral direction of the flange ring 570 at substantially equal intervals. A through-hole 570a through which a part of the back torque limit member 512 penetrates is formed between the respective adjacent release bosses 571 is formed in the flange ring 570.

The release boss 571 has a column portion 571a penetrating through the pressure plate 593 and the clutch center 592, and a small-diameter boss portion 571b which is formed at the tip portion of the lifter plate 410 side thereof to be smaller in diameter than the column portion 571a. A step portion 571c (a step portion of the release boss) having a larger diameter than the small-diameter boss portion 571b is formed at the boundary portion between the small-diameter boss portion 571b and the column portion 571a. A stopper plate 505 constructed by a washer which is larger in diameter than the small-diameter boss portion 571b is provided to the tip surface of the small-diameter boss portion 571a, and the stopper plate 505 is fixed to the release boss 571 by a fixing bolt 506 which is screwed to the tip surface of the small-diameter boss portion 571b.

The lifter plate 410 is fastened by the fixing bolt 506 while each small-diameter boss portion 571b is fitted in each hole portion 422 (lifter plate side hole) of the press plate portion 420, whereby the lifter plate 410 is integrally connected to the release boss 571. The interval between the stopper plate 505 and the step portion 571c is set to be larger than the plate thickness of the press plate portion 420, and the lifter plate 410 is movable in the axial direction along the small-diameter boss portion 571b.

The clutch center 592 has a cylindrical hub portion 592a fixed to the main shaft 56, and a disc-shaped receiving plate portion 592b extending outwards in the radial direction from the shaft end portion of the hub portion 592a till a neighborhood of the inner peripheral surface of the clutch outer 91. A through-hole 592c through which the release boss 571 and the tip portion of the pressure plate 593 penetrate is formed in the receiving plate portion 592. A plurality of through-holes 592c are formed to be arranged in the peripheral direction of the hub portion 592a. The receiving plate portion 592b has a receiving face 592d for receiving the clutch plate 94 on the outer peripheral portion at the outside of the through-hole 592c.

The pressure plate 593 has an inner disc portion 593a which is disposed to confront the receiving plate portion 592b of the clutch center 592 inside the clutch outer 91, an inner cylindrical portion 593b which extends from the peripheral edge portion of the inner disc portion 593a to the disc portion 91a side of the clutch outer 91 in a substantially coaxial positional relationship with the main shaft 56, and a press plate portion 593c which extends outwards in the radial direction from the tip portion of the inner cylindrical portion 593b till a neighborhood of the inner peripheral surface of the clutch outer 91. The pressure plate 593 is formed to be rotatable relatively to the clutch center 592 by only a predetermined rotational angle to release back torque.

A fitting hole 593d which is freely slidably fitted to the outer peripheral surface of the hub portion 592a of the clutch center 592 is formed at the center of the inner disc portion 593a. A hole portion 593e through which the release boss 571 is inserted is provided around the fitting hole 593d in the inner disc portion 593a. A plurality of hole portions 593e are provided to be arranged in the peripheral direction of the inner disc portion 593a. A ring-shaped hook member 530 is provided to the inner periphery of the end portion of the inner cylindrical portion 593b. Each inner friction plate 94b is provided to the outer peripheral surface of the inner cylindrical portion 593b.

A back torque limit member 512 is integrally fixed to the pressure plate 593 inside the inner cylindrical portion 593b of the pressure plate 593. The back torque limit member 512 has a cylindrical portion 512a fitted to the inner peripheral surface of the inner cylindrical portion 593b, and a disc-shaped bottom plate portion 512b which blocks the bottom portion of the cylindrical portion 512a and confronts the flange ring 570, and receives the main spring 595. A receiving groove portion 512d which is larger in diameter at the inner peripheral portion by one stage is formed at the tip portion of the cylindrical portion 512a.

A plurality of boss through-holes 512c through which the press boss portions 572 penetrate are formed in the disc-shaped bottom plate portion 512b, and a cam portion 101b penetrating through the inner disc portion 593a is provided to the disc-shaped bottom plate portion 512b. The cam portion 101b is engaged with the lifter pin 120 fixed to the clutch center 592. The cam portion 101b has an engagement portion 101c which projects in the radial direction and engages with the pressure plate 593.

The engagement portion 101c engages with the pressure plate 593, and the end of the cylindrical portion 512a is in contact with the hook member 530, whereby the back torque limit member 512 is fixed to the pressure plate 593 in the axial direction.

A space 531 in which the flange ring 570 is accommodated is formed between the disc-shaped bottom plate portion 512b of the back torque limit member 512 and the inner disc portion 593a of the pressure plate 593.

The main spring 595 is a ring-shaped disc spring, and the outer diameter portion of the main spring 595 is supported by the receiving groove portion 512d of the back torque limit member 512 while the inner diameter portion of the main spring 595 is supported by the retainer 103 provided to the hub portion 592a of the clutch center 592.

The main spring 595 urges the pressure plate 593 through the back torque limit member 512 in a direction along which the clutch plate 94 is pinched by the pressure plate 593 and the clutch center 592, that is, in the clutch engagement direction.

The sub pressure plate 510 has a sliding cylindrical portion 510a which is fitted to the inner diameter portion 512e of the cylindrical portion 512a of the back torque limit member 512, and a disc-shaped bottom plate portion 510b which blocks the bottom portion of the sliding cylindrical portion 510a. The sub pressure plate 510 is movable in the axial direction relatively to the pressure plate 593 inside the back torque limit member 512. The bottom plate portion 510b is urged by the second sub spring 597, and brought into contact with the disc-shaped bottom plate portion 512b of the back torque limit member 512.

The second sub spring 597 is a ring-shaped disc spring provided between the main spring 595 and the sub pressure plate 510. The outer diameter portion of the second sub spring 597 is supported by the bottom plate portion 510b of the sub pressure plate 510, and the inner diameter thereof is supported by the ring-shaped retainer 503 provided to the hub portion 592a of the clutch center 592.

The second sub spring 597 urges the pressure plate 593 through the sub pressure plate 510 and the back torque limit member 512 while the retainer 503 serves as a spring seat, thereby pressing the clutch plate 94.

That is, the urging direction of the second sub spring 597 is identical to the urging direction of the main spring 595, and is the clutch engagement direction.

The release member 599 is disposed so that the release boss 571 is inserted in the hole portion 593e of the pressure plate 593 and the flange ring 570 is located in the space 531. Furthermore, the press face 572a at the tip of the press boss portion 572 is inserted from the space 531 side into the boss through-hole 512c, and the press face 572a is in contact with the bottom portion 510b of the sub pressure plate 510. The size in the axial direction of the space 531 is larger than the thickness of the flange ring 570.

Under the clutch engagement state shown in FIG. 25, a gap G2 is formed between the flange ring 570 and the bottom plate portion 510b of the sub pressure plate 510.

The lifter plate 410 is urged to the lifter cam plate 84 side by the sub spring 411 interposed between the spring receiving step portion 423 and the clutch center 592.

Under the clutch engagement state, the lifter plate 410 is urged by the sub spring 411 so that the press plate portion 420 is in contact with the stopper plate 505, and the gap G1 is formed between the step portion 571c and the press plate portion 420. The urging force of the sub spring 411 which is transmitted to the release member 599 through the stopper plate 505 is transmitted to the pressure plate 593 through the flange ring 570.

That is, under the clutch engagement state, the pressure plate 593 is urged in the clutch engagement direction in such a way as to be pulled by the sub spring 411.

The clutch mechanism 551 for gear shift has the same clutch capacity as the clutch mechanism 451 for gear shift as shown in FIG. 21.

As shown in FIG. 21, in this modification 1, the clutch capacity is variable at four stages of a maximum capacity C1 at which the clutch capacity is determined by the urging forces of the main spring 595, the second sub spring 597 and the sub spring 411, a first intermediate capacity C2 at which the clutch capacity is determined by the urging forces of the main spring 595 and the second sub spring 597, a second intermediate capacity C3 at which the clutch capacity is determined by the urging force of only the main spring 595, and a release capacity C4 excluding the whole urging force of the main spring 595.

The maximum capacity C1 of the clutch capacity is obtained under the clutch engagement state shown in FIG. 25. In this state, the sub pressure plate 510 is in contact with the back torque limit member 512 through the bottom plate portion 510b, and the urging force of the second sub spring 597 is transmitted to the pressure plate 593. Furthermore, the lifter plate 410 is in contact with the stopper plate 505 through the press plate portion 420, and the urging force of the sub spring 411 is transmitted to the pressure plate 593 through the stopper plate 505, the fixing bolt 506 and the release member 599. Therefore, the urging force with which the pressure plate 593 presses the clutch plate 94 is equal to the sum of the urging forces of the main spring 595, the second sub spring 597 and the sub spring 411, and becomes the maximum value.

That is, the sub pressure 510 and the back torque limit member 512 constitute the second sub spring load transmission passage S2 for transmitting the urging force of the second sub spring 597 to the pressure plate 593. Furthermore, the lifter plate 410 and the stopper plate 505 constitute the sub spring load transmission passage S1 for transmitting the urging force of the sub spring 411 to the pressure plate 593.

Here, the operation of the clutch mechanism 551 for gear shift will be described.

When the lifter cam plate 84 moves in the clutch release direction, the lifter plate 410 is lifted to the step portion 571c against the urging force of the sub spring 411, and separated from the stopper plate 505.

The lifter plate 410 separates from the stopper plate 505, whereby the sub spring load transmission passage S1 is cut off and the urging force of the sub spring 411 is not transmitted to the pressure plate 593, so that the clutch capacity is determined by the main spring 595 and the second sub spring 597. Accordingly, the clutch capacity decreases from the maximum capacity C1 to the first intermediate capacity C2 as shown in FIG. 21 instantaneously when the lifter plate 410 separates from the stopper plate 505. A first predetermined lift amount of the lifter plate 410 at which the sub spring load transmission passage S1 is cut off may be equal to be larger than zero.

The first intermediate capacity C2 is obtained in the section from the separation of the press plate portion 420 of the lifter plate 410 from the stopper plate 105 till the contact of the press plate portion 420 with the step portion 571c. That is, when the gap G1 is equal to zero, the section of the first intermediate capacity C2 is finished.

In the section of the first intermediate capacity C2, the lifter plate 410 merely moves relatively to the step portion 571, and has no effect on the loads of the main spring 595 and the second sub spring 597. Therefore, the first intermediate capacity C2 is fixed as shown in FIG. 21.

When the lifter plate 410 further moves in the clutch release direction after the lifter plate 410 comes into contact with the step portion 571c and the section of the first intermediate capacity C2 is finished, the sub pressure plate 510 is pressed to the press face 572a. Accordingly, the sub pressure plate 510 is moved against the urging force of the second sub spring 597, and the bottom plate portion 510b of the sub pressure plate 510 separates from the disc-shaped bottom plate portion 512b of the back torque limit member 512 in the axial direction, so that the second sub spring load transmission passage S2 is cut off. As a result, the clutch capacity is determined by only the main spring 595. Therefore, the clutch capacity decreases from the first intermediate capacity C2 to the second intermediate capacity C3 as shown in FIG. 21 instantaneously when the bottom plate portion 510b separates from the disc-shaped bottom plate portion 512b. A second predetermined lift amount of the lifter plate 410 at which the second sub spring load transmission passage S2 is cut off may be set to be larger than zero.

The section from the separation of the bottom plate portion 510b from the disc-shaped bottom plate portion 512b till the contact of the flange ring 570 with the disc-shaped bottom plate portion 512b is the section of the second intermediate capacity C3. In the section of the second intermediate capacity C3, the clutch capacity is determined by only the main spring 595, and the second intermediate capacity C3 is fixed.

When the lifter plate 410 further moves in the clutch release direction after the second intermediate capacity C3 is finished and the gap G2 is equal to zero, the pressure plate 593 is directly pressed through the flange ring 570 and the back torque limit member 512, whereby the pressure plate 593 moves in the clutch release direction and the press plate portion 593c of the pressure plate 593 separates from the outer friction plate 94a, thereby releasing the clutch.

As described above, according to the modification 1 of the fourth embodiment to which the present invention is applied, the clutch mechanism 551 for gear shift has the main spring 595 which is provided between the clutch center 592 fixed in the axial direction and the pressure plate 593 displaceable in the axial direction and presses the clutch plate 94 in the clutch engagement direction, the lifter plate 410 which is displaced by the lifter cam plate 84 to lift the pressure plate 593 in the clutch release direction is provided, the release member 599 is provided between the pressure plate 593 and the lifter cam plate 84, the release member 599 is provided with the release boss 571 projecting to the lifter plate 410 side, the end portion at the release plate 410 side of the release boss 571 serves as a small-diameter boss portion 571b which is smaller in diameter than the diameter of the release boss 571 at the pressure plate 593 side, the lifter plate 410 is provided with the hole portion 422 through which the small-diameter boss portion 571b penetrates, the end portion of the small-diameter boss portion 571b is provided with the stopper plate 105 which is held while the lifter plate 410 is assembled with the stopper plate 105, and the fixing bolt 106, the sub spring 411 which is provided between the clutch center 592 and the lifter plate 410 and presses the pressure plate 593 in the clutch engagement direction through the stopper plate 105 and the fixing bolt 106, and the lifter plate 410 is lifted by a predetermined amount to be separated from the stopper plate 105, thereby cutting off the sub spring load transmission passage S1 to the pressure plate 593. Accordingly, under the clutch engagement state, the load of the sub spring 411 for pressing in the clutch engagement direction is transmitted to the pressure plate 593 through the stopper plate 105, the fixing bolt 106 and the release member 599, and when the lifter plate 410 is lifted by the predetermined amount at the clutch release time, the sub spring load transmission passage S1 to the pressure plate 593 is cut off. Therefore, the clutch engaging loads of the main spring 595 and the sub spring 411 which press in the clutch engaging direction can be secured, and the clutch engaging load can be produced by a load excluding the urging force of the sub spring 411. Accordingly, the clutch capacity can be set at plural stages among the maximum capacity C1 under the clutch engagement state and the first intermediate capacity C2 under the state that the lifter plate 410 is lifted, and the clutch mechanism 551 for gear shift which can reduce the shift shock by changing the clutch capacity can be implemented with a simple construction.

Furthermore, the small-diameter boss portion 571b of the release member 599 is configured to be longer in length than the thickness of the peripheral portion of the hole portion 422, and when the lifter plate 410 is lifted by only the amount corresponding to the gap G1 as the predetermined amount, the lifter plate 410 comes into contact with and displaces integrally with the step portion 571c of the release boss 571. Therefore, the area of the first intermediate capacity C2 of the clutch can be adjusted on the basis of the relationship of the small-diameter boss portion 571b and the thickness of the peripheral portion of the hole portion 422, and after the lifter plate 410 is lifted by the predetermined amount, the release boss 571 can be directly lifted by the lifter plate 410.

Furthermore, the lifter plate 410 has the ring-shaped press plate portion 420 which is opened at the center side of the main shaft 56 as the shaft of the clutch and is integrally provided with the circular pipe portion 421 which projects from the inner peripheral edge of the press plate portion 420 to the lifter cam plate 84 side, the spring receiving step portion 423 extending inwards in the radial direction is provided at the lifter cam plate 84 of the inner peripheral surface of the circular pipe portion 421, and the sub spring 411 is disposed between the main shaft 56 and the circular pipe portion 421 in the radial direction and is in contact with the clutch center 592 and the spring receiving step portion 423. Therefore, the sub spring 411 can be disposed compactly in the radial direction.

Furthermore, the sub pressure plate 510 which is separate from and displaceable relatively to the release member 599 and the pressure plate 593 is provided, the second sub spring 597 for pressing the pressure plate 593 in the clutch engagement direction through the sub pressure plate 510 is provided, and when the lifter plate 410 is lifted by the predetermined amount, the lifter plate 410 separates the sub pressure plate 510 from the pressure plate 593 through the release member 599, thereby cutting off the second sub spring load transmission passage S2 to the pressure plate 593. Therefore, the clutch engaging load can be obtained by the urging force of the second sub spring 597, and when the clutch is released, the number of the stages of the clutch capacity can be further increased by cutting off the urging force of the second sub spring 597.

[Modification 2]

A modification 2 of the fourth embodiment to which the present invention is applied will be described hereunder with reference to FIG. 26. In the modification 2, those parts which have the same constructions as the fourth embodiment are represented by the same reference numerals, and the descriptions thereof are omitted.

In this modification 2, the structure can be made compact by utilizing the space in the axial direction which is formed by providing the circular pipe portion 421 to the sub lifter plate 410 in the fourth embodiment.

Figure 26:
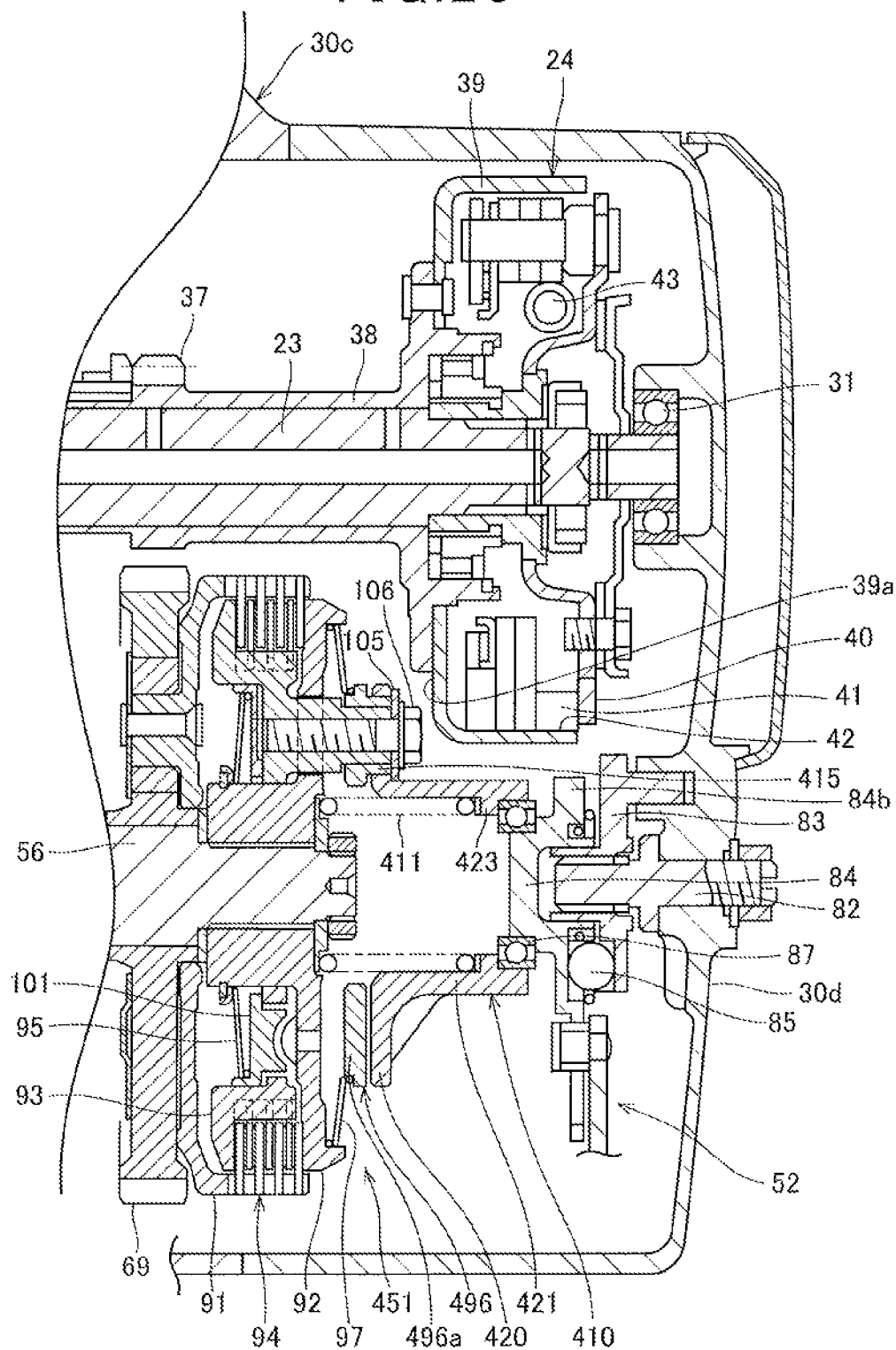
FIG. 26 is a cross-sectional view showing a peripheral portion of a clutch mechanism for gear shift according to a modification 2.

FIG. 26 is a cross-sectional view showing the peripheral portion of the clutch mechanism 451 for gear shift according to the modification 2.

The power unit 16 has the crankcase 30c as a power unit case in which a crankshaft 23 is accommodated. In the crankcase 30c, one end of the crankshaft 23 at the crankcase cover 30d side in the crankcase 30c is provided with a start clutch 24. The main shaft 56 is disposed in parallel to the crankshaft 23 behind the crankshaft 23, and the clutch mechanism 451 for gear shift is provided to one end of the main shaft 56.

The clutch operating mechanism 52 is supported by the crankcase cover 30d, and connected to the sub lifter plate 410 at one end in the axial direction of the clutch mechanism 451 for gear shift. Specifically, the clutch operating mechanism 52 is connected to the circular pipe portion 421 of the sub lifter plate 410 through the lifter cam plate 84 and the ball bearing 87. The outer diameter at the start clutch 24 side of the press operation portion 84b of the sub lifter plate 410 is substantially equal to the outer diameter of the circular pipe portion 421.

The clutch mechanism 451 for gear shift is disposed to be nearer to the inside of the crankcase 30c than the start clutch 24 and adjacent to the start clutch 24. Specifically, the clutch mechanism 451 for gear shift is disposed so that the circular pipe portion 421 of the sub lifter plate 410 and the outer case 39 of the start clutch 24 are located within the same width in the axial direction, and the press plate portion 420 of the sub lifter plate 410 and the outer case 39 are overlapped with each other when viewed in the axial direction of the main shaft 56. Furthermore, the fixing bolt 106 and the bottom face 39a of the outer case 39 confront each other, and a predetermined clearance is provided therebetween.

As described above, according to the modification 2 of the fourth embodiment to which the present invention is applied, the clutch mechanism 451 for gear shift is accommodated in the crankcase 30c, and the start clutch 24 through which the rotation of the engine 21 is input to the clutch is disposed within the same width in the axial direction as the circular pipe portion 421 of the sub lifter plate 410 in the crankcase 30c. Therefore, the start clutch 24 can be disposed by utilizing the space of the circular pipe portion 421, and the crankcase 30c can be miniaturized even in the construction that the sub spring 411 is disposed while the circular pipe portion 421 is provided.

Furthermore, the construction of the modification 2 may be applied to the construction of the modification 1 so that the clutch mechanism 551 for gear shift according to the modification 1 is accommodated in the crankcase 30c, and the start clutch 24 through which the rotation of the engine 21 is input to the clutch is disposed with the same width in the axial direction as the circular pipe portion 421 of the lifter plate 41 in the crankcase 30c.

DESCRIPTION OF REFERENCE NUMERALS 21 engine
24 start clutch
30c crankcase (power unit case)
51, 251, 351, 451, 551 clutch mechanism for gear shift (multiple plate clutch)
56 main shaft (main shaft, shaft of clutch)
84 lifter cam plate (lifter cam)
91 clutch outer
92, 292, 392, 492, 592 clutch center
92a, 292a, 392a hub portion
93, 293, 393, 593 pressure plate
94 clutch plate
94a outer friction plate
94b inner friction plate
95, 295, 395, 595 main spring
96 lifter plate (sub pressure plate)
96b hole portion (hole portion smaller in diameter than the stopper plate)
97, 297, 397 sub spring
98 judder spring
99, 271 release boss
99b guide shaft portion (pressure plate side boss)
99c step portion
105 stopper plate (fixing member)
106 fixing bolt (fixing member)
210, 310 sub pressure plate
210c seat portion
212d groove portion (seat portion of main spring)
212e inner diameter portion (inlay fitting hole)
270 flange ring (flange portion)
293e, 393e hole portion
296, 396 lifter plate
310c cut-out portion
315 spring holder
410 sub lifter plate (lifter plate)
411 sub spring
415 lifter plate side boss
415a hole portion (hole through which pressure plate side boss penetrates)
420 press plate portion (ring-shaped portion)
421 circular pipe portion
422 hole portion (hole through which lifter plate side boss penetrates, lifter plate side hole)
423 spring receiving step portion (step portion extending inwards in the radial direction)
496 lifter plate
496a ring-shaped portion
497 second sub spring
505 stopper plate (fixing member)
506 fixing bolt (fixing member)
510 sub pressure plate
571 release boss
571b small-diameter boss portion
571c step portion (step portion of release boss)
597 second sub spring
599 release member
L1 first predetermined amount (predetermined amount)
L2 second predetermined amount
G1 predetermined amount
S, S1 sub spring load transmission passage
S2 second sub spring load transmission passage

The invention claimed is:

1. A multiple plate clutch comprising:
a main spring provided between a clutch center fixed in an axial direction and a pressure plate displaceable in the axial direction and presses a plurality of clutch plates in a clutch engagement direction; and
a lifter plate for lifting the pressure plate in a clutch release direction, wherein
a sub spring for urging the pressure plate in a clutch engagement direction through the lifter plate is pinched in the axial direction between the clutch center and the lifter plate,
the lifter plate is lifted by a predetermined amount or more to thereby cut off urging force of the sub spring to the pressure plate,
the multiple plate clutch has a clutch outer disposed at an outside of the clutch center in a radial direction,
the plurality of clutch plates contain outer friction plates provided to the clutch outer and inner friction plates provided to the clutch center,
the outer friction plates and the inner friction plates being alternately arranged between the clutch center and the pressure plate,
the main spring is disposed at an opposite side to the lifter plate through the clutch center in the axial direction and between a hub portion of the clutch center and the pressure plate,
the lifter plate is supported displaceably in the axial direction on the pressure plate, and
the pressure plate is provided with a stopper plate with which the lifter plate comes into contact and which limits displacement of the lifter plate.

2. The multiple plate clutch according to claim 1, wherein the pressure plate is provided with a release boss extending to the lifter plate side and the stopper plate is fixed to an end portion of the release boss, the lifter plate is provided with a hole portion having a smaller diameter than the stopper plate, and the release boss is inserted in the hole portion.

3. The multiple plate clutch according to claim 2, wherein the sub spring is provided as a ring-shaped disc spring and disposed at an outside of the release boss of the pressure plate in the radial direction.

4. The multiple plate clutch according to claim 3, wherein a step portion which is larger in diameter than the hole portion of the lifter plate is provided at a pressure plate side of the release boss, and when the lifter plate is lifted by only a second predetermined amount, the lifter plate comes into contact with the step portion, and directly moves the pressure plate.

5. The multiple plate clutch according to claim 1, further characterized in that a sub lifter plate which is separate from and displaceable relatively to the lifter plate and disposed to be nearer to the lifter cam side than the lifter plate is provided, a sub spring for pressing the pressure plate in a clutch engagement direction through the sub lifter plate is provided, and when the sub lifter plate is lifted by a predetermined amount, the sub lifter plate is separated from the pressure plate, whereby a sub spring load transmission passage to the pressure plate is cut off.

6. The multiple plate clutch according to claim 5, wherein the pressure plate is provided with a pressure plate side boss projecting to the lifter plate side, the lifter plate is provided with a lifter plate side boss which projects to the sub lifter plate side and has a hole in which the pressure plate side boss penetrates, the sub lifter plate is provided with a hole in which the lifter plate side boss penetrates, an end portion of the pressure plate side boss is provided with a fixing member by which the lifter plate side boss and the sub lifter plate are held while the lifter plate side boss and the sub lifter plate are assembled, and a load of the sub lifter plate is transmitted to the fixing member.

7. The multiple plate clutch according to claim 6, wherein the lifter plate side boss is set to be larger in length than the thickness of a peripheral portion of the hole of the sub lifter plate, and when the sub lifter plate is lifted by a predetermined amount, the sub lifter plate comes into contact with the lifter plate and displaces integrally with the lifter plate.

8. The multiple plate clutch according to claim 7, wherein each of the lifter plate and the sub lifter plate has a ring-shaped portion which is opened at the center side of a shaft of the clutch, a circular pipe portion which projects from an inner peripheral edge of the ring-shaped portion of the sub lifter plate to the lifter cam side is integrally provided, a step portion extending inwards in the radial direction is provided to the lifter cam side of an inner peripheral surface of the circular pipe portion, and the sub spring is disposed between the shaft of the clutch and the circular pipe portion, and is in contact with the clutch center and the step portion of the circular pipe portion.

9. The multiple plate clutch according to claim 8, wherein the multiple plate clutch is disposed in a power unit case, and a start clutch through which rotation of an engine is input to the multiple plate clutch is disposed within the same width in the axial direction as the circular pipe portion in the power unit case.

10. The multiple plate clutch according to claim 7, wherein a second sub spring for urging the pressure plate in the clutch engagement direction through the lifter plate is provided between the clutch center and the lifter plate, and when the lifter plate is lifted by a predetermined amount or more, the urging force of the second sub spring to the pressure plate is cut off.

\* \* \* \* \*